US006925250B1

(12) United States Patent
Oshima et al.

(10) Patent No.: US 6,925,250 B1
(45) Date of Patent: Aug. 2, 2005

(54) OPTICAL DISC FOR RECORDING HIGH RESOLUTION AND NORMAL IMAGE, OPTICAL DISC PLAYER, OPTICAL DISC RECORDER, AND PLAYBACK CONTROL INFORMATION GENERATOR

(75) Inventors: Mitsuaki Oshima, Kyoto (JP); Hiromu Kitaura, Osaka (JP); Hideki Fukuda, Osaka (JP); Hideshi Ishihara, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/486,538

(22) PCT Filed: Aug. 31, 1998

(86) PCT No.: PCT/JP98/03873

§ 371 (c)(1),
(2), (4) Date: Jun. 5, 2000

(87) PCT Pub. No.: WO99/12348

PCT Pub. Date: Mar. 11, 1999

(30) Foreign Application Priority Data

Aug. 29, 1997 (JP) .............................................. 9-234320
Dec. 4, 1997 (JP) .............................................. 9-334543

(51) Int. Cl.[7] .............................................. H04N 5/917
(52) U.S. Cl. ........................ 386/111; 386/125; 386/126
(58) Field of Search ................................ 386/125–126, 386/124, 109–112, 131; H04N 5/917

(56) References Cited

U.S. PATENT DOCUMENTS

| 5,583,653 | A | * | 12/1996 | Timmermans | ............... | 386/125 |
| 5,701,385 | A | * | 12/1997 | Katsuyama et al. | ........ | 386/126 |
| 6,009,236 | A | * | 12/1999 | Mishima et al. | ............ | 386/111 |
| 6,356,709 | B1 | * | 3/2002 | Abe et al. | .................... | 386/109 |
| 6,573,819 | B1 | * | 6/2003 | Oshima et al. | ............. | 386/126 |

FOREIGN PATENT DOCUMENTS

| JP | 5336494 | | 12/1993 | | |
| JP | 6350968 | | 12/1994 | | |
| JP | 7107435 | | 4/1995 | | |
| JP | 879701 | | 3/1996 | | |
| JP | 923410 | | 1/1997 | | |
| JP | 10013783 | | 1/1998 | | |
| JP | 1098713 | | 4/1998 | | |
| WO | Wo98/25413 | * | 6/1998 | .......... | H04N/13/00 |

OTHER PUBLICATIONS

Translation of the International Preliminary Examination Report for International Application No. PCT/JP98/03873, dated Apr. 19, 2000.

* cited by examiner

*Primary Examiner*—Vincent Boccio
(74) *Attorney, Agent, or Firm*—Renner, Otto, Boisselle & Sklar, LLP

(57) ABSTRACT

The present invention has an objective of realizing compatibility of an optical disk having a high resolution video signal recorded thereon and a system for reproducing the optical disk, with a conventional system for producing a standard resolution video signal. A high resolution-video signal is divided by video division means into a main signal and a sub signal, and the main signal and the sub signal are MPEG-encoded. The stream of the main signal and the stream of the sub signal are divided into 1 GOP or more of frames. First interleave blocks 54 each including 1 GOP or more of the stream of the main signal and second interleave blocks 55 each including 1 GOP or more of the stream of the sub signal are recorded on an optical disk 1. A high resolution reproduction apparatus reproduces both the first and second interleave blocks to obtain a high resolution video output. A non-high quality picture reproduction apparatus reproduces only the first or second interleave blocks to obtain a standard resolution video output.

21 Claims, 60 Drawing Sheets

FIG. 1

FIG. 8 Comparison of reproduction operation of hierarchical disks

FIG. 11

Reproduction control information /765

| Switching point number S /766 | Picture synthesis identifier /767 | 1st stream | | 2nd stream | | | |
|---|---|---|---|---|---|---|---|
| | | Switching start address:ts1 /768 | Switching termination address:te2 /769 | GOP start address:tsG /770 | Switching start address:ts2 /771 | Switching termination address:te2 /772 | Decoding start address:ta /773 |
| 1 | None | ts1-1 | | tsG-1 | ts2-1 | | ta1 |
| 2 | Mode 1 | ts1-2 | te2-2 | tsG-2 | ts2-2 | te2-2 | ta2 |
| 3 | Mode 2 | ts1-3 | te2-3 | tsG-3 | ts2-3 | te2-3 | ta3 |

FIG.14

Reproduction control information 765b 771

| Switching point number S | Picture synthesis identifier S | 1st stream | | 2nd stream | |
|---|---|---|---|---|---|
| | | Switching start address : ts1 | Switching termination address : te2 | GOP start address : tsG Sector address tsGs | Switching start address : ts2 Sector address |
| 1 | None | ts1-1 | | tsG-1 | ts2-1 |
| 2 | Mode1 | ts1-2 | te2-2 | tsG-2 | ts2-2 |
| 3 | Mode2 | ts1-3 | te2-3 | tsG-3 | ts2-3 |

FIG. 17  Progressive/3D image arrangement information
(resolution/picture identification information)

| VTS (title) | Cell | TXTDT file | | PGC file in each VTS | | | | |
|---|---|---|---|---|---|---|---|---|
| | | TXTDT information | | Angle | | Start address | Termination address | Identification information |
| | | Attribute | Number of multiple angles | | | | | |
| 1 | 1, 2 | 3D Cell1, 2 | 2 | 1 | Main | a1 | a3 | 3D-right |
| | | | | 2 | Sub | a2 | a4 | 3D-left |
| 2 | 1, 2 | 3D Cell1, 2 | 2 | 1 | Main | a5 | a7 | 3D-right |
| | | | | 2 | Sub | a6 | a8 | 3D-left |
| | 3, 4 | Progressive 480P X multiple angles (Cell1, 2) | 4 | 1 | Main | a9 | a11 | 1-480P-main |
| | | | | 2 | Sub | a10 | a12 | 1-480P-sub |
| | | | | 3 | Main | a13 | a15 | 2-480P-main |
| | | | | 4 | Sub | a14 | a16 | 2-480P-sub |
| 3 | 1, 2 | Wide480P (Cell1, 2) | 2 | 1 | Main | a17 | a19 | Wide480i-main |
| | | | | 2 | Sub | a18 | a20 | Wide480i-sub |
| 4 | 1, 2 | Wide480P | 4 | 1 | Main | a21 | a22 | Wide480P-main main |
| | | | | 2 | Sub | a23 | a24 | Wide480P-main sub |
| | | | | 3 | Main | a25 | a26 | Wide480P-sub main |
| | | | | 4 | Sub | a27 | a28 | Wide480P-sub sub |
| 5 | 1, 2 3, 4 | 3D480P | 4 | 1 | Main | a29 | a30 | Right480P-main |
| | | | | 2 | Sub | a31 | a32 | Right480P-sub |
| | | | | 3 | Main | a33 | a34 | Left480P-main |
| | | | | 4 | Sub | a35 | a36 | Left480P-sub |
| 6 | 1, 2 | 720P (24fps) | 2 | 1 | Main | a37 | a38 | 720P-main |
| | | | | 2 | Sub | a39 | a40 | 720P-sub |

FIG.21 Principle of multiple angle picture division multiplex system (MADM)

FIG.54
(a) 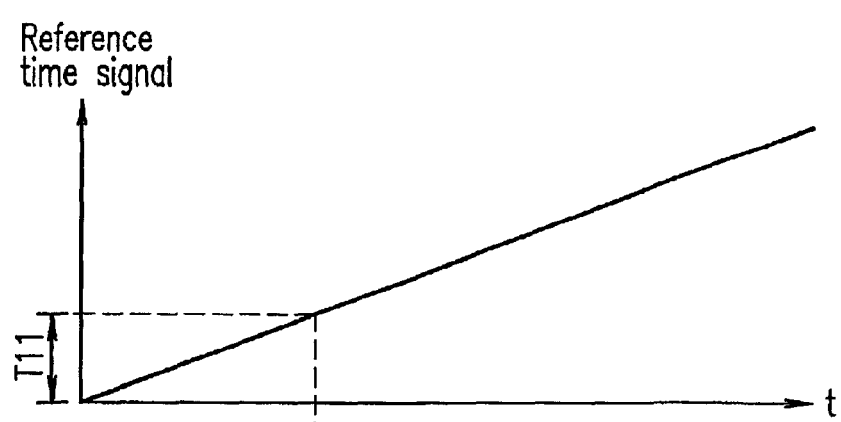
(b) 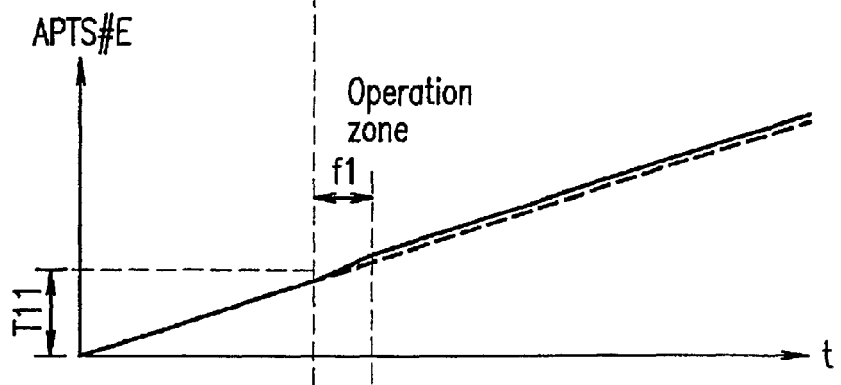
(c) 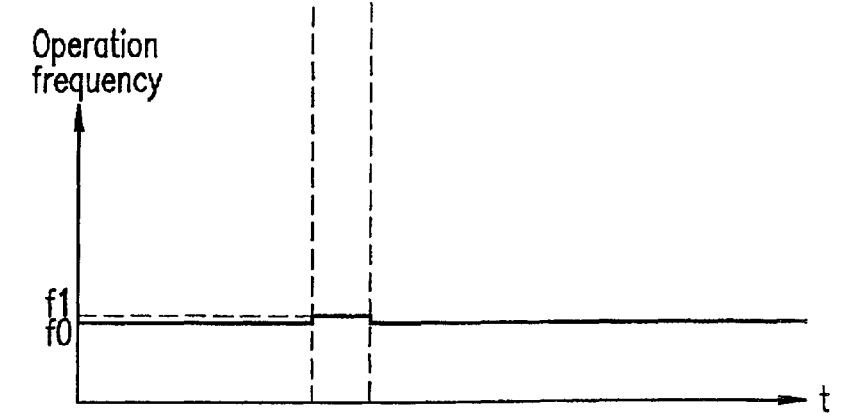

*FIG.55*
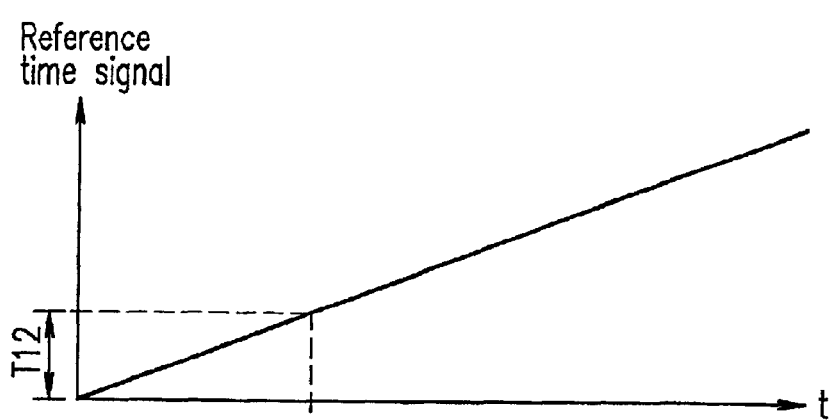
(a)
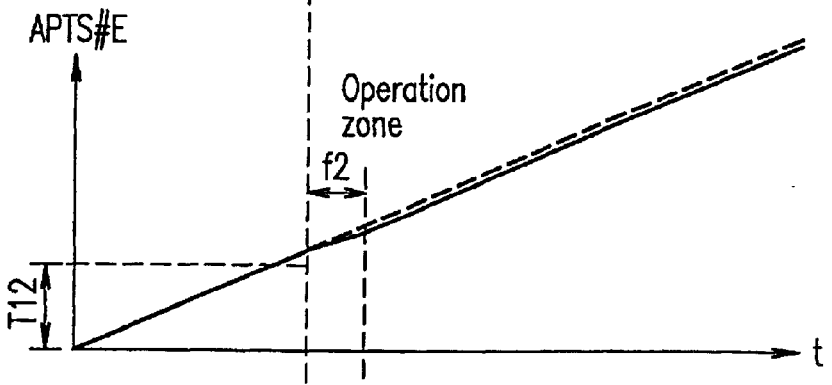
(b)
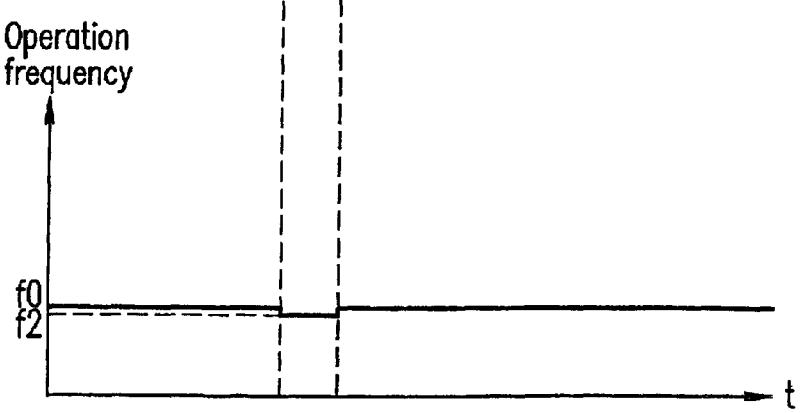
(c)

OPTICAL DISC FOR RECORDING HIGH RESOLUTION AND NORMAL IMAGE, OPTICAL DISC PLAYER, OPTICAL DISC RECORDER, AND PLAYBACK CONTROL INFORMATION GENERATOR

TECHNICAL FIELD

The present invention relates to an optical disk having high quality picture or standard picture recorded thereon, and a recording and reproduction apparatus for such an optical disk.

BACKGROUND ART

For an optical disk having high quality picture recorded thereon and a reproduction apparatus for such an optical disk, systems referred to as 480P and 720P for recording progressive data have conventionally been studied. A conventionally known reproduction control system for an optical disk uses one MPEG decoder.

First, a first problem of the conventional system will be described. When a conventional optical disk for high quality picture recording is reproduced by a standard reproduction apparatus, normal pictures cannot be output. The optical disk for high quality picture recording can only be reproduced by a high quality picture reproduction apparatus. Accordingly, there is a need to produce two types of optical disks having the same contents. In other words, the conventional optical disk for high quality picture recording is not compatible with a standard video reproduction apparatus. Next, objectives of the present invention will be described. A first objective of the present invention is for providing a optical disk for high quality picture recording compatible with the standard video reproduction apparatus and a reproduction system for such an optical disk.

The compatibility herein can be defined as the relationship between the conventional monaural records and stereo records. That is, a novel 3D optical disk or high resolution optical disk according to the present invention is output with a standard resolution by the existing reproduction apparatus for DVD or the like, and output with a high resolution by a novel reproduction apparatus according to the present invention.

Then, a second problem of the conventional system is regarding a reproduction control system. By the conventional reproduction control system, one stream is reproduced using one decoder. Accordingly, in order to connect two streams of a high resolution signal seamlessly, i.e., without stopping the movement of the video, a complicated system is required. A second objective of the present invention is for providing a reproduction control for connecting a plurality of streams seamlessly by a simple procedure.

DISCLOSURE OF INVENTION

An optical disk reproduction apparatus according to the present invention is for reproducing a signal recorded on an optical disk. The optical disk has, recorded thereon, at least a first video stream representing a low frequency component of the video signal and a second video stream representing at least a high frequency component of the video signal, the first video stream includes a plurality of first interleave units and the second video stream includes a plurality of second interleave units, each of the plurality of first interleave units includes m1 GOPs (where m1 is an integer of 1 or greater), each of the plurality of second interleave units includes m2 GOPs (where m2 is an integer of 1 or greater). The optical disk reproduction apparatus includes a reproduction section for reproducing the first video stream and the second video stream recorded on the optical disk; a division section for dividing the reproduced first video stream into the plurality of first interleave units and for dividing the reproduced second video stream into the plurality of second interleave units; a decoding section for decoding the plurality of first interleave units to generate a first reproduction signal representing the low frequency component of the video signal and for decoding the plurality of second interleave units to generate a second reproduction signal representing at least the high frequency component of the video signal a synthesis section for synthesizing the first reproduction signal and the second reproduction signal to generate the video signal; and an output section for selectively outputting at least one of the first reproduction signal, the second reproduction signal, and the video signal. The above-described objective is achieved by this.

The plurality of first interleave units may be each corresponded to first time information relating to reproduction time, and the plurality of second interleave units may be each corresponded to second time information relating to reproduction time.

The optical disk reproduction apparatus may further include a reference time signal generation section for generating a reference time signal; a first reproduction control section for controlling the reproduction time of the first reproduction signal in accordance with the difference between the reference time signal and the first time information; a second reproduction control section for controlling the reproduction time of the second reproduction signal in accordance with the difference between the reference time signal and the second time information; and an adjusting section for adjusting the reference time signal so that the reference time signal supplied to the first reproduction control section and the reference signal supplied to the second reproduction control section represent substantially the same time.

The adjusting section may adjust the reference time signal based on audio reproduction time information representing the time to reproduce an audio signal which is to be output in synchronization with the video signal.

The adjusting section may adjust the reference time signal based on at least one of first video reproduction time information representing the time to reproduce the first reproduction signal and second video reproduction time information representing the time to reproduce the second reproduction signal.

The first reproduction control section may control the reproduction time of the first reproduction signal by skipping a frame of the first reproduction signal or by reproducing a frame of the first reproduction signal in repetition. The second reproduction control section may control the reproduction time of the second reproduction signal by skipping a frame of the second reproduction signal or by reproducing a frame of the second reproduction signal in repetition.

At least one of the first time information and the second time information may include at least one of a PTS, a DTS and an SCR.

The first reproduction signal may correspond to a first pixel number, and the second reproduction signal may correspond to a second pixel number, which is larger than the first pixel number. The synthesis section may include a converter for converting the first reproduction signal into a conversion signal corresponding to the second pixel number.

The video signal may be obtained by synthesizing the conversion signal and the second reproduction signal.

The optical disk further may have, recorded thereon, an identifier representing the first pixel number corresponding to the first reproduction signal, and the converter may convert the first reproduction signal into the conversion signal in accordance with the identifier.

The optical disk further may have, recorded thereon, an identifier representing the first pixel number corresponding to the first reproduction signal. The optical disk reproduction apparatus may further include a rotation control section for controlling the rotation of the optical disk. The rotation control section may control the rotation of the optical disk in accordance with the identifier.

The optical disk further may have, recorded thereon, an identifier representing that the video signal is obtained by encoding a progressive video signal of 24 frames to 30 frames per second. The output section may include a converter for converting at least one of the first reproduction signal, the second reproduction signal, and the video signal into a frame signal. The output section may output the progressive video signal of 60 frames per second by outputting the frame signal in an overlapping manner.

The optical disk reproduction apparatus may further include a buffer memory section for storing the plurality of first interleave units and the plurality of second interleave units. The buffer memory section may have a capacity which is equal to or greater than an amount of data of the GOP or GOPs included in the second interleave units.

The buffer memory section may have a capacity which is 1 MB or greater.

An optical disk according to the present invention include, recorded thereon, at least a first video stream representing a low frequency component of the video signal and a second video stream representing at least a high frequency component of the video signal, wherein: the first video stream includes a plurality of first interleave units, the second video stream includes a plurality of second interleave units, each of the plurality of first interleave units includes m1 GOPs (where m1 is an integer of 1 or greater), and each of the plurality of second interleave units includes m2 GOPs (where m2 is an integer of 1 or greater). The above-described objective is achieved by this.

The plurality of first interleave units and the plurality of second interleave units may be structured so that reproduction time of one of the plurality of first interleave units is substantially equal to reproduction time of one of the plurality of second interleave units, the one of the plurality of second interleave units corresponding to the one of the plurality of first interleave units.

An optical disk recording apparatus according to the present invention includes a dividing section for dividing is a video signal into a first video signal representing a low frequency component of the video signal and a second video signal representing at least a high frequency component of the video signal; an encoding section for generating a first video stream by encoding the first video signal and for generating a second video stream by encoding the second video signal, wherein: the first video stream includes a plurality of first interleave units, the second video stream includes a plurality of second interleave units, each of the plurality of first interleave units includes m1 GOPs (where m1 is an integer of 1 or greater), and each of the plurality of second interleave units includes m2 GOPs (where m2 is an integer of 1 or greater); a selection output section for selectively outputting the plurality of first interleave units included in the first video stream and the plurality of second interleave units included in the second video stream; and a recording section for recording the signal output from the selection output section on an optical disk. The above-described objective is achieved by this.

The division section may include a decoder for decoding the first video stream and a differential calculator for calculating a differential between the video signal and the signal output from the decoder, and may output the signal output from the differential calculator as the second video signal.

The division section may further include a first converter for converting the video signal into a first conversion signal corresponding to a second pixel number which is smaller than a first pixel number corresponding to the video signal, and a second converter for converting the signal output from the decoder into a second conversion signal corresponding to the first pixel number which is larger than the second pixel number corresponding to the signal output from the decoder. The division section may output the first conversion signal as the first video signal. The differential calculator may calculate the differential between the video signal and the second conversion signal.

The recording section may further record on the optical disk an identifier representing that the second video signal is output from the differential calculator.

The recording section may further record on the optical disk an identifier representing the first pixel number corresponding to the video signal.

The recording section may further record on the optical disk an identifier representing the second pixel number corresponding to the first video signal.

An optical disk recording apparatus according to the present invention includes an input section for receiving an encoded first video stream corresponding to a first pixel number and an encoded second video stream corresponding to a second pixel number which is different from the first pixel number, wherein the first video stream includes a plurality of first interleave units, the second video stream includes a plurality of second interleave units, each of the plurality of first interleave units includes m1 GOPs (where m1 is an integer of 1 or greater), and each of the plurality of second interleave units includes m2 GOPs (where m2 is an integer of 1 or greater); a selection output section for selectively outputting the plurality of first interleave units included in the first video stream and the plurality of second interleave units included in the second video stream; and a recording section for recording the signal output from the selection output section on an optical disk. The above-described objective is achieved by this.

An optical disk reproduction apparatus according to the present invention is for reproducing a signal recorded on an optical disk. The optical disk has, recorded thereon, at least a first video stream including a plurality of first GOPs and a second video stream including a plurality of second GOPs, each of the plurality of first GOPs includes a plurality of pictures, and each of the plurality of second GOPs includes a plurality of pictures. The optical disk reproduction apparatus includes a reproduction section for reproducing the first video stream and the second video stream recorded on the optical disk; a decoding section for decoding the first video stream and the second video stream; and an output section for selectively outputting the decoded first video stream and the decoded second video stream in accordance with reproduction control information. The reproduction control information indicates that after a first picture included in a final first GOP among the plurality of first GOPs included in the first video stream is reproduced, a second picture included in a leading second GOP among the plurality of second GOPs included in the second video stream is reproduced, the second picture being different from a leading picture of the leading second GOP. The above-described objective is achieved by this.

The decoding section may start decoding the second video stream so that the decoding of the second picture has been completed when the reproduction of the first picture is completed.

The reproduction control information may include information ts1 representing a position of the first picture, information ts2 representing a position of the second picture, and information tsG representing a position of the leading picture of the leading second GOP. The decoding section may find a decoding start position ta in accordance with expression ta=ts1−(ts2−tsG), and starts decoding the second video stream based on the decoding start position ta.

The reproduction control information may include timing information representing the timing to start decoding the leading second GOP so that reproduction completion time of the first picture matches the reproduction start time of the second picture. The decoding section may start decoding the second video stream based on the timing information.

The decoding section may omit decoding of a picture which is not necessary for decoding pictures from the leading picture of the leading second GOP to the second picture.

The picture which is not necessary may be a B picture.

The optical disk reproduction apparatus may further include a buffer memory section for storing the first video stream and the second video stream, and the buffer memory section has a capacity which is equal to or greater than an amount of data of 1 GOP.

The optical disk has the reproduction control information recorded thereon. The reproduction section may reproduce the reproduction control information recorded on the optical disk.

The optical disk may further have, recorded thereon, an identifier representing whether or not the reproduction control information is recorded on the optical disk, and when the identifier represents that the reproduction control information is recorded on the optical disk, the reproduction section may reproduce the reproduction control information recorded on the optical disk.

In a fast reproduction mode, when the second picture is not an I picture, the output section may prohibit an I picture included in the leading second GOP from being output.

The output section may prohibit a part of the I picture included in the leading second GOP from being output based on I picture reproduction prohibition information.

A reproduction control information generation apparatus according to the present invention includes an input section for receiving a first video stream including a plurality of first GOPs and a second video stream including a plurality of second GOPs; and a generation section for generating reproduction control information which represents that after a first picture included in a final first GOP among the plurality of first GOPs included in the first video stream is reproduced, a second picture included in a leading second GOP among the plurality of second GOPs included in the second video stream is reproduced, the second picture being different from a leading picture of the leading second GOP. The above-described objective is achieved by this.

The reproduction control information may include information representing the number of pictures from the leading picture of the leading second GOP to the second picture.

The reproduction control information may include information representing the time to reproduce the leading picture of the leading second GOP and the time to reproduce the second picture of the leading second GOP.

The reproduction control information may include timing information representing the timing to start decoding the leading second GOP so that reproduction completion time of the first picture matches the reproduction start time of the second picture.

The timing information may represent the timing to start decoding the leading second GOP when a picture which is not necessary for decoding pictures from the leading-picture of the leading second GOP to the second picture is not decoded.

The picture which is not necessary may be a B picture.

An optical disk recording apparatus according to the present invention includes a generation section for generating reproduction control information; and a recording section for recording the reproduction control information on an optical disk having, recorded thereon, a first video stream including a plurality of first GOPs and a second video stream including a plurality of second GOPS. The reproduction control information represents that after a first picture included in a final first GOP among the plurality of first GOPs included in the first video stream is reproduced, a second picture included in a leading second GOP among the plurality of second GOPs included in the second video stream is reproduced, the second picture being different from a leading picture of the leading second GOP. The above-described objective is achieved by this.

An optical disk recording apparatus according to the present invention includes an editing section for editing a first video stream including a plurality of first GOPs and a second video stream including a plurality of second GOPs so that at least one picture unnecessary for reproduction is deleted in accordance with the reproduction control information; and a recording section for recording the edited first video stream and the edited second video stream on an optical disk. The reproduction control information represents that after a first picture included in a final first GOP among the plurality of first GOPs included in the first video stream is reproduced, a second picture included in a leading second GOP among the plurality of second GOPs included in the second video stream is reproduced, the second picture being different from a leading picture of the leading second GOP. The above-described objective is achieved by this.

The at least one picture unnecessary for reproduction may include a picture, of the first video stream, after the first picture, and a picture, of the second video stream, before the second picture.

The at least one picture unnecessary for reproduction may further include a picture which is not necessary for decoding pictures from the leading picture of the leading second GOP in the second video stream until the second picture.

The at least one picture unnecessary for reproduction may be a B picture.

The recording section may record the edited first video stream and the edited second video stream in continuous regions of the optical disk.

The recording section may record the reproduction control information on the optical disk.

The recording section may record the reproduction control information on a medium other than the optical disk.

BRIEF DESCRIPTION OF DRAWINGS

FIG. 1 is a block diagram of a 720P/480P hierarchical recording apparatus in one example according to the present invention.

FIG. 11 is a table showing a data structure of is reproduction control information in one example according to the present invention.

FIG. 14 is a table showing a data structure of the reproduction control information when the time stamps of the streams are continuous in one example according to the present invention.

FIG. 17 is a table showing a data structure of a picture identifier, representing information including resolution, of management information data in one example according to the present invention.

FIG. 54 is a timing diagram of operation frequencies of audio reproduction in one example according to the present invention.

FIG. 55 is a timing diagram of operation frequencies of audio reproduction in one example according to the present invention.

BEST MODE FOR CARRYING OUT THE INVENTION

Hereinafter, the present invention will be described by way of examples with reference to drawings.

EXAMPLE 1
(720P/480P Hierarchical Recording and Reproduction System)

Figure 1:
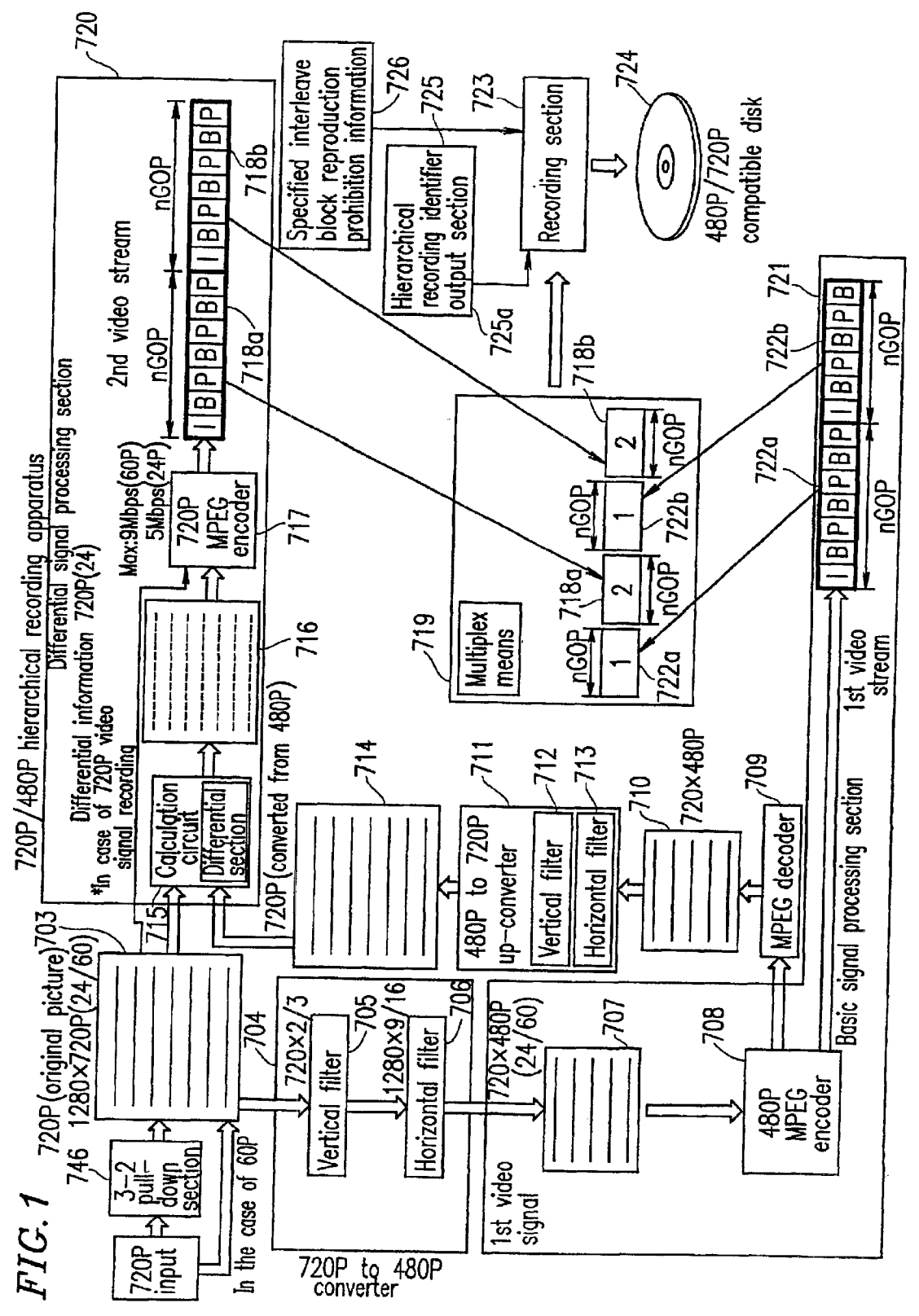
Figure 20:
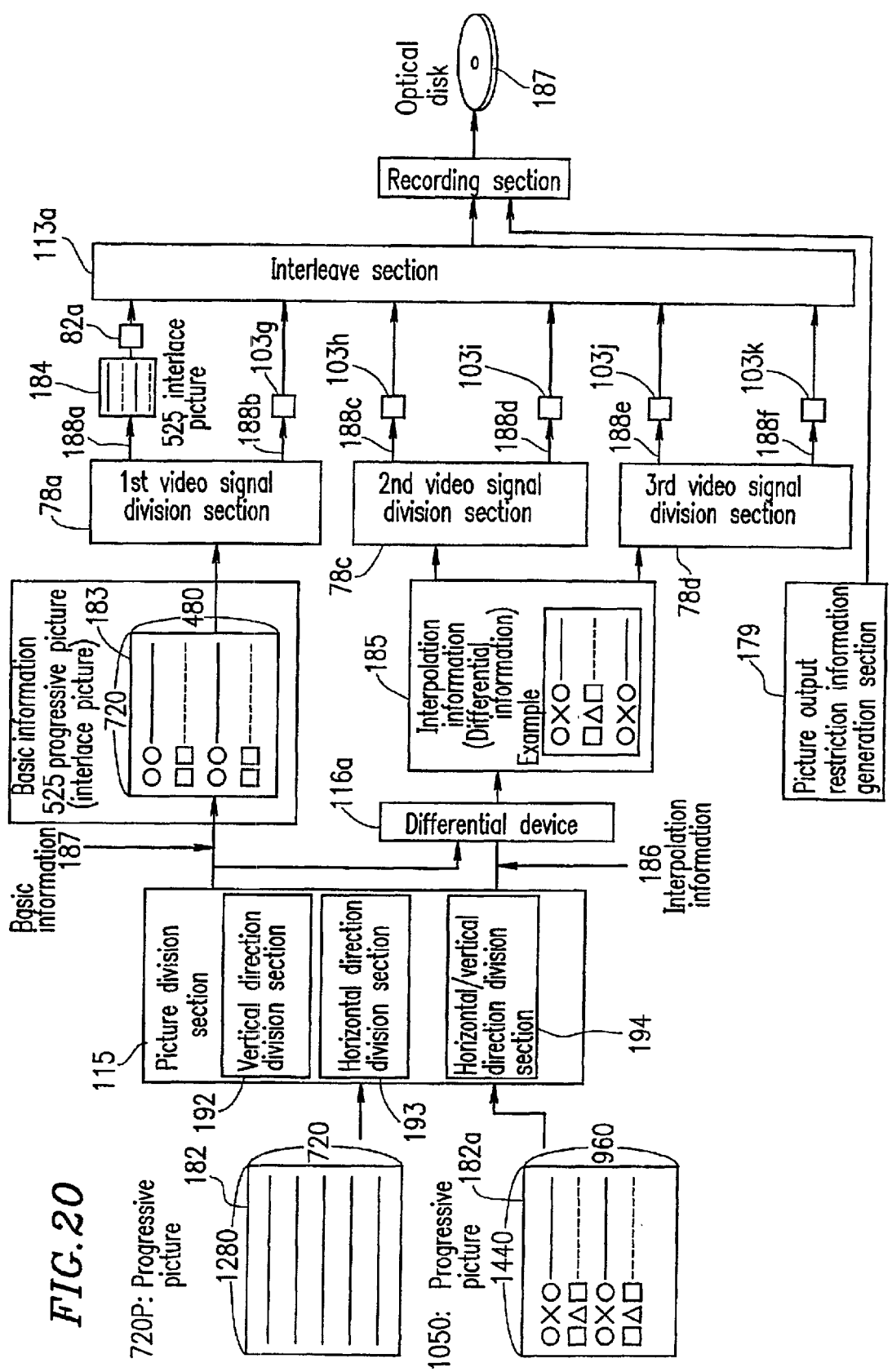
FIG. 20 is a diagram illustrating a method for recording horizontal and vertical interpolation information in interleave blocks after being divided in one example according to the present invention.

With reference to FIG. 1, a specific hierarchical recording apparatus for handling two hierarchical layers of 720P and 480P will be described. Later, a method for recording a HDTV signal in a hierarchical manner in the state where the HDTV signal is divided into a plurality of signals will be described, with reference to FIG. 20.

In the case of a movie signal, specifically, an original 720P video signal of 60 frames per second, the signal is input and then has extra frames deleted by a 3-2 pull-down section 746. As a result, a 720P (24P) signal 703 of 24 frames per second is obtained. In the case of a normal 60P video signal, the 3-2 pull-down section is bypassed. Herein, 60P refers to 60 frames per second. The 720P video signal 703 having 1280×720 pixels is processed by a 720P/480P down-converter 704 as follows. First, the number of vertical lines is reduced to 720×$\frac{2}{3}$=480 by a vertical filter 705. Then, the number of pixels is reduced to 1280×$\frac{9}{16}$=720 pixels by a horizontal filter 706. Thus, the 720P video signal 703 is converted into a 480P video signal 707 having 720×480 pixels. Such a low resolution 480P video signal is encoded by an MPEG encoder 708 for 480P into a compression MPEG signal. Then, the compression MPEG signal is decoded back into a 480P video signal 710 by an MPEG decoder 709. This signal is enlarged to $\frac{3}{2}$ times and $\frac{16}{9}$ times respectively by a vertical filter 712 and a horizontal filter 713 in a 480P/720P up-converter 711, and thus is converted into a 720P high resolution video signal 714. The original 720P video signal 703 and the 720P video signal 714 obtained by MPEG encoding and decoding are differential-calculated by a calculation circuit 715 in a differential signal processing 720, and thus differential information 716 is obtained.

Figure 23:
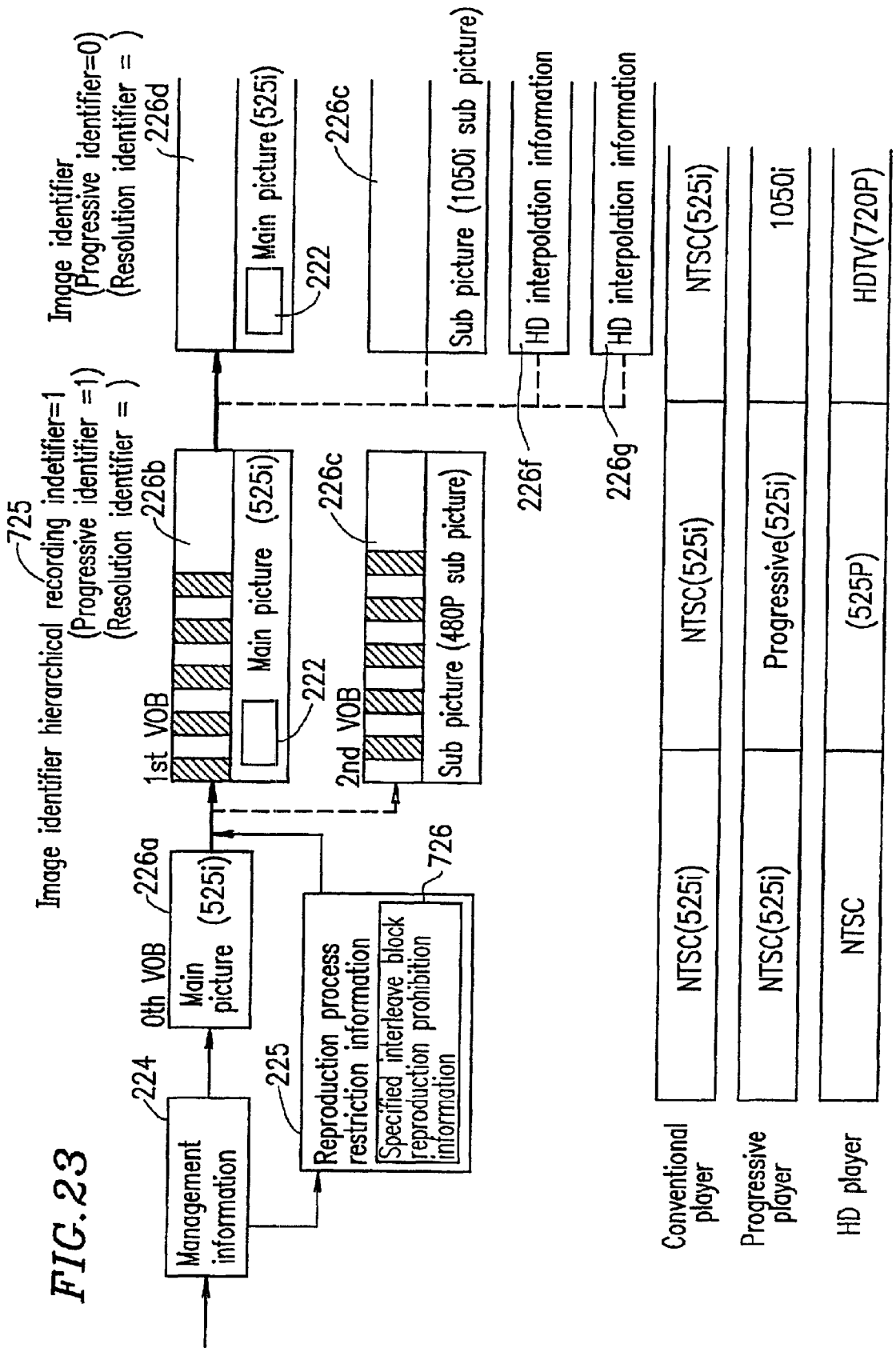
FIG. 23 is a diagram showing signal arrangement for outputting a progressive signal, an NTSC signal and a HDTV signal in one example according to the present invention.

The differential information 716 is encoded by a second MPEG encoder 717 for 720P into a GOP-based video signal including an intraframe (i picture) and a differential frame (P or B). This signal is divided by multiplex means 719 into GOP-based second interleave blocks 718a and 718b including 1GOP to nGOP. An MPEG stream of a basic signal encoded by the first MPEG encoder 708 for 480P in a basic signal processing section 721 is made into a 480P GOP-based MPEG stream and then divided by the multiplex means 719 into first interleave blocks 722a and 722b. The first interleave blocks 722a and 722b are interleaved into the second interleave blocks 718a and 718b; i.e., the first interleave blocks 722a and 722b and the second interleave blocks 718a and 718b are alternately arranged. The resultant signal is recorded on a disk 724 such as a DVD or the like by recording means 723. Also recorded at this point are a hierarchical recording identifier 725 indicating the start point and the termination point and specified interleave block reproduction prohibition information 726 for prohibiting the second interleave blocks 718a and 718b including the differential information from being reproduced by the conventional reproduction apparatus. The identifier and information are recorded in overall management information 224 and each of VOBs as shown in FIG. 23.

Figure 8:
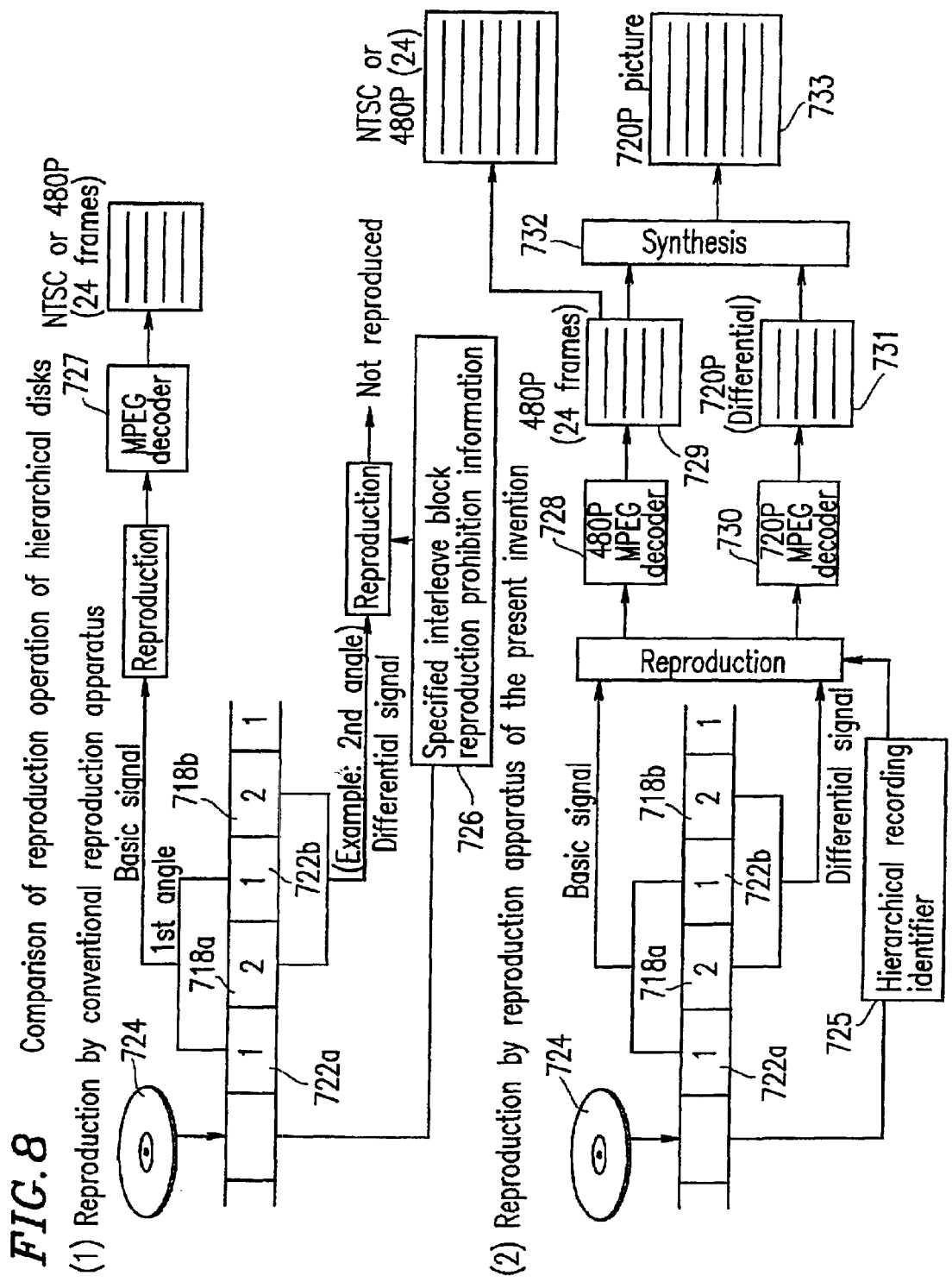
FIG. 8 is a diagram comparing reproduction of an optical disk in one example according to the present invention by an existing reproduction apparatus and by a reproduction apparatus according to the present invention.

When the disk 724 is reproduced by the existing reproduction apparatus based on the DVD standards as shown in FIG. 8, the interleave blocks 722a and 722b are regarded as a first angle and reproduced. The reproduction signal is decoded by MPEG data 727, and thus NTSC or 480P (24 frames) video signal is reproduced. As shown in FIG. 23, the specified interleave block reproduction prohibition information 726 for prohibiting specified interleave blocks including the differential information from being reproduced, for example, an angle switching prohibition flag is recorded. Accordingly, even if the user inadvertently operates the reproduction apparatus, reproduction of a second angle, i.e., the second interleave unit is prohibited. In other words, the differential information for 720P is automatically prevented from being reproduced by the existing DVD reproduction apparatus. When the differential information for 720P is reproduced in error, malfunction occurs since this signal cannot be normally reproduced by a first MPEG decoder for 480i of the existing reproduction apparatus. This type of trouble is avoided by the present invention. In this case, information on connection to the second interleave blocks may be intentionally excluded from the management information 224, which is referred to as the navigation information in the DVD standards.

The above-described effect is also useful when a 720P signal itself is recorded in the second interleave blocks. In this case, the 720P signal is directly input to the MPEG encoder 717 as shown by the arrow indicated with "*" in FIG. 1.

In this manner, when the disk 724 is reproduced by the existing DVD reproduction apparatus, a video signal is reproduced at the quality equivalent to NTSC, which is obtained by reproducing an existing DVD disk; and furthermore erroneous reproduction of information which cannot be normally reproduced by the existing DVD reproduction apparatus, such as a differential signal or a 720P signal, is prevented. Thus, bidirectional compatibility is realized.

A 480P signal itself may be recorded in the second interleave blocks instead of the 720P signal. In this case, the first interleave blocks are reproduced and thus a 480i (NTSC) signal is output by the conventional reproduction apparatus. By a reproduction apparatus according to the present invention, a 480i signal from the first interleave blocks or a 480P signal from the second interleave blocks is reproduced, or both of them can be reproduced.

When a reproduction apparatus according to the present invention is used, a basic signal is reproduced from the first interleave blocks 722a and 722b, which is referred to as the first angle in the DVD standards. A differential signal and a 720P signal are reproduced from the second interleave blocks 718a and 718b, which is referred to as the second angle in the DVD standards. From the first angle, a 480P video signal 729 is output by an MPEG decoder 728 for 480P; and from the second angle, a 720P video signal 731 or a 720P signal as a differential signal is reproduced by an MPEG decoder 730 for 720P. These two video signals having a different number of pixels are synthesized by a synthesis section 732 or output as they are, and thus decoded into an original 720P video signal 733 to be output.

In this manner, when the hierarchical recording disk 724 is reproduced by the reproduction apparatus according to the present invention, a 720P video signal is output. Thus, a HDTV signal such as a 720P signal can be recorded while compatibility with the conventional reproduction apparatus is maintained.

When a 480P signal itself is recorded in the second interleave blocks, a 480P signal having a density twice as high as that of an NTSC signal is reproduced.

Figure 3:
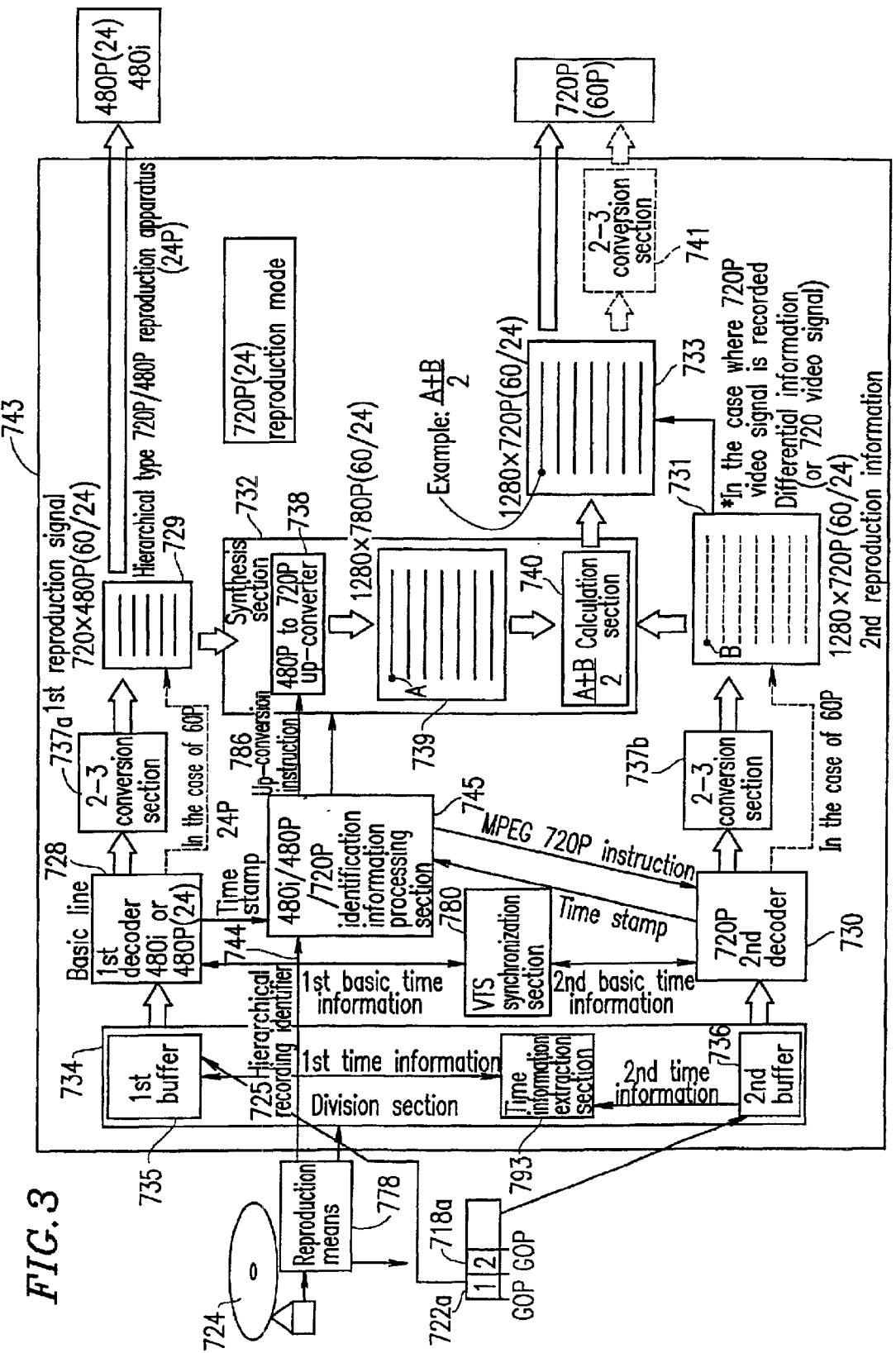
FIG. 3 is a block diagram of a 480P/720P (24/60) reproduction apparatus in one example according to the present invention.

With reference to FIG. 3, a more specific operation of the reproduction described with reference to FIG. 8 will be described. The blocks which have already been described will not be described again.

The disk 724 has a basic signal and a differential signal recorded thereon alternately after being divided on an nGOP-by-nGOP basis by the multiplex means 719 shown in FIG. 1 and interleaved. This signal is divided into the first interleave block 722a and the second interleave block 718a, i.e., the basic signal and the differential signal, by a division section 734 of the reproduction apparatus shown in FIG. 3. Then, the basic signal and the differential signal are stored in a first buffer memory 735 and a second buffer memory 736 respectively. Then, respective time information is extracted from a time information extraction section 793. A VTS synchronization section 780 sets first basic time information and second basic time information in the first decoder 728 and the second decoder 730 so that the two signals are in synchronization with each other. Thus, output signals from the two decoders are synchronized. In this case, when the hierarchical recording identifier 725 is detected, an identification information processing section 745 recognizes that a first reproduction signal which is the decoded signal of the first stream is a basic signal having a smaller number of pixels and that a second reproduction signal which is the decoded signal of the second stream is a differential signal having a larger number of pixels and having the differential information from the basic signal. Thus, the identification information processing section 745 give the synthesis section 732 an instruction regarding an up-converter 738 and an instruction of addition.

The MPEG decoder 728 for 480P and the MPEG decoder 730 respectively decode the signals into a 480P (24) signal and a 720 (24 frames) signal. The decoded signals have 24 frames/sec. or 30 frames/sec. The signals are processed by 2-3 conversion sections 737a and 737b so as to output the same frame twice, and thus a 480P signal 729 of 60 frames/sec. and a 720P signal 731 having the differential information are obtained. The 480P signal 729 is up-converted into a 720P signal 739 by the 480P/720P up-converter 738 and added to the 720P signal 731 having the differential information by an addition section 740, and thus the original 720P video signal 733 is obtained. The addition section 740 calculates, for example, as shown in the figure. Where the pixels of the respective signals are a and b, (a+b)/2 is performed to obtain the original 720P video signal 733. The calculation performed by the synthesis section 732 may be different from (a+b)/2.

In this case, the MPEG decoding signals may be kept to have 24 frames/sec. without being converted by the 2-3 conversion sections 737a and 737b to have 60 frames/sec. and after synthesis, converted to have 60 frames/sec. by a 2-3 conversion section 741. In such a case, the amount of data of the video signal is advantageously reduced to half, and the processing ability of the digital processing circuit can be reduced to half.

Figure 9:
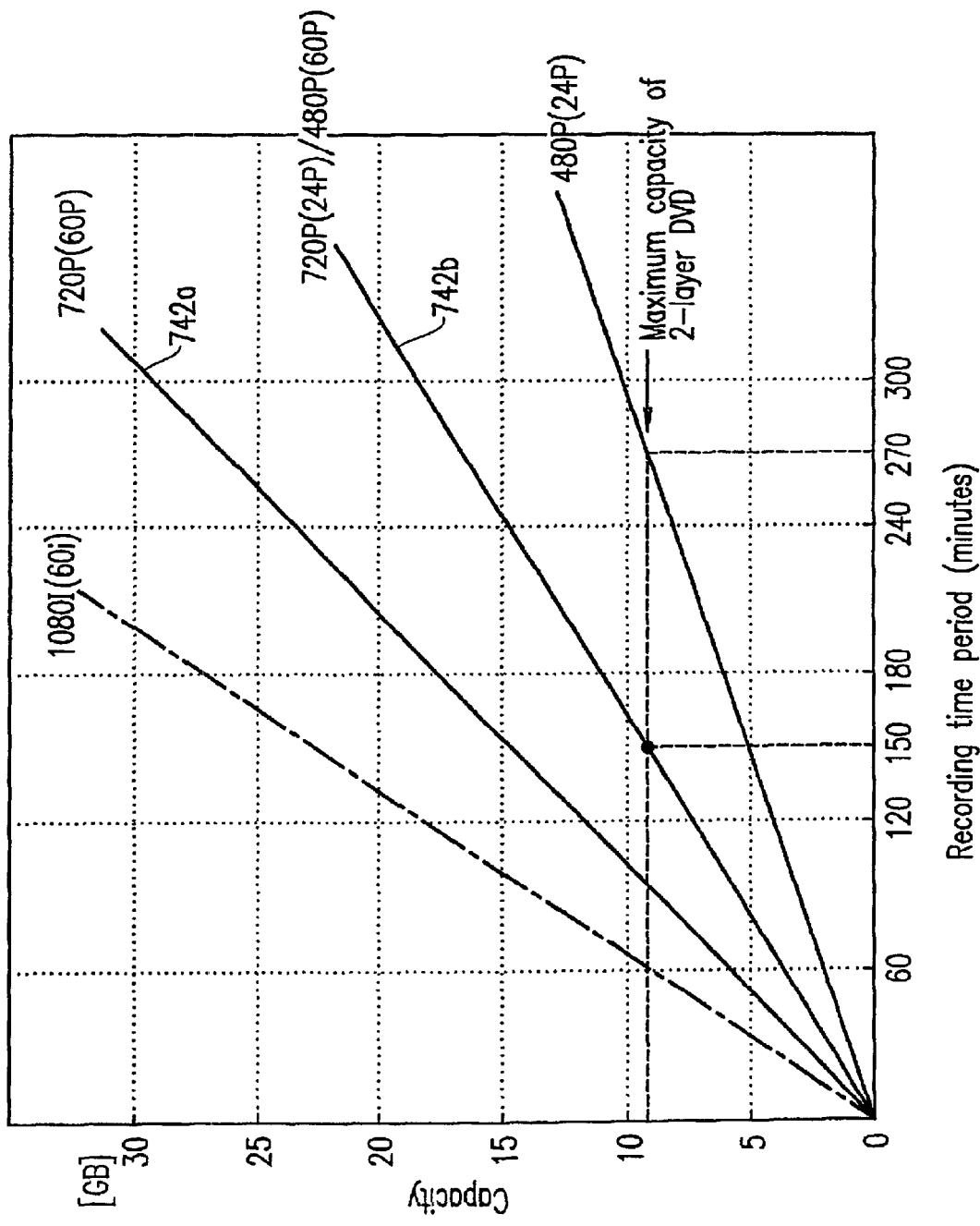
FIG. 9 is a graph illustrating the relationship between the recording time period and the capacity of an optical disk in one example according to the present invention.

With reference to FIGS. 1 and 3, the method for recording and reproducing a 720P signal of 24 frames/sec. such as a movie signal in a hierarchical manner has been described. This method has significant advantages. The HDTV format includes the 1080i system and the 720P system. As shown in FIG. 9, a 1080i signal (24 frames) used for movies can be recorded only for 90 minutes since a two-layer DVD has a capacity of 8.5 GB as indicated by curve 742a.

By contrast, a 720P signal (24 frames) can be recorded for 150 minutes as indicated by curve 742b. A 480P signal (60 frames) can be recorded for 150 minutes as indicated by curve 742c. Disks for movies are considered to be meaningless unless each has a recording capacity of 120 minutes or more. The 720P (24)/480P hierarchical recording disk has an effect that an HDTV movie title can be accommodated in one DVD.

In the example shown in FIG. 3, a 480P signal having the basic information of a 720P signal is recorded in the first interleave blocks, and the differential information between the 720P and 480P signals is recorded in the second interleave blocks. For a disk having a 720P signal as it is in the second interleave blocks is reproduced, the output from the second decoder 730 can be output as it is as shown by arrow indicated with "*" in FIG. 3. The determination to do this is made by the identification information processing section 743 based on an identifier. In this case also, an effect equivalent to complete recording compatibility is obtained. This system has a lower recording efficiency but has the effect of simplifying the processing circuit for recording and reproduction and the effect of the complete compatibility.

Figure 60:
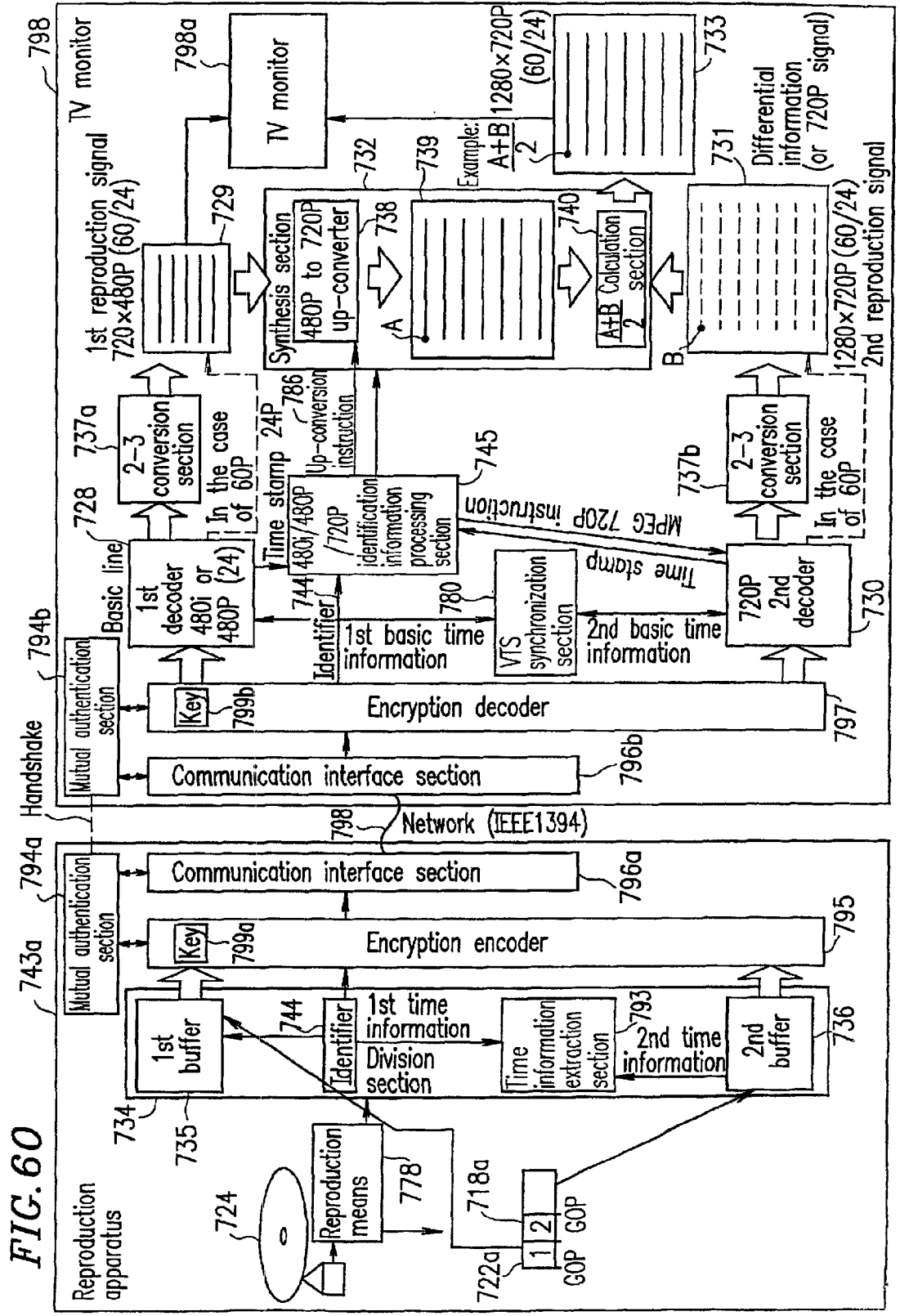
FIG. 60 is a block diagram of a reproduction apparatus of a mutual authentication system and a TV monitor in one example according to the present invention.

With reference to FIG. 60, an example in which a decoder is mounted on a TV monitor 798 will be described. The basic operation is the same as that described with reference to FIG. 3, and only the different parts will be described. In a reproduction apparatus 743*a*, a signal before decoding is encrypted by an encryption encoder 795 using an encryption key 799*a* and sent from a communication interface section 796*a* through a network 798 to a communication interface section 796*b* in the TV monitor 798. Before this operation, mutual authentication sections 794*a* and 794*b* communicate to each other to authenticate each other. This operation may be referred to as a handshake. In the case where mutual authentication is confirmed and thus both sides determine that the other side is proper, the mutual authentication sections 794*a* and 794*b* provide the encryption encoder 795 and an encryption decoder 797 with the encryption keys 799*a* and 799*b* and also permit the communication interface 796*a* and 796*b* to communicate. Thus, encryption data is sent and received, and the keys of the encryption data are unlocked. Therefore, the first stream and the second stream are respectively sent to the first decoder 728 and the second decoder 730. The determination to conduct this processing is made by the identification information processing section 745 based on an identifier 744 which is separately sent. When the first stream is of a 480P signal and the second stream is of a 720P differential signal as described above, up-conversion and synthesis calculation are performed, and a 720P signal is output to a TV monitor 798*a*. When an identifier indicating that the second stream is of a 480P differential signal is received, the two streams are synthesized to output a 480P signal. When an identifier indicating that the streams are of a 3D signal, a 3D signal is output and displayed on the TV monitor 798*a*. The 3D signal is obtained by time-based synthesis, where the first stream is set for the left eye and the second stream is set for the right eye.

According to this system, even when two streams are encrypted, the streams are processed, for example, synthesized by the TV monitor using the identifier 744. Thus, the original picture can be obtained without violating the copyright protection secured by the encryption.

Next, with reference to FIG. 10, an operation for reproducing a disk 724*a* having a 480P (60 frames/sec.) recorded thereon by the reproduction apparatus according to the present invention will be described. Common parts as those in FIG. 3 will not be described.

Figure 19:
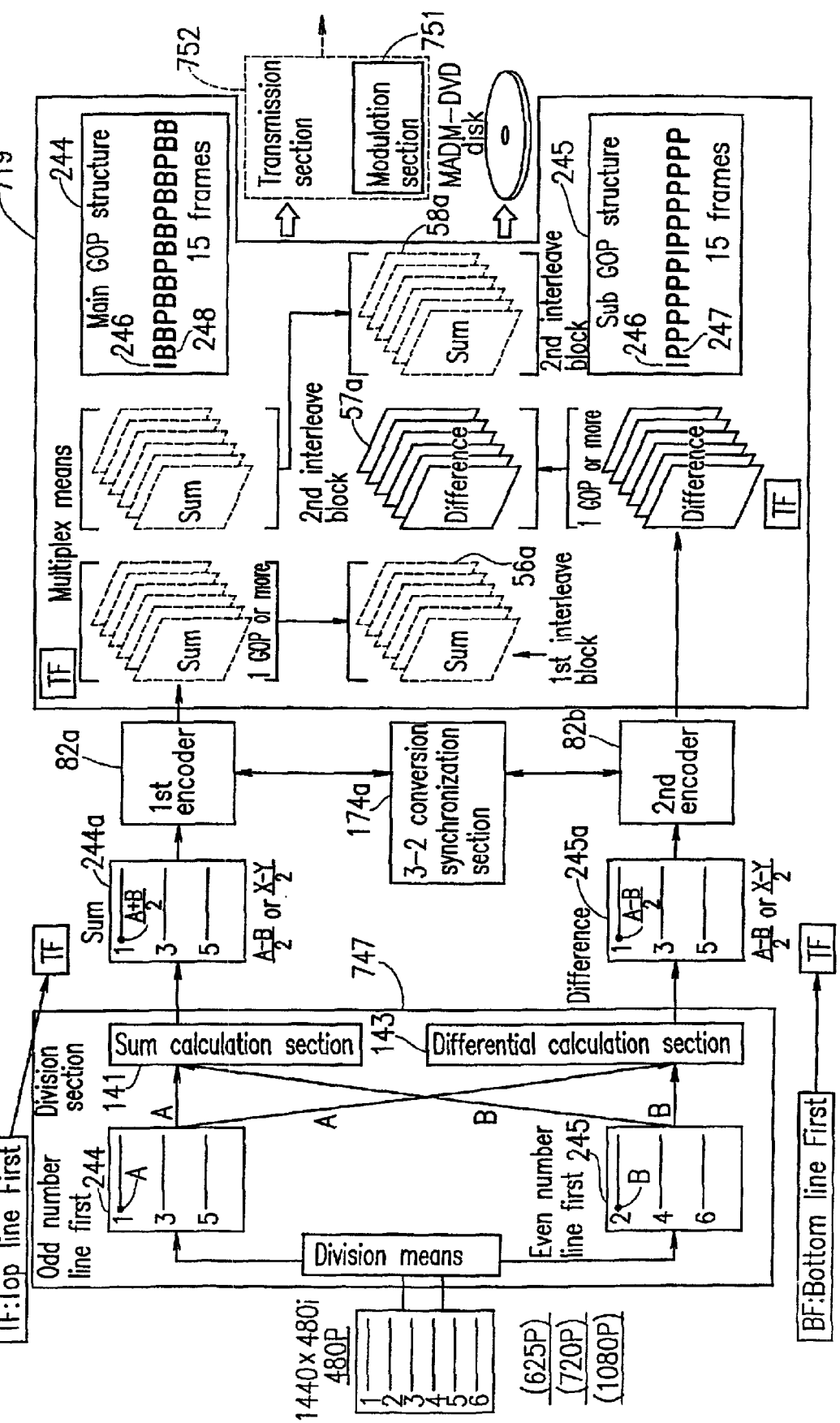
FIG. 19 is a diagram illustrating the principle of multiple angle picture data division multiplex recording system in one example according to the present invention.

(Sum and Difference System—FIG. 19)

With reference to FIG. 19, the concept of the sum and difference system will be described. This system is referred to as multiple angle video data division multiplex system (MADM) since a video signal is divided into vertical or horizontal high frequency and low frequency components and recorded in each of multiple angles. As shown in FIG. 19, a signal is divided into a basic signal (sum signal) and a sub signal (differential signal) by a sum calculation section 141 and a differential calculation section 143. The resultant signals are MPEG-encoded and then alternately recorded as interleave blocks in units of 1 GOP. At this point, the amount of the information can be reduced by 20% by performing a 3-2 conversion of the basic signal and the sub signal in synchronization with each other. It is efficient to use, as the basic signal, "IBBPBBPBBPBBPBB" which is shown as a main GOP structure 244 used for the ordinary MPEG encoding. In this structure, an I frame 246, B frames 248 and P frames 247 are alternately arranged. In the case of the differential signal, however, experiments have shown that it is efficient to have a structure including only I frames 246 and P frames 247 due to the profile pattern, for example, "IPPPPPPPIPPPPPPP" shown as a sub GOP structure 245. The efficiency is improved by changing the setting for the sub GOP structure.

Figure 21:
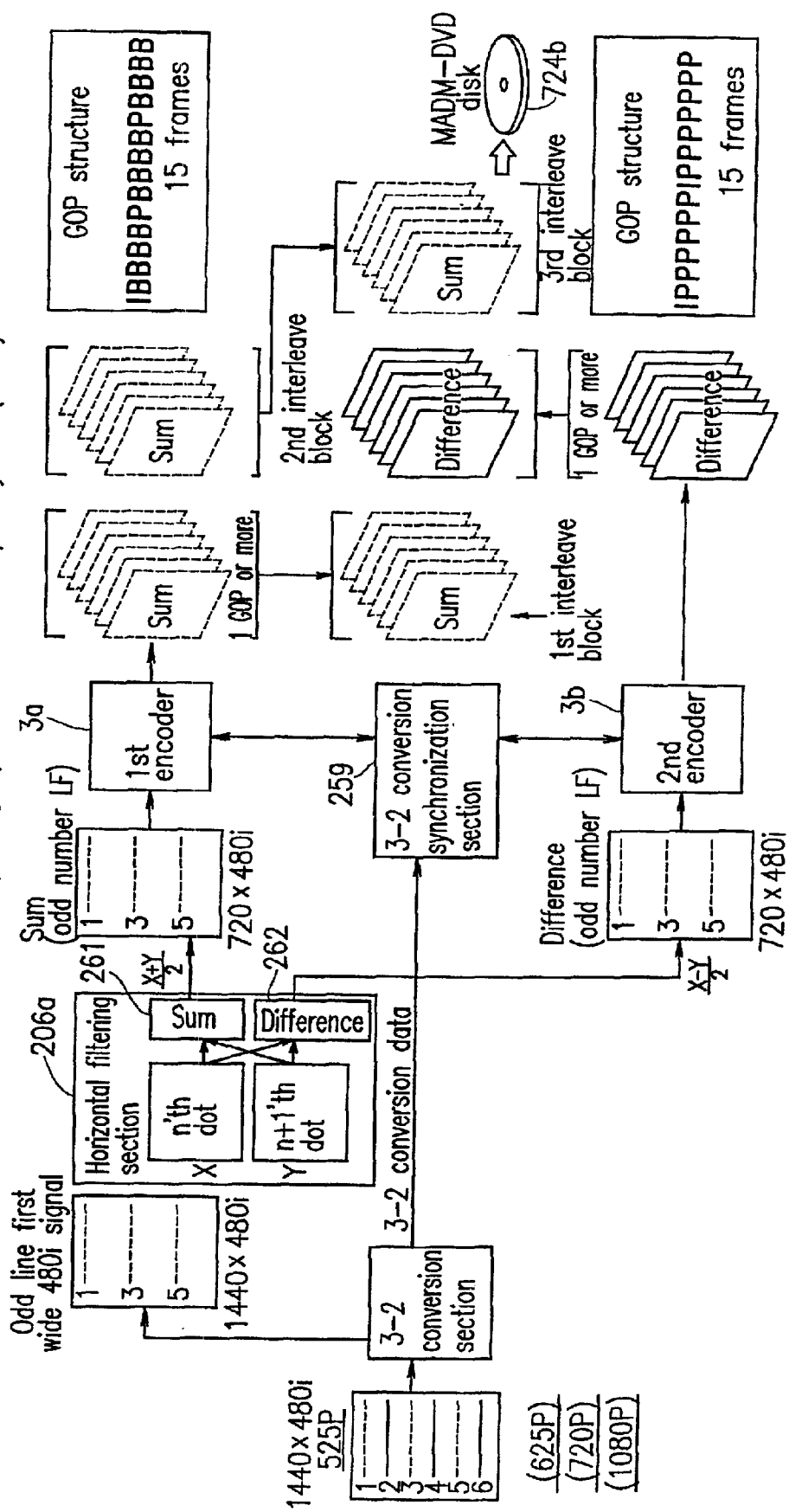
FIG. 21 is a view illustrating the principle of an MADM system for dividing a signal into two in a horizontal direction in one example according to the present invention.

FIG. 19 shows an example in which a 480P video signal is divided into two in a vertical direction. FIG. 21 (described below) shows an example in which a 480P video signal is divided into two in a horizontal direction. In an alternative manner, a 60-frame 480P signal may be divided by frame division means into 30 odd frames and 30 even frames. In this case, the respective 30P signals are converted into two 60-field interlace signals, and each of the signals are MPEG-encoded and recorded in the MADM system. Such encoding is performed in a progressive manner, and therefore encoding efficiency is improved as in the case of the movie. Thus, the recordable time period of the same disk is extended.

When such a signal is reproduced by a non-MADM reproduction apparatus, a 30P (one-channel) 525 interlace signal is reproduced in a first channel. Such a signal lacks necessary frames and is distorted.

When such a signal is reproduced by an MADM reproduction apparatus, a 30P signal is reproduced as a basic signal and another 30P signal is reproduced as a sub signal. These two 30-frame signals are synthesized into a 60-frame normal 480P signal by frame synthesis means including a frame buffer, and then output.

When a line doubler is added to an output section for the 480P signal, a 1050P video signal is obtained.

When a 525 interlace signal is input to a sum signal section of the synthesis section of the MADM reproduction apparatus and the value of 0 is input to a differential signal section of the synthesis section, a 480P video signal is obtained. Such a manner of input has the same effect as the line doubler. This method allows even a 525 interlace signal to be output as a 480P signal. Accordingly, all types of pictures can be viewed by simply connecting one cable to a progressive input terminal of the MADM reproduction apparatus.

In FIG. 19, ½(A+B) and ½(A−B) are used as expressions for calculation for a two-tap filter. The division frequency corresponds to about 300 scanning lines.

As shown in FIG. 19, the disk 724*a* having a 480P signal in the state of being divided into two signals by sum and differential calculations and recorded in two block groups, i.e., the first interleave blocks and the second interleave blocks is reproduced. The signal is divided into a 480*i* signal as a basic signal and a 480*i* signal as a differential signal by the division section 734. The signals are respectively decoded by the MPEG decoders 728 and the MPEG decoder 730 to obtain a 480*i* signal 729*a* and a 480*i* differential signal 731*a*. The addition section 740 performs the calculation of (a+b)/2 to synthesize the two 480*i* signals. Thus, a 480P (60 frames) synthesis signal 733*a* is output.

The disk 724 includes 480*i*/480P/720P identification information 744 (FIG. 17) recorded in a toc section or the like thereof. The 480*i*/480P/720P identification information 744 includes three signals in the case of the 480 *i* signal, the 480P signal and the 720P signal, and also shows which resolution of differential signals are recorded. The identification information processing section 743 processes this information to determine in which sector address of the disk main data (main signal) and sub data (differential signal) of the hierarchical data are recorded. The identification information processing section 743 then sends information on the start point and the like to the synthesis section 732. The synthesis section 732 performs a synthesis calculation of the main data and the sub data from the start point of the 480P main signal and outputs a 480P (60 frames/sec.) signal.

As shown in FIG. 17, row of Vts=6, it is recorded on the disk that at the start point of the 720P signal, 720P-main is the first interleave block, and 720P-sub is the second interleave block. The identification information processing section 743 identifies this information. The calculation section 740 performs a synthesis calculation of the 720P signal, for example, (a+b)/2 from the start time stamp of the 720P signal, using the time stamps of the main signal and the differential signal from the MPEG decoders 728 and 730, and then outputs a 720P signal.

When a 480P identifier is recorded as the identification information 744 (FIG. 17), the identification information processing section 745 sends a 480*i* signal decoding instruction to the MPEG decoder 730 and causes the MPEG decoder 730 to decode the 480 *i* signal. Then, a differential signal 731*a* of the 480 *i* signal is decoded and synthesized by the synthesis section 732. Thus, a 480P (60 frames/sec.) is output.

In this manner, the MPEG decoder 730 performs the 480 *i* processing (480P-30 frames/sec.) or the 720P processing in accordance with the identification information. Thus, the main signal and the differential signal of the 480 *i* signal, and the main signal and the sub signal of the 720P signal, can be decoded by two MPEG decoders in total. This has the effect of simplifying the structure of the apparatus.

Figure 10:
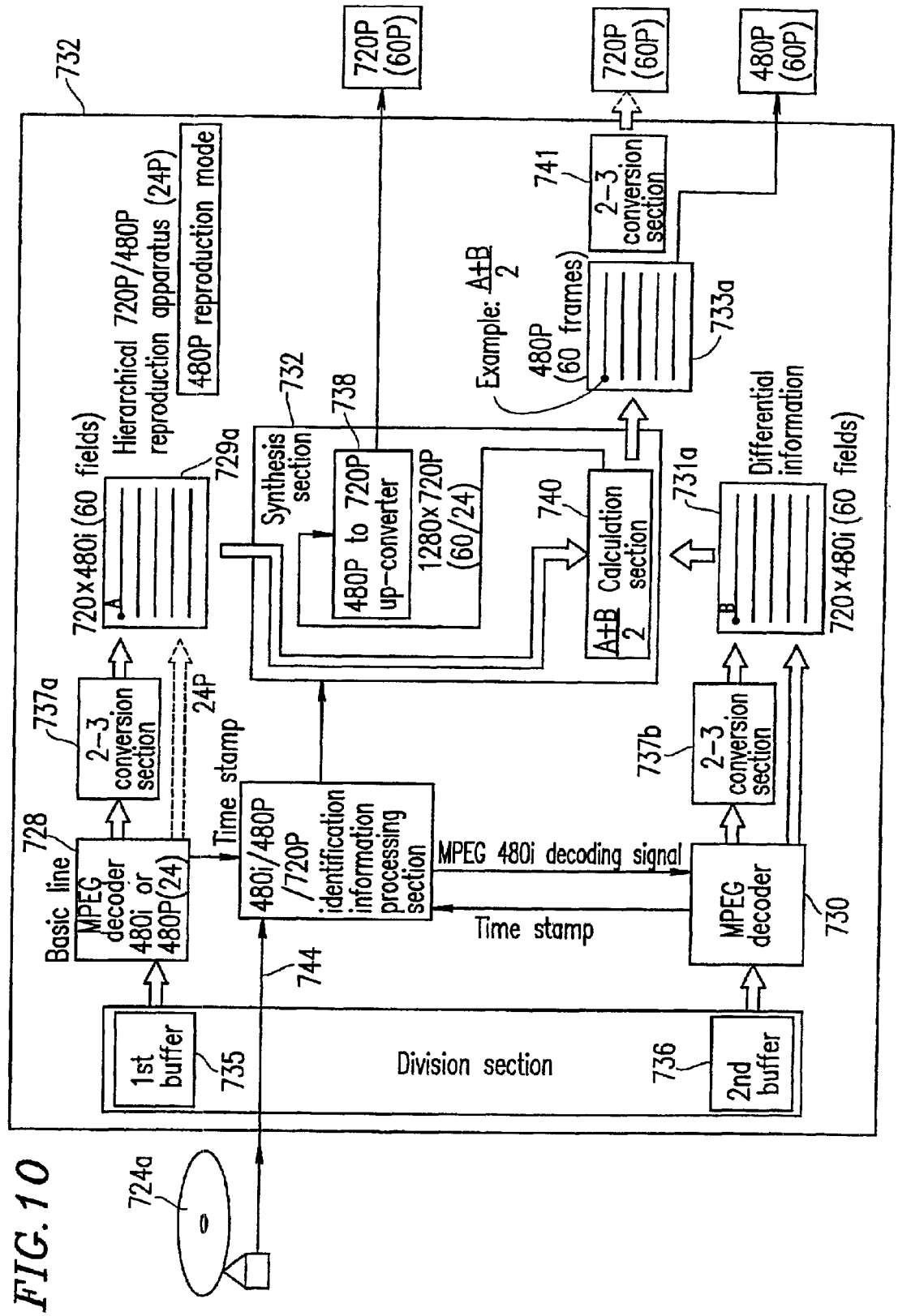
FIG. 10 is a block diagram of a hierarchical reproduction apparatus of a 480P reproduction mode in one example according to the present invention.

The 480P reproduction mode shown in FIG. 10 does not use the 400P/720P up-converter 738 in the synthesis section 732, but allows the decoded 480P (60) signal to be up-converted to a 720P signal by the 480P to 720P up-converter 738 and thus displayed on a HD video projector for 720P or the like. Thus, the scanning lines are advantageously more unlikely to be viewed. In this case, one 480P to 720P up-converter 738 can be used for 720P signal synthesis and 480P to 720P up-conversion. Thus, the 480P signal can advantageously be up-converted into a 720P signal without adding any element.

(720P/480P/480 *i* Three Hierarchical Layer Recording Apparatus)

Figure 5:
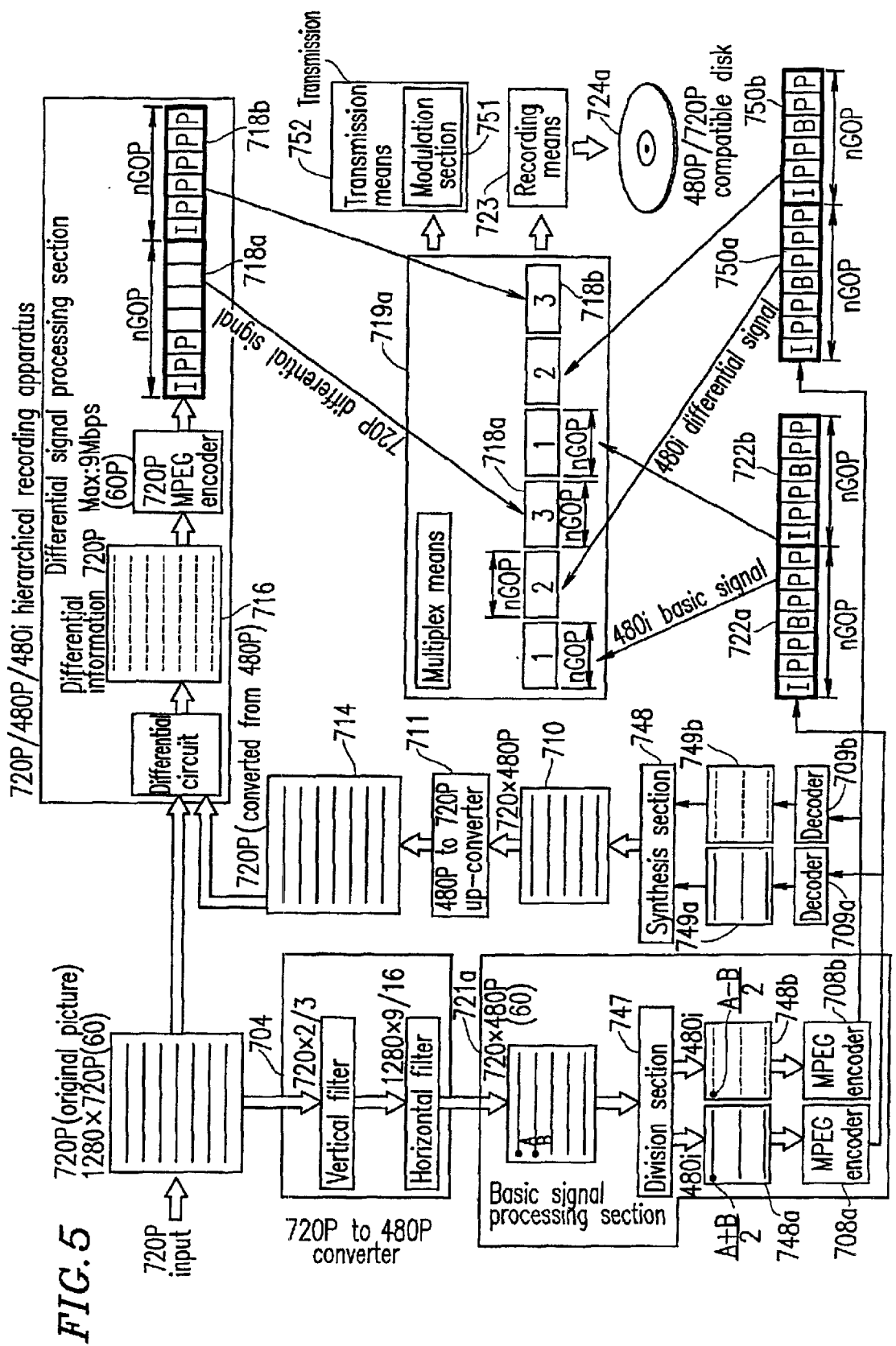
FIG. 5 is a block diagram of a three hierarchical layer optical disk recording apparatus in one example according to the present invention.

With reference to FIG. 5, a structure and an operation of the 720P (60 frames/sec.)-type three hierarchical layer recording apparatus will be described. The structure and the operation are substantially the same as those in FIG. 1, and only the different parts will be described. First, an input signal is a 720P signal of 60 frames/sec. Accordingly, after being 480P down-converted, the input signal is a 480P signal of 60 frames/sec. This signal is input to a basic signal processing section 721*a* and processed by a division section 747. Where the pixel data of the n'th line is a and the pixel data of the (n+1)th line is b, the division section 747 uses the calculation result of (a+b)/2 for the m'th line of a 480i video signal 748*a* and the calculation result of (a−b)/2 for the m'th line of a 480*i* video signal 748*b*, and thus obtains a main signal and a sub signal of an NTSC signal. These signals are respectively encoded by the MPEG encoders 708*a* and 708*b*, and decoded by the MPEG decoders 709*a* and 709*b* into decoded signals 749*a* and 749*b*. The signals are synthesized by a synthesis section 748 into a 480P signal 710. The 480P signal is up-converted into a 720P signal 714, and differential information is obtained. The differential information is MPEG-encoded to obtain data as third interleave block data 718*a* and 718*b*. This procedure is substantially the same as that in FIG. 1 except that the frame rate is 60 frames/sec. instead of 24 frames/sec.

The 480 *i* MPEG stream is divided by multiplex means 719*a* into interleave blocks on an nGOP basis. The nGOPs are interleaved in the order from a 480 *i* signal (first interleave blocks 722*a* of a basic signal), then a 480i signal (second interleave blocks 750*a* of a differential signal), and then a 720P (third interleave blocks 718*a* of a differential signal), and recorded on the disk 724 such as a DVD.

In this case, the multiplexed signals are modulated by an 8VSB, QAM or OFDM modulation section 751 and transmitted from a transmission section 752. Thus, hierarchical broadcasting can be performed. The signals may be multiplexed by time division based on a time domain defined by the broadcasting instead of based on a GOP.

In this manner, a 480 *i*/480P (60)/720P three hierarchical layer disk or hierarchical broadcasting is realized.

Figure 2:
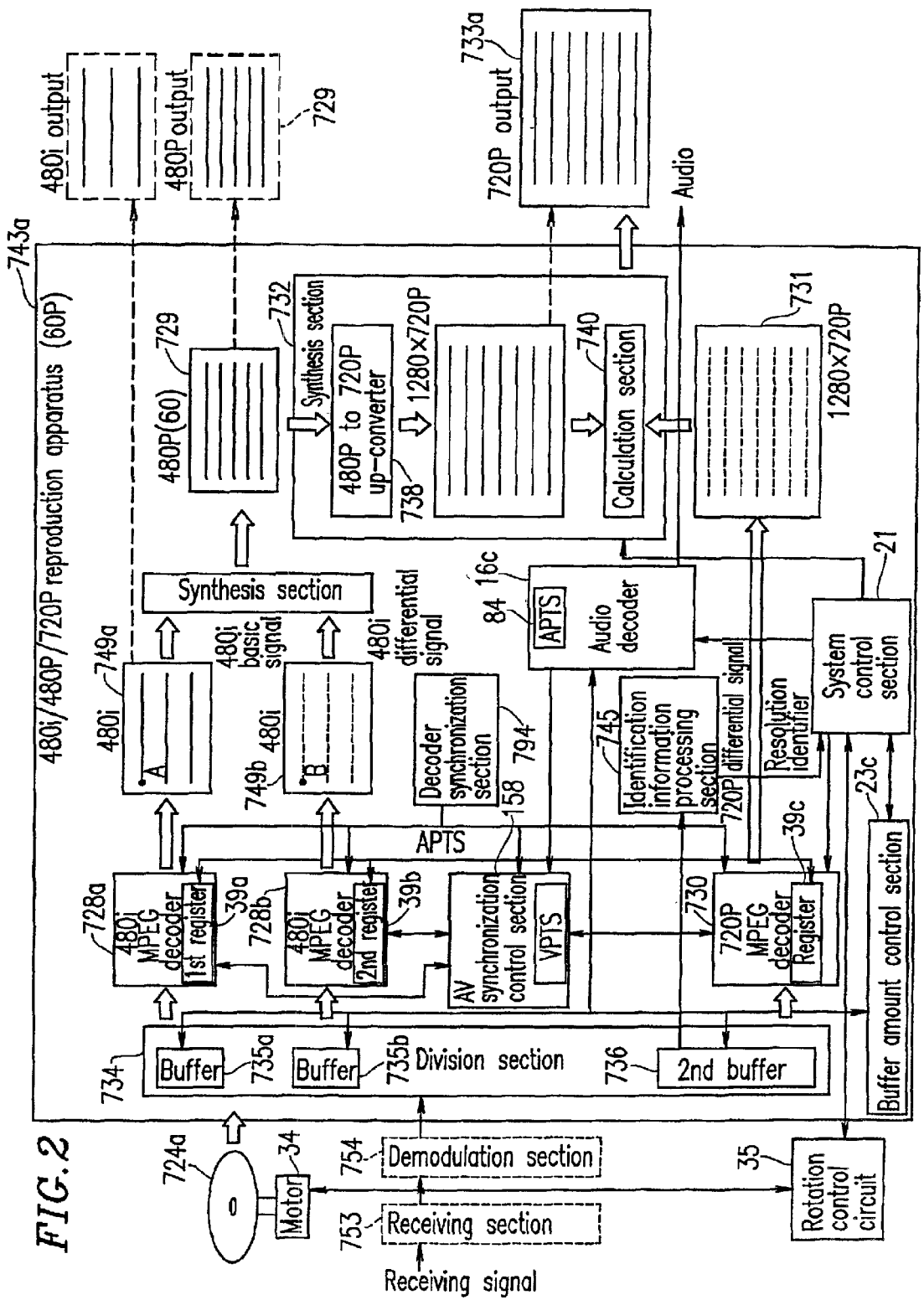
FIG. 2 is a block diagram of a 480i/480P/720P (60) reproduction apparatus in one example according to the present invention.

With reference to FIG. 2, an operation for reproducing the disk 724*a* will be described. Since identical elements with those in FIG. 3 are included, the identical elements will not be described. A signal reproduced from the disk 724*a* or received by a receiving section 753 and demodulated by a demodulation section 754 is divided by the division section 734 into three streams based on the above-mentioned interleave blocks. The three streams are decoded by the three MPEG decoders 728*a*, 728*b* and 730 through buffers 735*a*, 735*b* and 736. Then, three signals, i.e., the 480*i* signal 749*a*, the 480*i* differential signal 749*b*, and the 720P differential signal 731 are obtained as a result of demodulation. By subjecting the 480*i* basic signal 749*a* and the 480i differential signal 749*b* to the calculations of (a+b) and (a−b) by a synthesis section 732, a 480P (60 frames/sec.) video signal 729 can be obtained. This signal and the above-mentioned 720P differential signal 731 are synthesized into a 720P output 733*a*. The procedure is described above and will not be repeated.

In this manner, three types of outputs of 480*i* output 749*a*, 480P output 729 and 720P output 733*a* having different resolutions can be obtained from the disk 724*a*. The user can select the output by the grade of the monitor reproduction apparatus. That is, the 480*i* (NTSC) grade output is obtained by the existing reproduction apparatus, the 480P (60 frames/sec.) is obtained by the reproduction apparatus for 480P according to the present invention, and the 720P (60 frames/sec.) is obtained by the reproduction apparatus for 720P according to the present invention. Thus, the complete compatibility is realized.

In FIG. 2, when the identification information processing section 745 detects a high resolution identifier, the rotation rate of the motor is raised through a system control section 21 and a rotation control circuit 35. A high resolution signal can be reproduced by raising the rotation rate in accordance with the identifier. The rotation rate is raised to 1X for reproduction of a standard picture, 2X for 480P and 720P (24P), and 3X to 4X for 720P (60P). The effect of power saving is provided. When an NTSC grade signal is reproduced, the system control section 21 stops or operates, at a low rate, clocks of the 720P MPEG decoder 730, the 480*i* MPEG decoder 728*b*, and the synthesis section 732, which are not necessary. Thus, power consumption can be significantly reduced. When an ATPS 84 of the audio time stamp of audio data is received by an AV synchronization control section 158 and a video presentation time stamp VPTS for each of the MPEG decoders is created based on the time information and set in registers 39*a*, 39*b* and 39*c* of the decoders, frames can be synchronized for reproduction from the decoders. In order to synchronize the vertical blanking, a decoder synchronization section 794 simultaneously resets the horizontal and vertical synchronization of the decoders. The pictures from the decoders can be synchronized on a dot-by-dot basis. Specific synchronization methods of audio and video signals will be described later.

From the disk 724*a*, a first resolution identifier indicating a low resolution of NTSC signals or the like of the picture of the first stream and a second resolution identifier indicating a high resolution of 720P signals or the like of the second and third streams are reproduced. The system control section 21 determines by calculation which processing is to be performed by the up-converter 738 in the synthesis section 732 among 480P to 720P, 480P to 1080i, 480P to 1080P, and 720P to 1080P, and indicates the result to the synthesis section 732. In actuality, various first resolution identifiers exist such as, for example, 704×480 and 720×480. This has an effect that the up-converter operates at the optimum ratio. Needless to say, a simple system structure in which an identifier indicating the ratio of the up-converter is recorded and reproduced can be adopted.

The reproduction apparatus 743*a* in FIG. 2 can output three resolutions of signals (i.e., 480*i* (NTSC) signal of the first stream, 480P (60P) signal 729 of the first and second streams, and 720P (60P) signal 733*a* of the first, second and third streams) simultaneously or at different timing. Such a reproduction apparatus can be used with monitors-having various resolutions.

Especially, since a 480P signal 729 can be converted into a 720P signal by the up-converter 738 of the synthesis section 732, the 720P signal obtained as a result of conversion of the 480P signal can be obtained without adding any circuit.

In the case where a receiving section 753 and a demodulation section 754 are added to the hierarchical reproduction apparatus, a receiving apparatus for receiving a hierarchical signal such as a TV signal, demodulating the signal and outputting three resolutions of video signals can be provided.

(Wide 480P)

Figure 34:
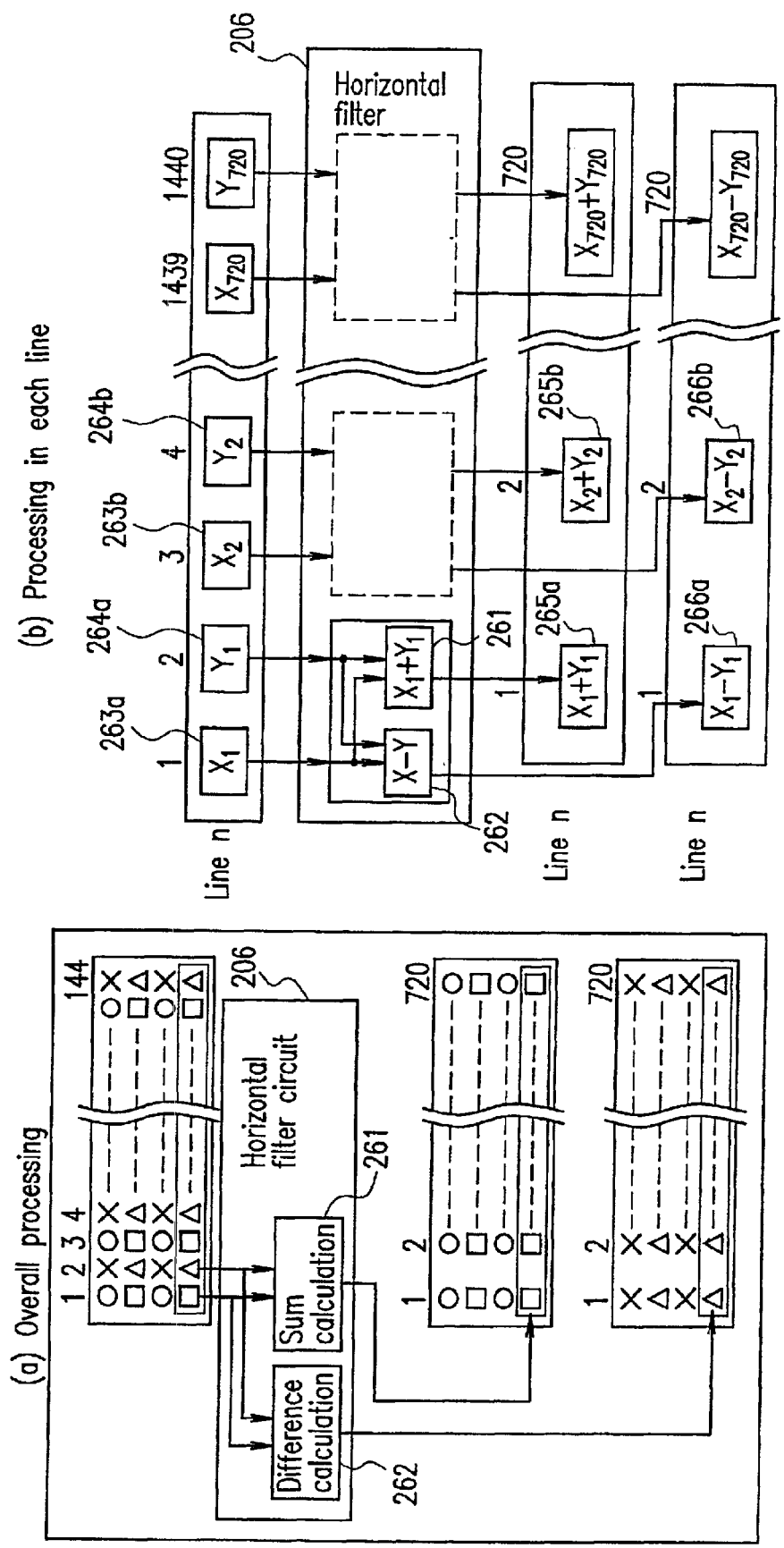
FIG. 34 is a view illustrating processing of a horizontal filter circuit in one example according to the present invention.

With reference to FIG. 21, a concept of the MADM system in which a signal is divided in a horizontal direction is shown. The signal can be converted by a 3-2 conversion section 174 into a 1440×480*i* interlace signal. The signal is divided into two in a horizontal direction by a horizontal filtering section 206*a*. The principle of filtering is shown in parts (a) and (b) of FIG. 34. As shown in part (b), 1440 dots are divided into odd dots 263*a* and 263*b*, and even dots 264*a* and 264*b*. Where the odd dots are labeled as Xn and the even dots are labeled as Yn, a sum signal is obtained by the calculation of X+Y and a differential signal is obtained by the calculation of X−Y. As a result, two 480P or 525*i* signals, each of 720×480, are obtained as shown in part (b) of FIG. 34.

Returning to FIG. 21, the number of horizontal dots of such a horizontal sum signal is reduced to 720. Since the signal is passed through the horizontal filter, however, aliasing distortion is as low as that of an NTSC signal. A conventional reproduction apparatus reproduces only the sum signal and accordingly provides a DVD picture of exactly the same quality. The differential signal represents only a profile formed of line-drawing. However, since the difference signal is restricted by a second video signal output restriction information provision section 179 (FIG. 60) so as not to be reproduced by an ordinary reproduction apparatus, no problem occurs. The sum signal and the differential signal are respectively encoded into MPEG streams by a first encoder 3*a* and a second encoder 3*b*, and subjected to interleaving in units of an interleave block of 1 GOP or more and MADM-multiplexed.

In the case of the movie, 3-2 conversion is performed by the 3-2 conversion 174 section and MADM-recorded as an MPEG signal together with the 3-2 conversion information 174.

In the case of the movie, 24 frames are reproduced in one second. Accordingly, a 1440×480P progressive picture is reproduced based on two interlace signals by a 2X reproduction apparatus. The scope size of the movie is 2.35:1. The format of 1440×480P is suitable for the scope size of 2.35:1 in terms of the aspect ratio. Thus, a wide screen 480P is effectively reproduced.

Figure 4:
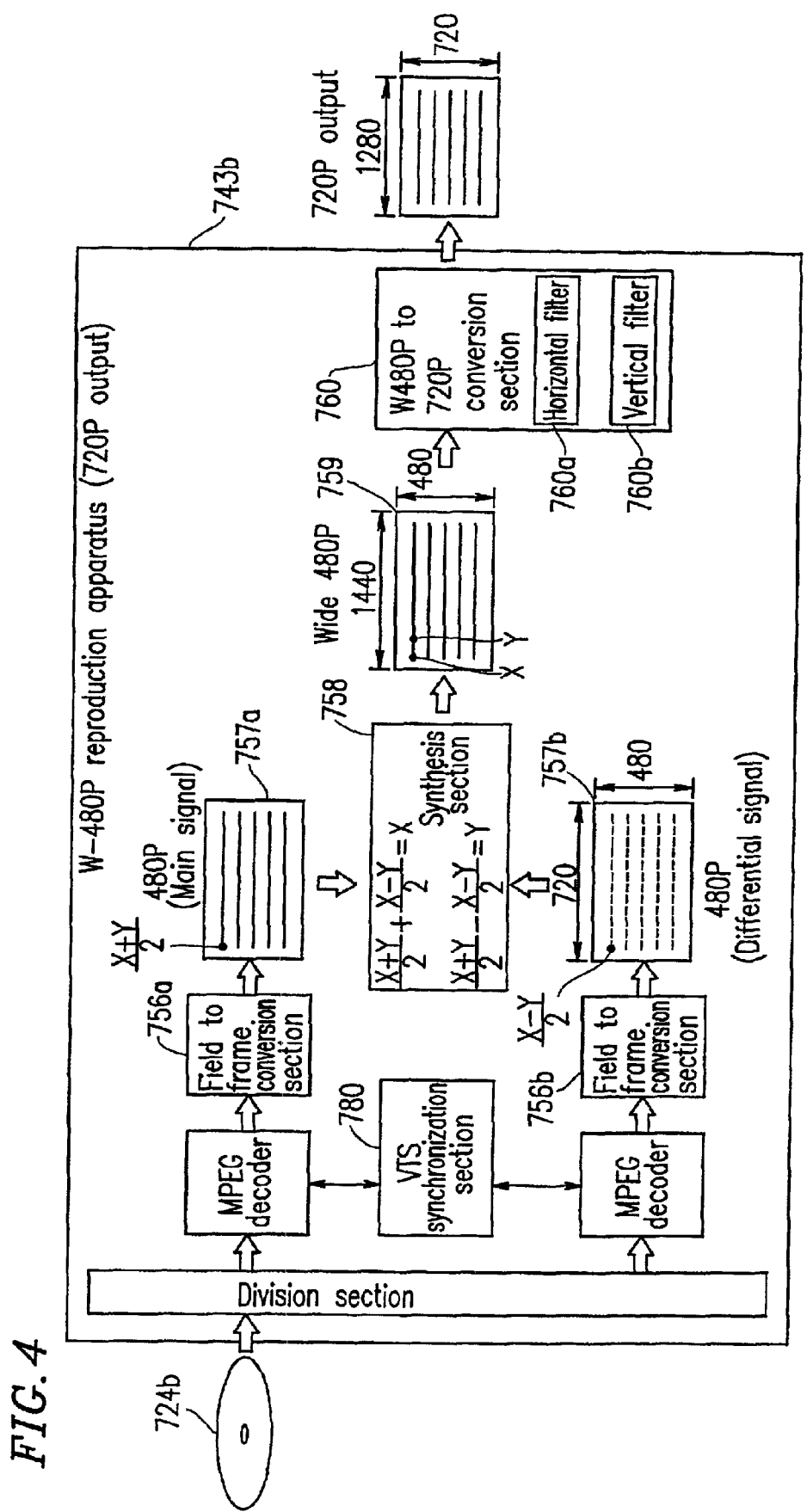
FIG. 4 is a block diagram of a reproduction apparatus (720P output) of horizontal direction synthesis system in one example according to the present invention.

A wide 480*i* hierarchical disk 724*b* is described with reference to FIG. 21 above. With reference to FIG. 4, an operation for reproducing the disk 724*b* by a W-480*i* reproduction apparatus will be described. When the disk 724*b* has information recorded at 24 frames/sec., a W-480P basic signal 757*a* and a W480P differential signal 757*b* are obtained by decoding performed by field frame conversion sections 756*a* and 756*b*. Each pixel is encoded by data obtained by (X+Y)/2 or (X−Y)/2. Accordingly, when a synthesis section 758 performs the calculation of (X+Y)/2+(X−Y)/2, X, i.e., data of odd pixels is obtained by the decoding. When the synthesis section 758 performs the calculation of (X+Y)/2−(X−Y)/2, Y, i.e., data of even pixels is obtained by the decoding. As a result, the number of pixels in the horizontal direction is doubled to 1440 pixels. In this manner, a W480P video signal 759 of 1440×480P pixels is obtained. The W480P video signal 759 of 1440×480P pixels is converted by a W480P-720P conversion section 760 so as to have 1280 pixels in the horizontal direction using a 8/9 horizontal filter 760*a*, and so as to have 720 pixels in the vertical direction using a 3/2 vertical filter 760*b*. As a result, a 720P digital output is obtained. Thus, use of a general 720P digital interface is advantageously allowed.

Figure 25:
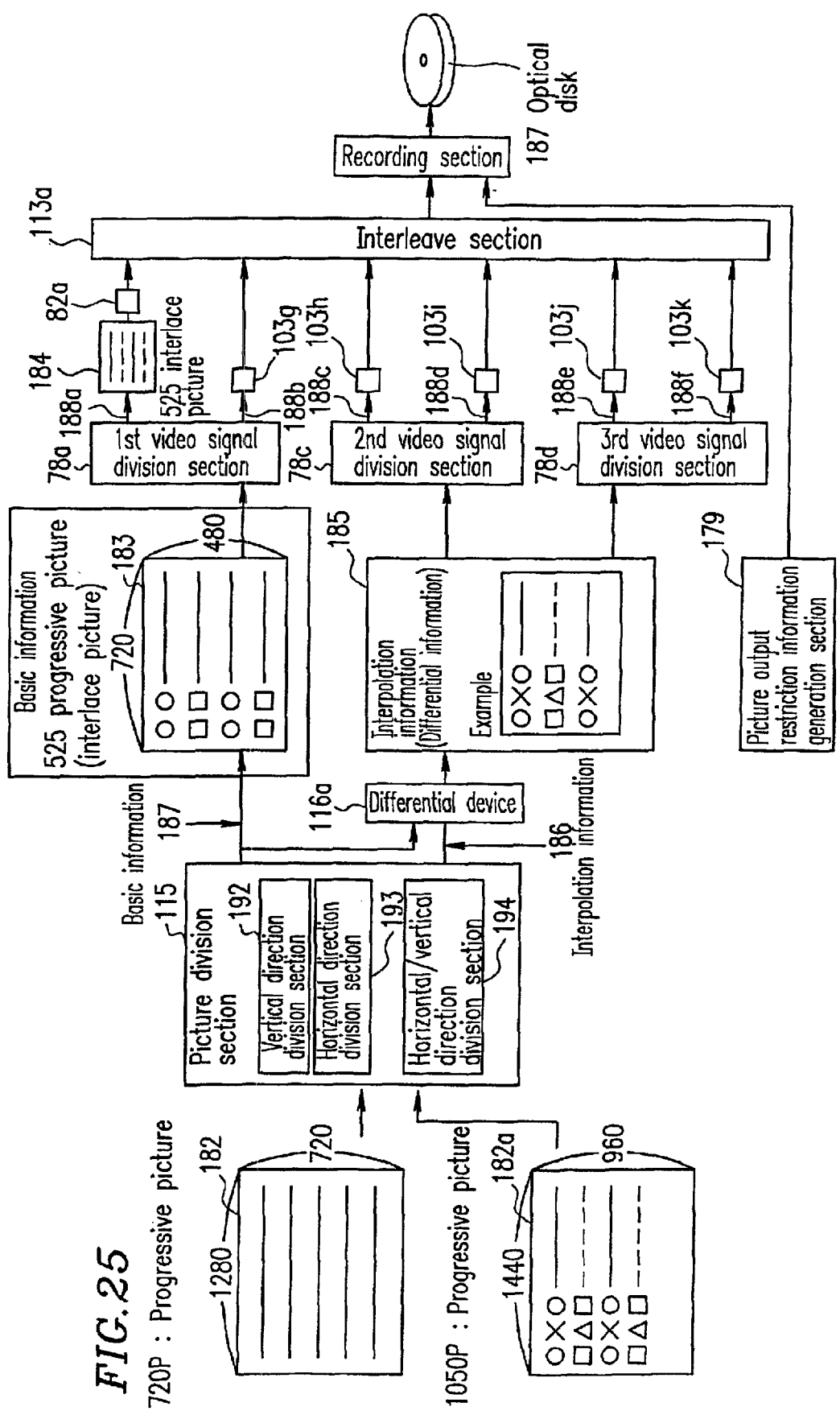
FIG. 25 is a block diagram of a reproduction apparatus in one example according to the present invention in an interlace video signal output mode.

(Detailed Reproduction Operation: FIG. 25)

With reference to FIG. 25, an operation of a reproduction apparatus 65 according to the present invention will be described in detail. FIG. 25 is a block diagram of a reproduction apparatus for reproducing a 2X progressive or super-wide picture or 720P signal. A signal reproduced from an optical disk 1 is divided by a division section 68 into first interleave blocks 66 and second interleave blocks 67 each including a frame signal of 1GOP or more. Frame video signals 70*a* and 70*b* each of 30 frames/sec. obtained as a result of MPEG extension performed by an extension section 69 are respectively divided by field division sections 71*a* and 71*b* into odd field signals 72*a* and 72*b* and even field signals 73*a* and 73*b*. Thus, 2*ch* NTSC interlace signals 74*a* and 74*b* are output. The wide screen shown in FIG. 20 will be described later. Referring to FIG. 25, using the method described above, a 1440×960 progressive picture 182*a* is divided in a horizontal direction using a sub band filter or wavelet conversion by a horizontal and vertical division section 194 in a picture division section 115. Thus, a 525 progressive video signal 183 is obtained. This signal is divided into 525 interlace signals 184 and recorded-as streams 188*a* and the like.

Remaining interpolation information 185 is divided similarly into four streams 188*c*, 188*d*, 188*e* and 188*f* and recorded as interleave blocks. The maximum transfer rate of each interleave block is 8 Mbps by the DVD standards. Accordingly, when the interpolation information is divided into four streams, the transfer rate is 32 Mbps. When the interpolation information is divided into six angles, the transfer rate is 48 Mbps. Thus, a 720P or 1050P HDTV video signal can be recorded. By the conventional reproduction apparatus, the stream 188*a* is reproduced to output an interlace video signal 184. Regarding the streams 188*a*, 188*d*, 188*e* and 188*f*, output restriction information is recorded on an optical disk 187 by a picture processing restriction information generation section 179. Therefore, the interpolation information 185, such as differential information or the like, which is not properly viewable is prevented from inadvertently being output. By dividing the signal in horizontal and vertical directions by the system shown in FIG. 25, an optical disk compatible to both the HDTV and NTSC formats is advantageously realized.

In FIG. 25, the interlace signal obtained by the conversion performed by an interlace conversion section 175 is output to provide a scope screen 178. A 480P progressive signal is similarly output on a scope screen 178. When a monitor for 720P is used, a 480P signal is converted into a 720P progressive signal by a 480P/720P conversion section 176, and as a result, is output on a 1280×720 or 1440×720 letter box type 720P screen 177 (the picture has 1280×480 or 1440×480 pixels). Since the scope picture (2.35:1) has 1128×480 pixels, a picture having a size closer to the aspect ratio is obtained. Especially in the case of a movie, the signal is of 24 frames/sec. and so the progressive picture is transferred at the rate of 4 Mbps. When a scope picture is recorded by the system according to the present invention of dividing the picture into two screens, the transfer rate is 8 Mbps. In such a case, about 2 hours of information can be recorded on a two-layer DVD. Accordingly, a 720P or 480P high quality progressive picture signal for scope screen can be advantageously recorded on one DVD. On a conventional TV screen, the picture is displayed by an interlace output signal, needless to say. The present invention has an effect that a scope screen picture (2.35:1) of the movie can be output as a 480P or 720P signal.

(High Resolution Recording Identification Information)

Returning to FIG. 1, address information is output from an address circuit. A hierarchical recording identifier 725 including progressive/3D picture arrangement information is output from a progressive/3D picture arrangement information output section 725*a*. These pieces of information are recorded on the optical disk by a recording circuit 723. The progressive/3D picture arrangement information includes an identifier which indicates whether or not a progressive or 3D picture is present on the optical disk, the hierarchical recording identifier 725 which indicates whether or not the signal is up-converted when being hierarchy-encoded, or a progressive/3D picture arrangement table 14 shown in FIG. 17. As shown in FIG. 17, a TEXTDT file 83 includes, for each VTS, 3D pictures for the right and left eyes and angle numbers and cell numbers in which the progressive signal is located. Since a PGC file of each VTS includes a start address and a termination address of each cell, the start address and the termination address of each cell are included in the progressive/3D picture arrangement information. Based on the arrangement information and identification information, the reproduction apparatus outputs a progressive picture or a 3D picture correctly as progressive outputs or R and L outputs. When ordinary pictures of different contents from each other are output as R and L outputs in error, the user will feel uncomfortable since the pictures for the right eye and the left eye are not related to each other. The progressive/3D picture arrangement information, the progressive/3D picture identifier, or the hierarchical recording identifier has an effect of avoiding the output of such unpleasant pictures. As shown in FIG. 3, when the hierarchical recording identifier 725 is reproduced, the control section sends an up-conversion instruction 786 to up-convert the a 480P signal into a 720P signal by the up-converter 738. Then, the synthesis of the 720P signal is performed. When the hierarchical recording identifier 725 is not available, a 480P signal is output after performing synthesis calculation without using the up-converter 738 as shown in FIG. 10. In this manner, stable picture synthesis can be performed simply by switching the connection in accordance with whether or not the identifier is available.

With reference to FIG. 23, a process for performing reproduction using a picture identifier 222 will be described.

From the optical disk, reproduction process control information 225 is first read from the management information 224. Since the information 225 includes restriction information on VOB, a 0th VOB 226*a* is only connected to a first VOB 226*b* having a main picture by an existing reproduction apparatus. Since the 0th VOB 226*a* is not connected to a second VOB 226*c* having an interpolation signal such as differential information or the like, an ugly picture such as differential information is prevented from being output by the existing reproduction apparatus as described above. Each VOB of the main signal has a picture identifier. Since the progressive identifier=1 and resolution identifier=00 (525) in the first VOB 226*b* and the second VOB 226*c*, a progressive signal having 525 scanning lines is reproduced from a progressive or HD reproduction apparatus.

In a picture identifier 222 of the next VOB 226*d*, the progressive identifier=0 and the resolution identifier 219=10. This indicates that an interlace signal having 1050 scanning lines is output and that three VOBs 226*e*, 226*f* and 226*g* are interpolation information. Thus, an NTSC signal is output by a conventional reproduction apparatus, an interlace signal having 720 horizontal pixels and 1050 vertical pixels is output by a progressive reproduction apparatus, and a full HDTV-format signal having 1050 scanning lines is output by a HD reproduction apparatus. As can be appreciated from this, various video signals can be recorded in an interleave manner and reproduced by the picture identifier 222. The picture identifier 222 can be recorded in the management information 224.

(2X Clock and Soft-Decoding)

Figure 18:
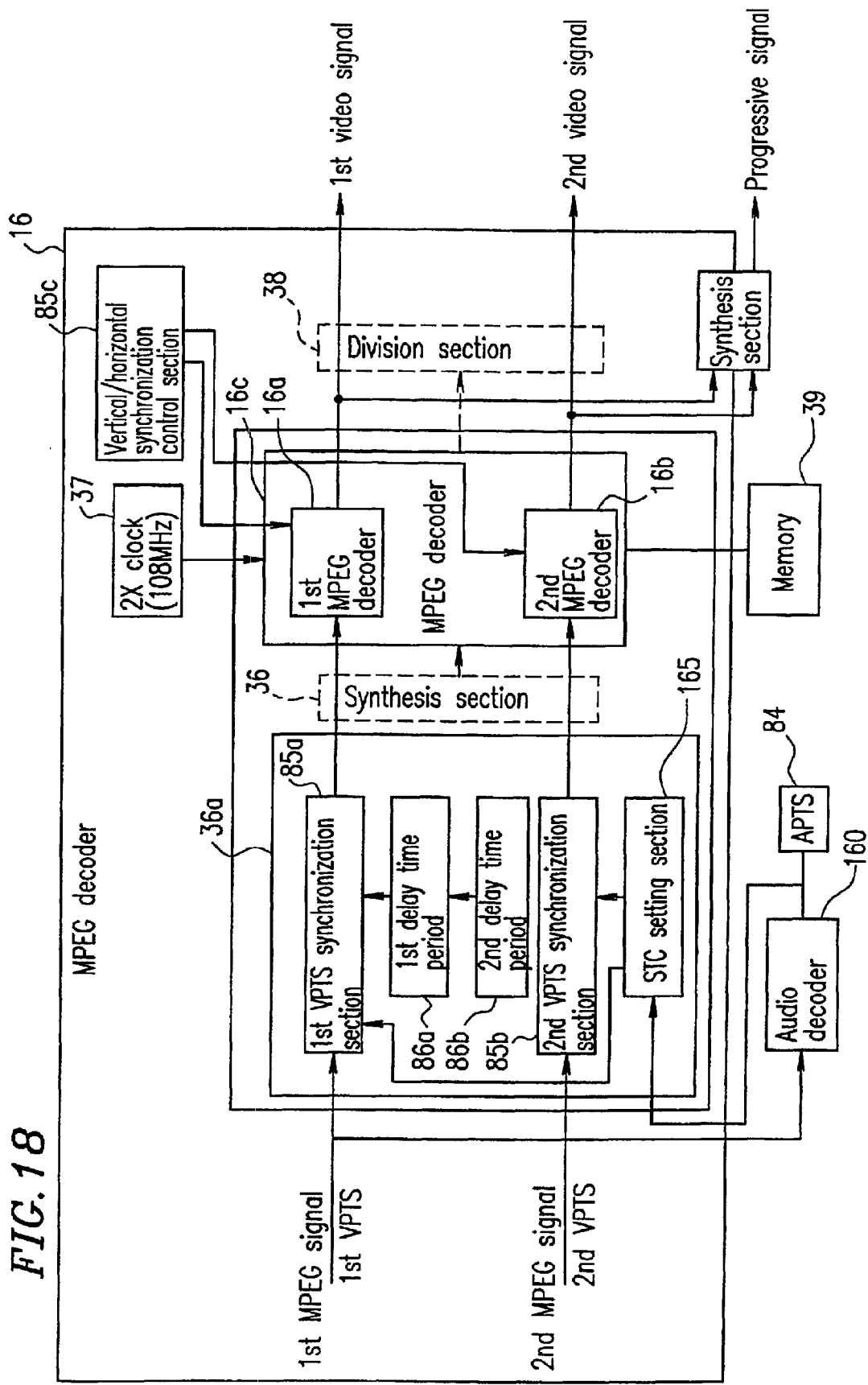
FIG. 18 is a block diagram showing an MPEG decoder of a reproduction apparatus of a different system in one example according to the present invention.

In the block diagrams shown in FIGS. 3 and 4, two MPEG decoders are used. In FIG. 18, a first MPEG signal and a second MPEG signal are synthesized into one MPEG signal by a synthesis section 36, and a 2X clock is generated by a 2X clock generation section 37. The MPEG signal is doubled by a 2X clock-type MPEG decoder 16*a*, extended, and output as R and L video signals by a division section 38. In this manner, the circuit configuration can be simplified. This circuit configuration is realized simply by adding a 16 MB SD-RAM to a memory 39 of the existing reproduction apparatus, without significantly raising the cost. For softdecoding, when a CPU has a 2X clock, one CPU realizes simultaneous decoding by time division. This will be described in a second example.

(Simultaneous Reproduction)

Figure 26:
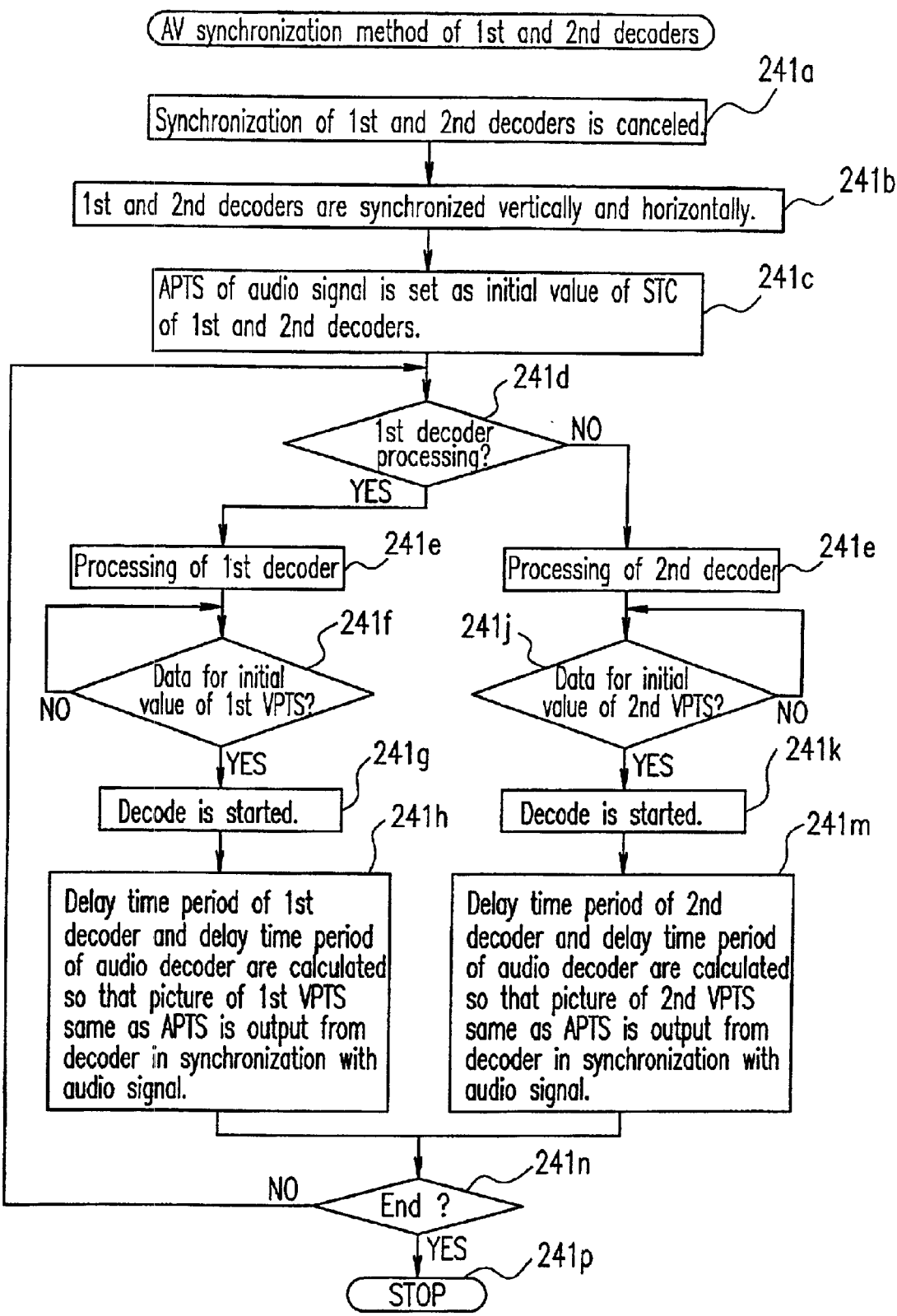
FIG. 26 is a flowchart illustrating a method for performing AV synchronization of a first decoder and a second decoder in one example according to the present invention.

With reference to FIG. 18, synchronous reproduction of two streams, which is important in decoding 3D picture data and progressive picture data will be described. First, it is necessary to adjust vertical and horizontal synchronization of two streams within a single line. In order to do this, a first MPEG decoder 16*a* and a second MPEG decoder 16*b* are started substantially simultaneously by a vertical/horizontal synchronization control section 85*a* to synchronize the decoders 16*a* and 16*b*. Then, it is necessary that the outputs from the two decoders should be a picture having an identical VPTS. This will be described with reference to the flowchart in FIG. 26 and FIG. 18. In step 241a, the synchronization of a first decoder and a second decoder is cancelled. In step 241b, the decoders are synchronized with each other vertically and horizontally as described above. In step 241c, an APTS of an audio signal is read, and the APTS value is set as an initial value of an STC of the first decoder and an STC of the second decoder. In step 241e, processing of the first decoder is started. In step 241f, it is checked whether or not a first VPTS has reached the initial value. If yes, decoding is started in step 241g. In step 241h, a processing delay time period of the first decoder is calculated, and the VPTS of the decoder output is adjusted so that the APTS and the VPTS are synchronized with each other. Since the second decoder is processed in the same manner, the picture from the first decoder and the picture from the second decoder are synchronized with each other. Thus, the decoder outputs, i.e., the first MPEG signal and the second MPEG signal are synchronized within one line. Then, the synchronization on a dot-by-dot basis is obtained by a video signal synchronization section 36a of the synthesis section 36. An original progressive picture is obtained even by a sum calculation. As shown in FIG. 5, in the case where an APTS 84 is read by the audio decoder 16c and an identical APTS is set in registers 39a and 39b of the STCs of the two MPEG decoders 16a and 16b, an audio stream and the two video stream are automatically synchronized with one another.

Figure 27:
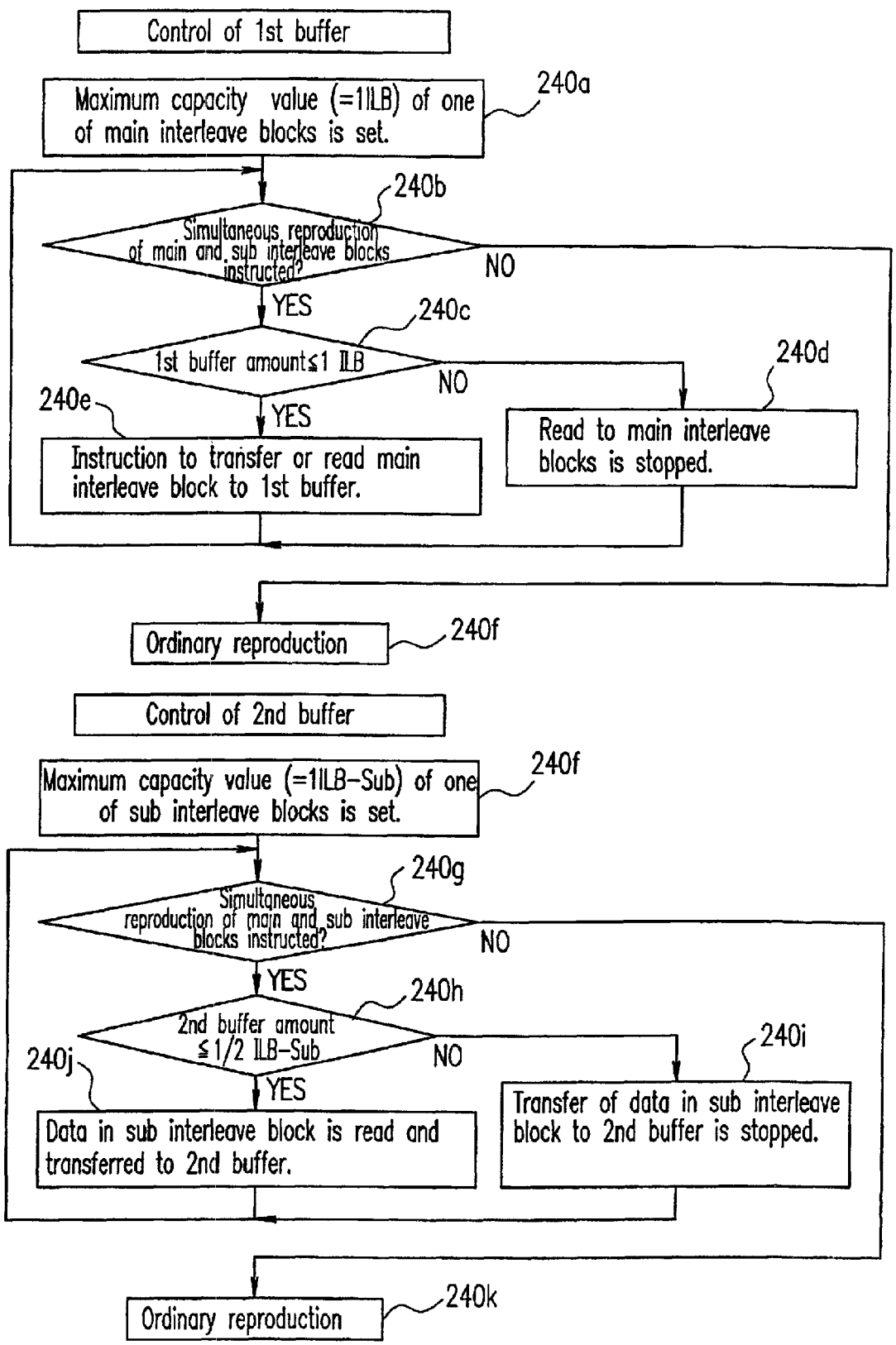
FIG. 27 is a flowchart illustrating a method for controlling two buffer sections in one example according to the present invention.

In the present invention, when the buffer circuits 23a and 23b underflow, either one of the pictures is disconnected, as a result of which a disturbed progressive picture is output. In order to avoid this, the buffer amounts of the two buffer circuits are controlled by a buffer amount control section 23a as shown in FIG. 2. This operation is illustrated in the flowchart shown in FIG. 27. First, in step 240a, a maximum interleave value among the NAVI information of each disk is read, and a maximum value of 1 ILB in one main interleave block is set. The maximum value is usually 512 sectors, i.e., about 1 MB. When the maximum value is set below 1 MB by a specific format, that value is set as the maximum value. Next, when an instruction to simultaneously reproduce the main and sub interleave blocks is issued in step 240b, if the buffer amount of the first buffer circuit 23a is 1 ILB or less in step 240c, an instruction to reproduce the data from the main interleave block and transfer the data to the first buffer circuit 23a is issued. Then, the processing goes back to steps 240b and 240c. The transfer is stopped in step 240d when the buffer amount of the first buffer circuit exceeds 1ILB. Since the data in the buffer circuit 23a becomes 1ILB or more in this manner, underflow is prevented.

In step 240f, a maximum value of a sub interleave block of 1 ILB-Sub is set in the buffer circuit 23b. Simultaneous reproduction is performed in step 240g. When the data in the second buffer circuit 23b is ½ ILB-Sub or less in step 240h, data is read into the buffer circuit in step 240j. When the data is more than ½ ILB-Sub, the reading is stopped in step 240i.

Figure 24:
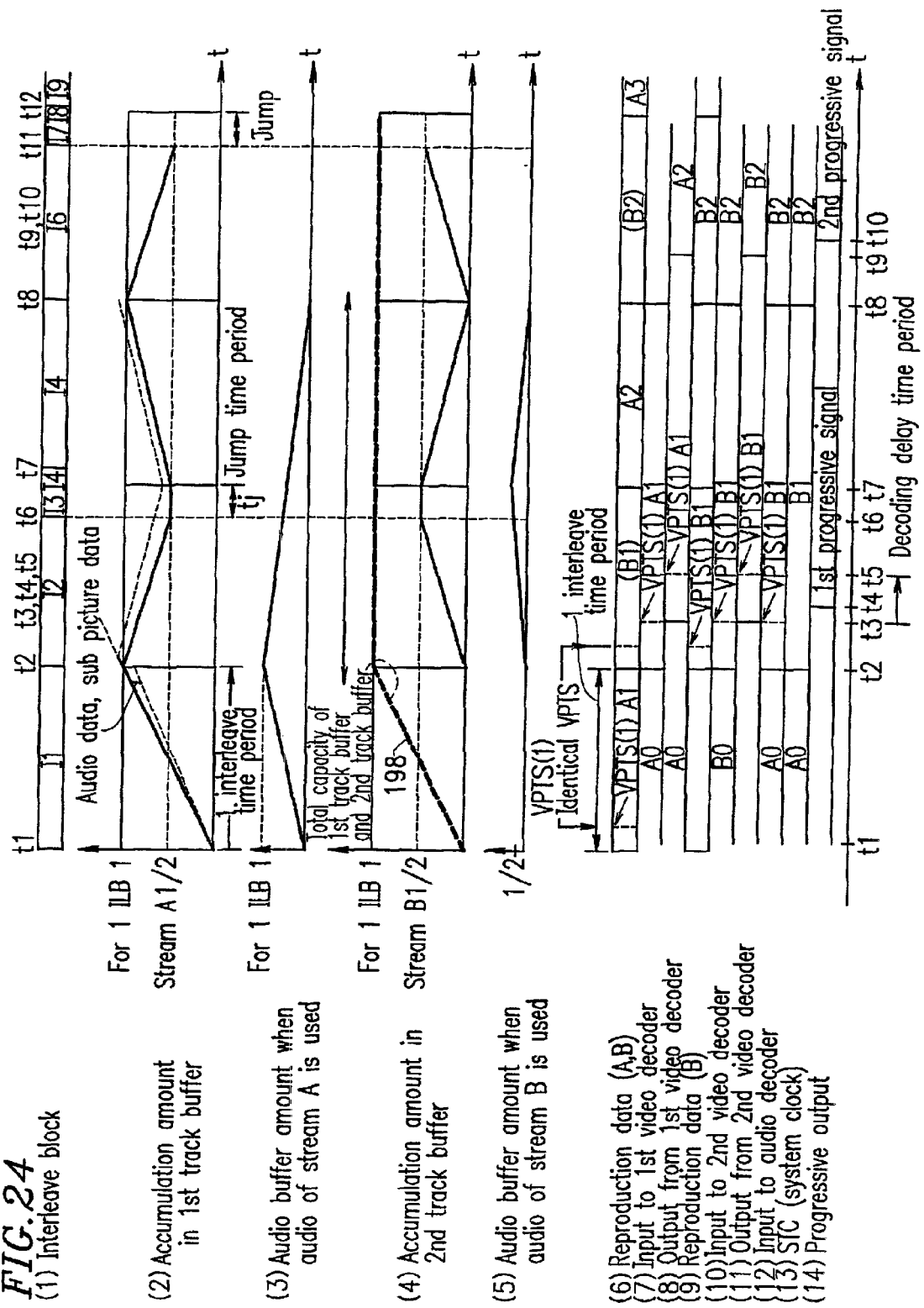
FIG. 24 is a timing diagram of reproduction of progressive, 3D and wide signals with respect to the data amount in buffer in one example according to the present invention.

As shown in part (4) of FIG. 24, the data amount of ½ ILB is sufficient in the second buffer circuit. Accordingly, the buffer amount can be reduced to half. The buffer control in FIG. 27 eliminates the underflow of the buffer circuits, thus reducing disturbance in the synthesized picture during reproduction.

Figure 31:
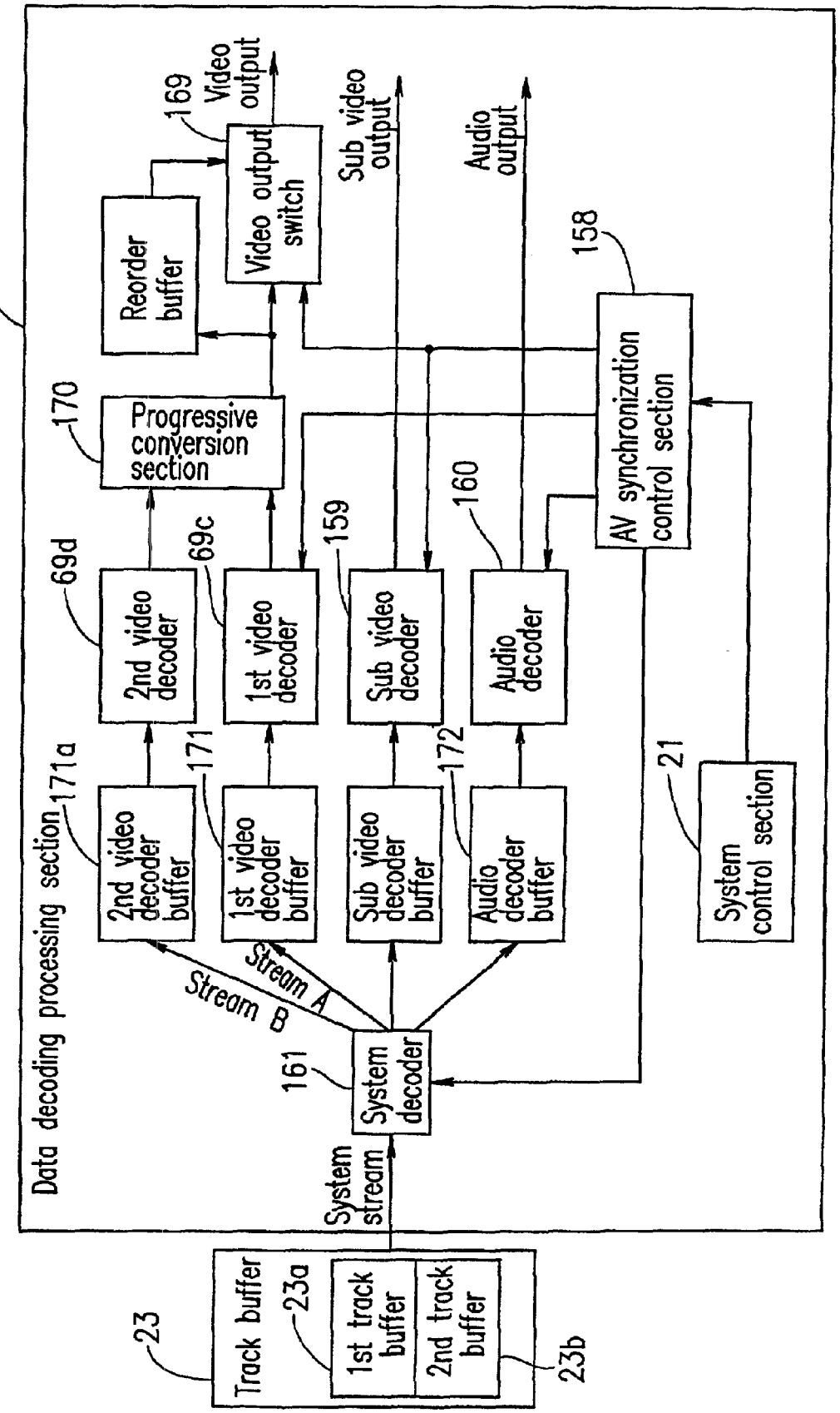
FIG. 31 is a block diagram of a data decoding section in one example according to the present invention.
Figure 32:
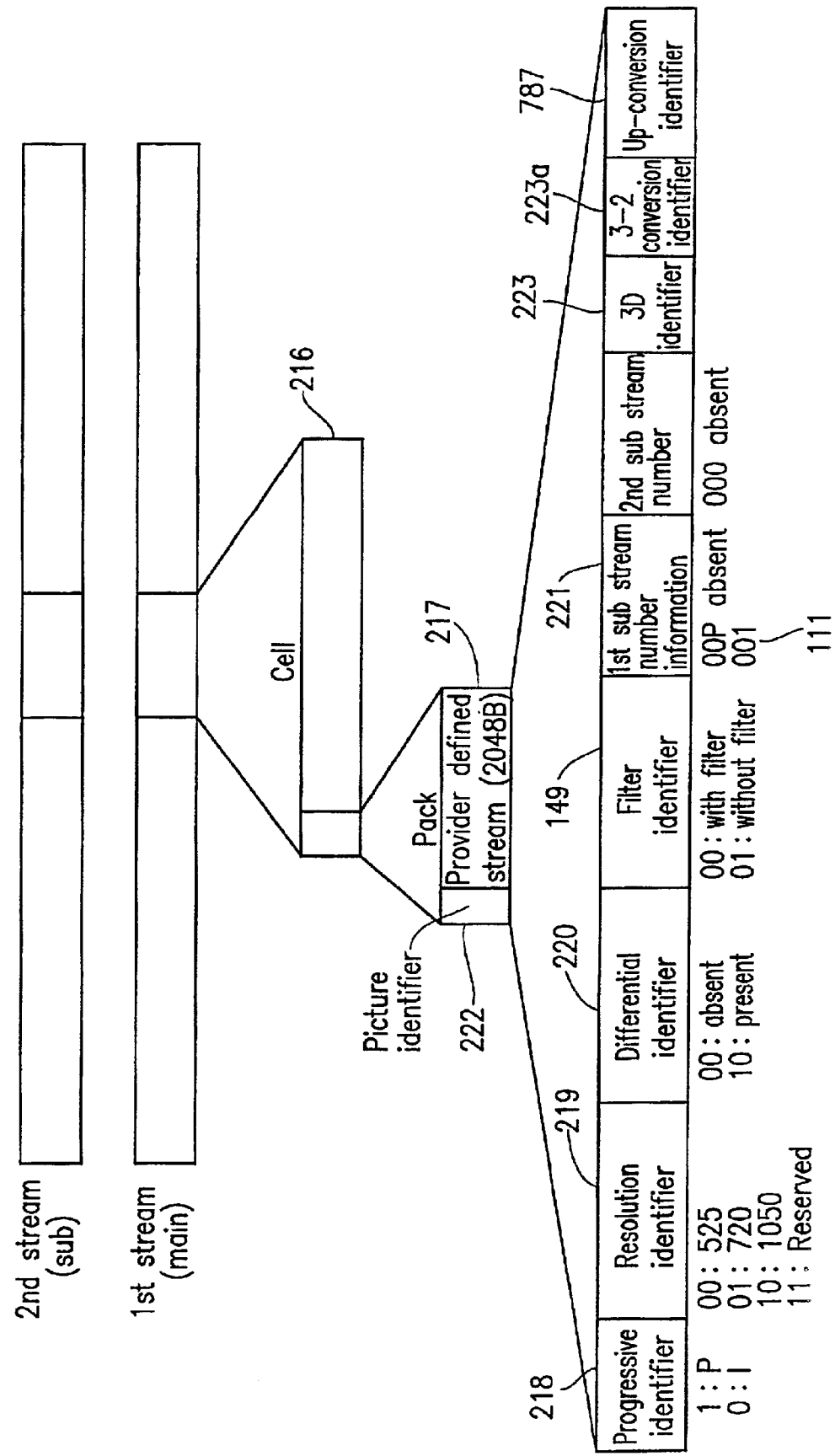
FIG. 32 shows a signal format of a picture identifier in one example according to the present invention.

(Required Capacity of the Track Buffer: FIGS. 23 and 31)

Figure 39:
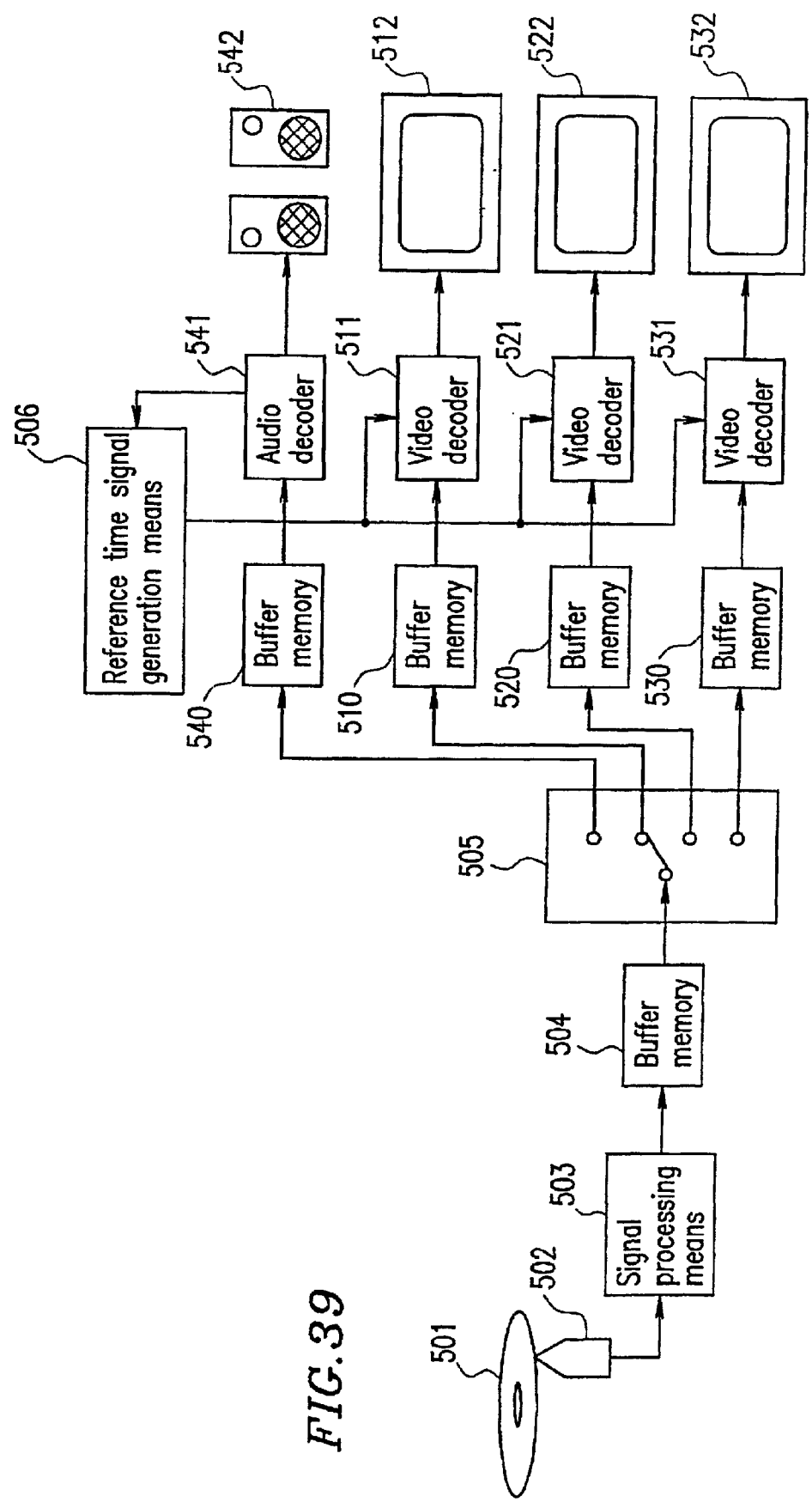
FIG. 39 is a block diagram showing a structure of an optical disk reproduction apparatus in one example according to the present invention.

First, a method for synchronizing two video streams according to the present invention will be described. First, as shown in FIG. 39, a system reproduced from the optical disk is once accumulated in a track buffer 23 and then sent to a first video decoder 69d and a second video decoder 69c. In the track of the optical disk, a first stream A and a second stream B of the progressive signal are alternately recorded on an interleave block-by-interleave block basis.

First, the stream A is reproduced at 2X rotation, and data accumulation in a first track buffer 23a in the track buffer 23 is started. As shown in part (1) of FIG. 24, when t=t1 to t2, data for 1 interleave block (ILB) I1 of the first video signal for 1 interleave time T1 is accumulated. A first track buffer data amount is increased, and becomes equal to 1 ILB at t=t2. Thus, data accumulation for 1 ILB of the first video signal is completed. At t=t2, after accumulation of data for 1 ILB of the first video signal corresponding to 1 GOP or more is completed, the second video signal (stream B) is reproduced from the optical disk starting from the interleave block 12. As shown in the solid line in part (4) of FIG. 24, data accumulation of the second video signal in a second track buffer 23b is started at t=t2 and continued until t=t6. From t=t2 through t8, as shown in parts (7) and (10) of FIG. 24, the video presentation time stamps (VPTS) of the first video signal and the second video signal are synchronized and respectively sent to the first video decoder 69a and the second video decoder 69d from the track buffer 23a and the track buffer 23b. As shown in parts (8) and (11) of FIG. 24, the input signals are output as two pieces of video data after being extended by the first and second video decoders 69a and 69d. The output of these pieces of data starts at t=t3, which is delayed by a video delay time period twd, which is required for MPEG extension of the data. From t=t4 through t10, the streams A and B are synthesized into a progressive signal by a progressive conversion section 170. Thus, a progressive signal for one interleave block is output.

As described above, from t=t2 through t8, data for one interleave block is input to the decoders. Accordingly, the data in the first track buffer 23a and the data in the second track buffer 23b are consumed and reduced at substantially the same rate. Therefore, as shown in part (2) of FIG. 24, the data amount in the first track buffer is reduced from t=t2 through t7. At t=t7, the data amount is ½ of 1 ILB. Since data reproduction for the interleave block I5 starts at t=t7, the data amount increases until t=t8, when the data amount reaches 1 ILB. Since data input to the first decoder 69c starts at t=t8 as at t=t2, the data amount reduces until t=t11. Finally, the buffer memory amount becomes ½ ILB.

With reference to part (4) of FIG. 24, a change in the memory amount in the second track buffer 23a for stream B will be described. At t=t2, input of data B1 for the interleave block 12 of stream B in the second track buffer 23b starts. At the same time, transfer of data B1 to the second video decoder 69d starts. Accordingly, the buffer amount at t=t6 is ½ ILB. When 2-angle recording of a progressive signal according to the present invention is performed, it is necessary to perform a track jump to the interleave block 15 over the interleave blocks 13 and 14 from time t=6 to t=7 since there are four streams, i.e., four interleave blocks. During the jump period 197 (tj), data input from the optical disk is interrupted. Thus, the buffer amount of the stream B is reduced until t=t8, when the buffer amount is close to zero.

Since input of data B2 of the interleave block 16 starts at t=t8, the buffer amount starts increasing again. At t=t11, the memory amount of the second track buffer is ½ ILB. At t=t11, a track jump to the interleave block 19 of A3 over the interleave blocks I7 and I8 is performed.

The above-described operation is repeated.

Now, the minimum necessary memory capacity for a track buffer 23 (total capacity of the first and second track buffers 23a and 23b) according to the system of the present invention will be described. A track buffer capacity 198 indicated by the dotted line in part (4) of FIG. 24 shows the total data amount in the first and second track buffers 23a and 23b. A continuous reproduction is realized by setting the total capacity of a minimum 1 ILB in the track buffer.

According to the present invention, the total capacity of the track buffers 23a and 23b is set to be 1 interleave block or more for reproduction of a progressive signal. Thus, overflow and underflow of the track buffer are prevented.
(Method for Control the System Clock)

A method for switching the system clock STC between two streams will be described with reference to FIG. 28. A progressive signal includes two streams A and B. Here, the streams of two interlace signals forming a 1 ILB progressive signal are referred to as A1 and B1. As shown in part (1) of FIG. 28, data A1 for stream A is reproduced during the ½ ILB time period and all the data is recorded in the buffer. Then, as shown in part (2) of FIG. 28, data for stream B is reproduced as B1 and stored in the buffer after A1 is reproduced. Since the data reproduced from the optical disk is restricted with stream B (part (2) of FIG. 28) as described above, the track buffer does not overflow. Stream A (part (3) of FIG. 28) or stream clock (SCR) from the track buffer for stream B is reset substantially in synchronization with the start point J of the reproduction of stream B (part (2) of FIG. 28). Since stream B is output at the rate of 2X, the stream clock is counted at the rate of 1X as shown in part (3) of FIG. 28, i.e., at half the rate of stream B due to the buffer. At point G, the stream clock is reset. Time VPTS2 at which the video signal for stream B is output from the video decoder needs to be synchronized in consideration of the delay time period Tvd due to, for example, MPEG decoding time period. In this case, at point I (t=Ti), when the VPTS stops rising, AV synchronization control is restarted. By checking VPTS2 of stream B and synchronizing VPTS1 of stream A to VPTS2, synchronization is realized by one-system simple control. VPTS1 can be used additionally.

Figure 28:
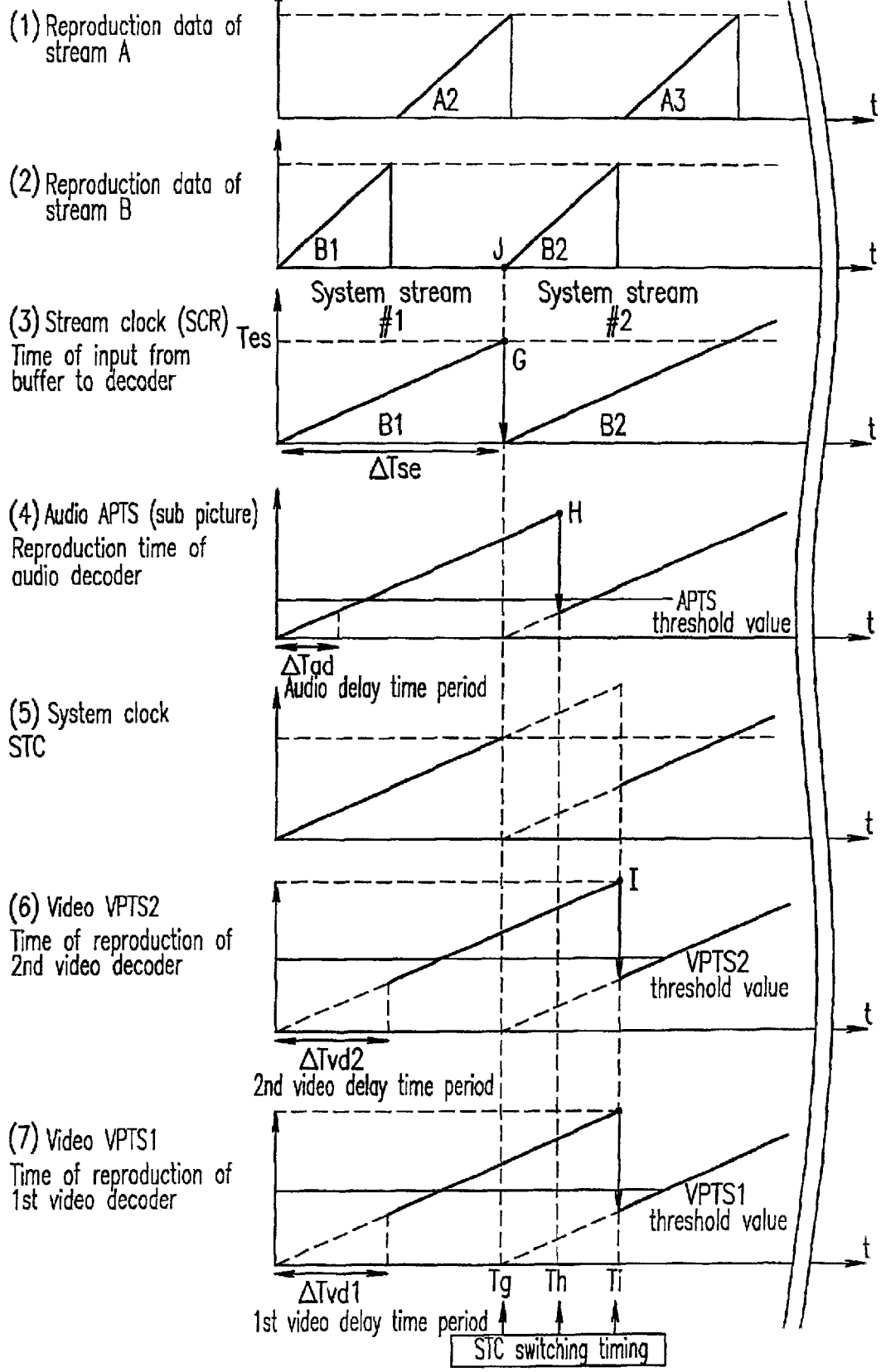
FIG. 28 is a timing diagram showing a data stream which is reproduced and output after processed with buffering and decoding by the decoder in one example according to the present invention.

Audio data of synchronizing stream B is reproduced and the system clock is switched at point H using APTS of stream B as shown in part (4) of FIG. 28. Regarding a sub picture signal of stream B, the STC can be switched in a similar manner.

By using data of stream B with priority, AV synchronization is realized with simple control.

Since all the data in streams A1 and A2 is stored in the buffer memory, the buffer memory does not overflow. Stream B1 may possibly overflow. However, according to the present invention, the synchronization control is performed using stream B and thus the system clock is switched to control the signal flow so that VPTS2 does not exceed the VPTS2 threshold level as shown in part (6) of FIG. 28. Therefore, the buffer does not overflow.

According to the present invention, the audio signal of stream B is used for audio reproduction. Therefore, the buffer amount of audio decoder is reduced to ½. Furthermore, by switching the system clock at point H (t=Th) as shown in part (4) of FIG. 28, the audio signal is reproduced smoothly without exceeding the APTS threshold level. The sub picture information is also reproduced with smooth synchronization. Accordingly, picture, audio and sub picture (subtitles or the like) signals are synchronized, and picture and audio are reproduced seamlessly with no interruption. The audio signal and the sub picture signals of stream A can be omitted.
(AV Synchronization: FIGS. 29, 30, 31 and 33)

AV synchronization, which is especially important for connection and the like when a jump is performed to reproduce two or three streams simultaneously, will be described. This is important in the present invention, according to which the streams of the 720P signal and the 480i signal, which are significantly different from each other in the data amount, are synchronized.

Figure 29:
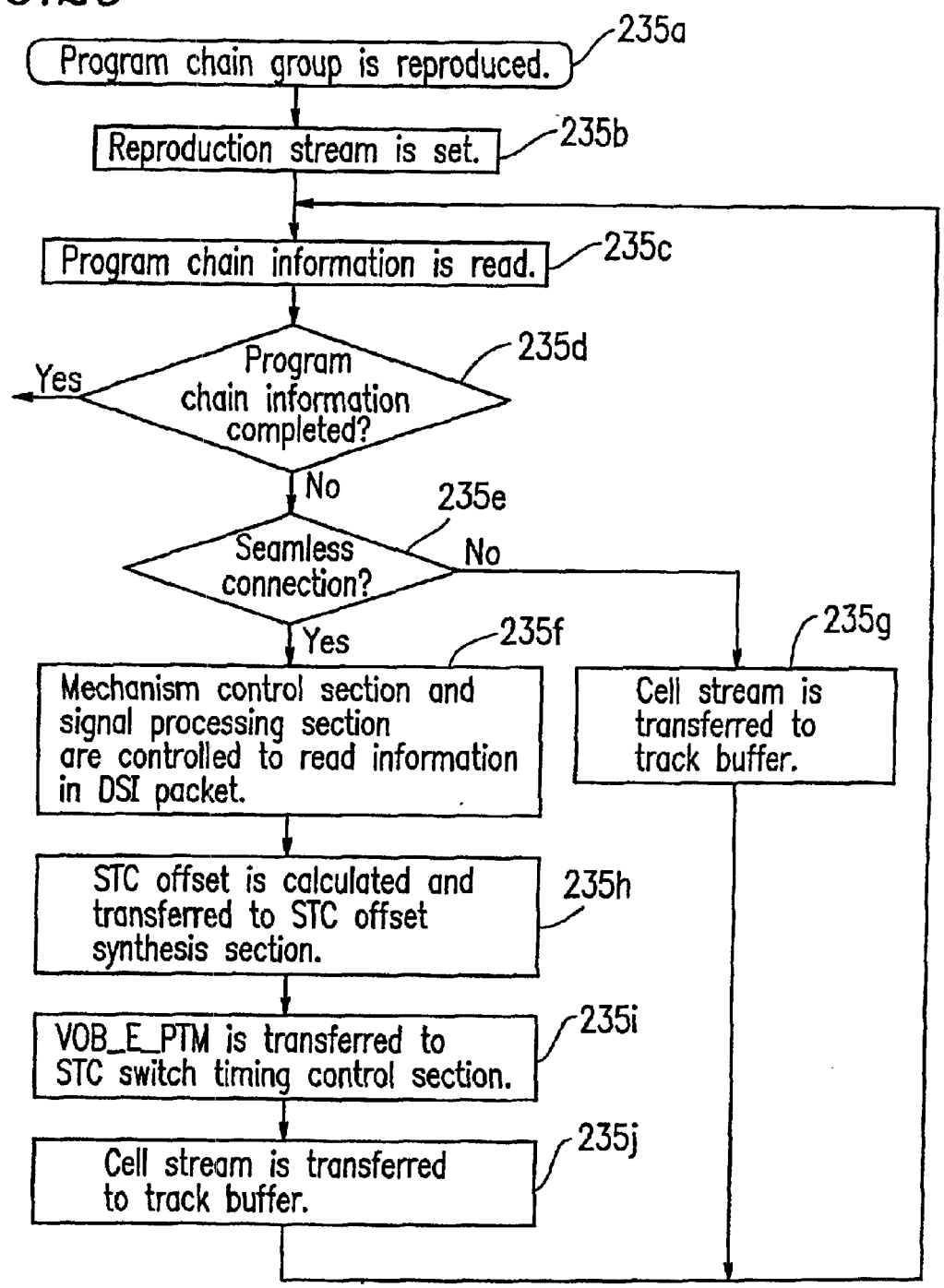
FIG. 29 is a flowchart showing a detailed process for reproducing a program chain group by a system control section M1-9 in one example according to the present invention.

FIG. 29 is a flowchart showing the detailed process of reproduction of a program chain group performed by the system control section 21. As shown in FIG. 29, in steps 235a, 235b and 235c, the system control section 21 reads corresponding program chain information from the volume information file or a program chain information table of the video file. When the program chain is not completed in step 235d, the processing advances to step 235e.

In step 235e, it is determined whether or not the current cell and the immediately previous cell should be connected seamlessly referring to seamless connection instruction information for the cell to be transferred next in the program chain information. If seamless connection is necessary, the processing goes to step 235f for seamless connection processing. If not, ordinary connection is performed.

In step 235f, the mechanism control section and the signal processing section, for example, are controlled to read DSI packets, so that VOB reproduction end time (VOB_E_PTM) in the DSI packet of the cell which has been transferred and VOB reproduction start time (VOB_S_PTM) in the DSI packet of the cell to be transferred next are read.

In step 235h, "VOB reproduction end time (VOB_E_PTM) -VOB reproduction start time (VOB_S_PTM)" is found by calculation. The resultant value is sent to an STC offset synthesis section 164 in the AV synchronization control section 158 in FIG. 30 as an STC offset value between the current cell and the immediately previous cell which has been transferred.

Simultaneously, in step 235i, VOB reproduction end time (VO_E_E_PTM) is transferred to an STC switch timing control section 166 as switching time T4 for an STC switch 162e.

The system control section 21 then instructs the mechanism control section to continue reading data up to the terminal position of the current cell. Thus, the data for the current cell is transferred to the track buffer 23 in step 235j. Upon completion of the transfer, the program chain information is read in step 235c.

If it is determined the seamless connection is not necessary in step 235e, the data is transferred to the track buffer 23 up to the end of the system stream, and then program chain information is read in step 235c.

Hereinafter, two examples of a method for AV synchronization control for seamless connection to perform seamless reproduction will be described. In other words, the AV synchronization control section 158 shown in FIGS. 2 and 31 will be described in detail.

Figure 30:
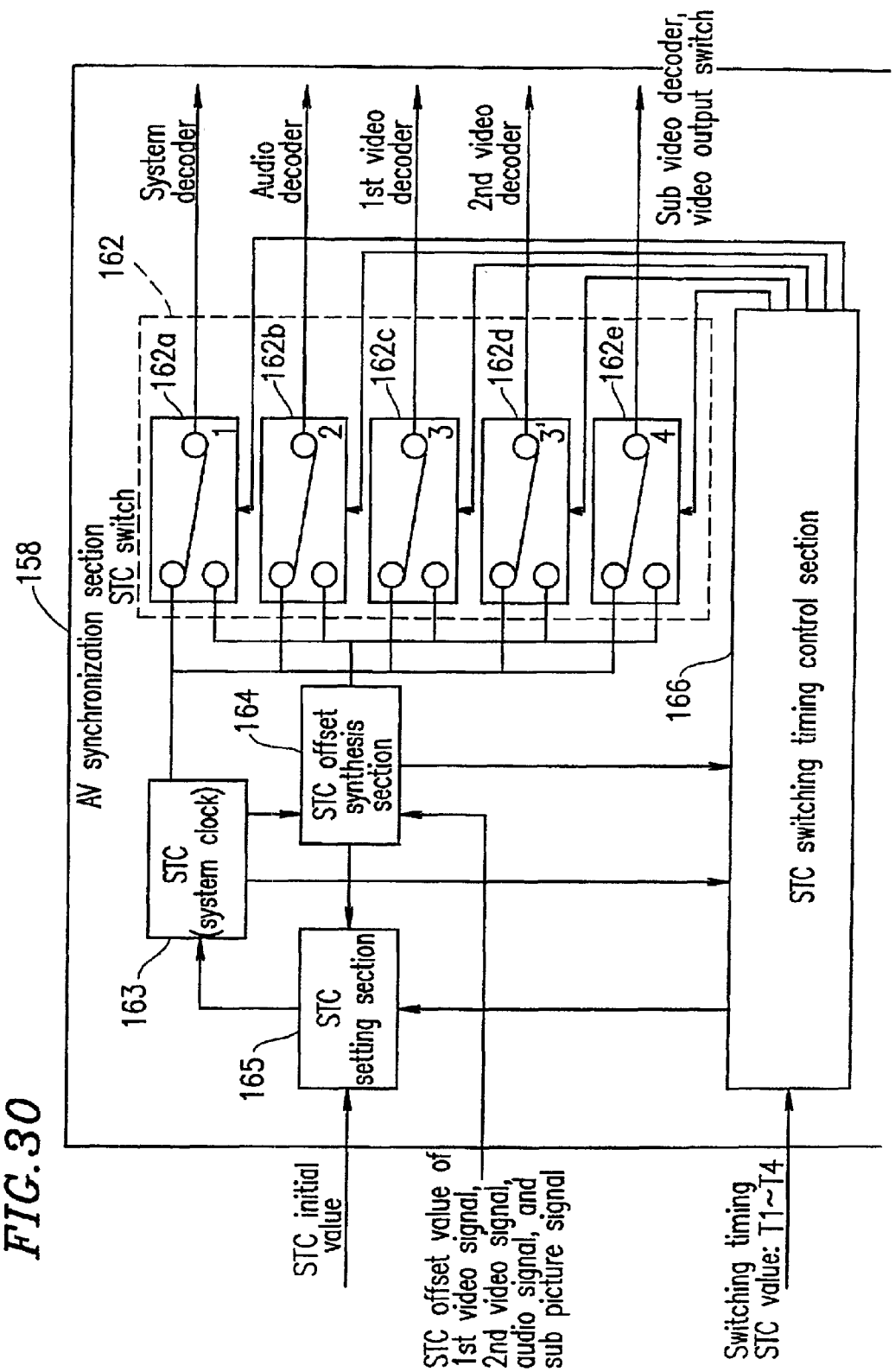
FIG. 30 is a block diagram showing a structure of a part of an AV synchronization control 12-10, the part performing AV synchronization, in one example according to the present invention.

Referring to FIG. 31, a system decoder 161, an audio decoder 160, video decoders 69a and 69d, and a sub picture decoder 159 are all synchronized to a system time clock given by the AV synchronization control section in FIG. 30 to process the data in the system stream.

Regarding a first method, the AV synchronization control section 158 will be described with reference to FIG. 30.

In FIG. 30, the AV synchronization control section includes STC switches 162a, 162b, 162c and 162d, an STC 163, an STC offset synthesis section 164, an STC setting section 165 and an STC switch timing control section 166.

The STC switches 162a, 162b, 162c, 162d and 162e switch between an output value of the STC 163 and an output value of the STC offset synthesis section 164 as a reference clock to be provided to the system decoder 161, the audio decoder 160, the main video decoder 69c, the sub video decoder 69d and the sub picture decoder 159, respectively.

The STC 163 is a reference clock of the entire MPEG decoder shown in FIG. 31 in ordinary reproduction.

The STC offset synthesis section 164 continues outputting a value obtained by subtracting the STC offset value provided by the system control section from the value of the STC 163.

The STC setting section 165 sets an STC initial value given by the system control section or an STC off set synthesis value given by the STC offset synthesis section 164 in the STC 163 at the timing given by the STC switch timing control section 166.

The STC switch timing control section 166 controls the STC switches 162a through 162e and the STC setting section 165 based on STC switch timing information given by the system control section, the STC 163, and the STC offset synthesis value given by the STC offset synthesis section 164.

The STC offset value is an offset value used for changing the STC value when system stream #1 and system stream #2 having different STC initial values are continuously reproduced.

The STC offset value is specifically obtained by subtracting the "VOB reproduction start time (VOB_S_PTM)" described in the DSI of system stream #2 to be reproduced next from the "VOB reproduction end time (VOB_E_PTM)" described in the DSI packet of system stream #1 reproduced first. The information regarding the display of such a value is pre-calculated by reading data from the optical disk in FIG. 5 by the system control section 167 when the data is input to the track buffer 23.

The calculated offset value is supplied to the STC offset synthesis section 164 before the last pack of system stream #1 is input to the system decoder 161.

Except for seamless connection control, the data decoding processing section 165 in FIG. 5 operates as an MPEG decoder. The STC offset value given by the system control section 21 is 0 or an arbitrary value. The STC switches 162a through 162e are always selected to be connected to the STC 163.

Figure 33:
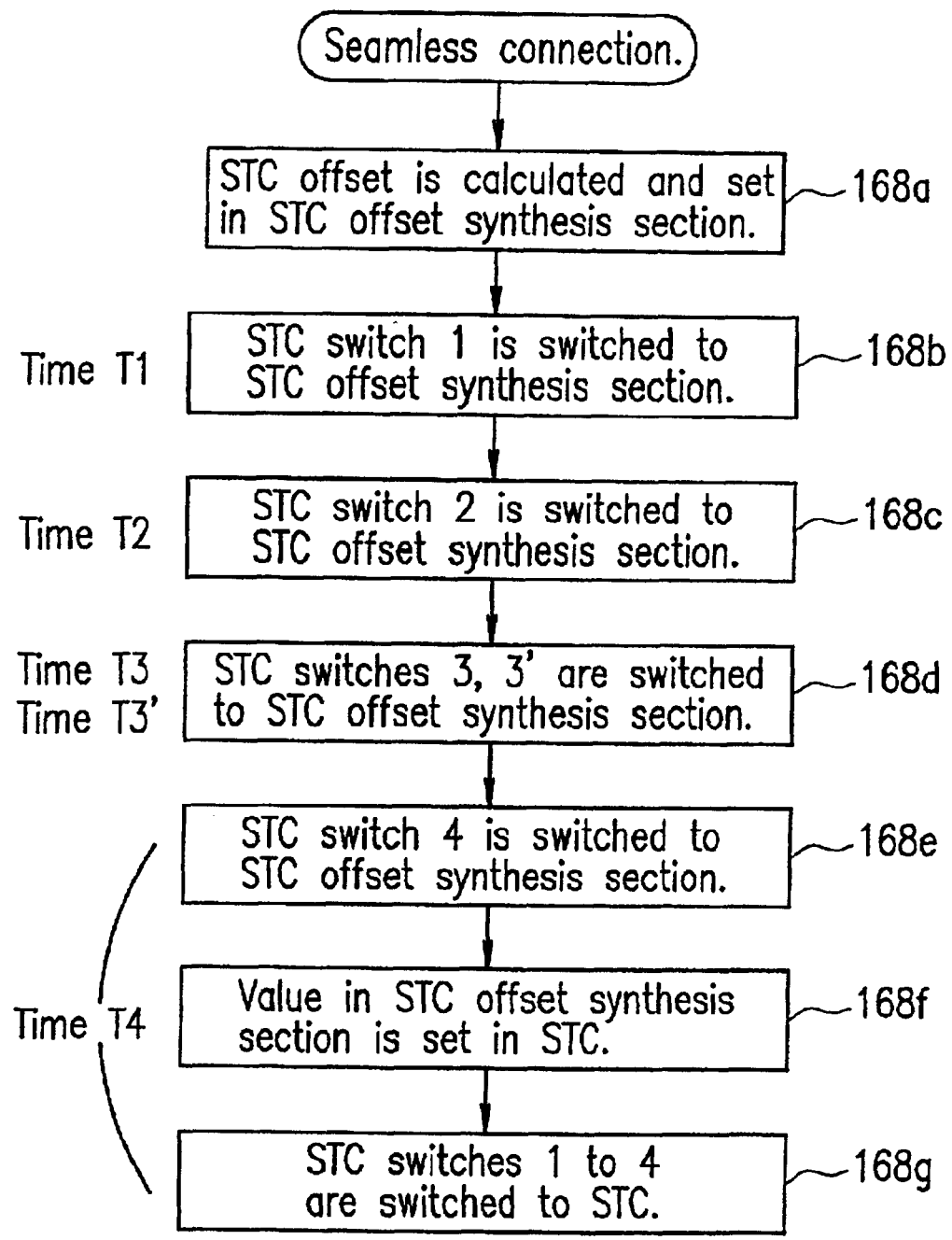
FIG. 33 is a flowchart illustrating a process for STC switching for seamless connection in one example according to the present invention.

With reference to the flowchart in FIG. 33, switching of the STC switches 162a through 162e in the connection part of the system control section and an operation of the STC 163 when two system streams having non-continuous STC values, such as system streams #1 and #2, are continuously input to the system decoder 161, will be described.

The SCR, APTS, VPTS and VDTS of the system streams #1 and #2 to be input will not be described.

It is assumed that in the STC 163, an initial STC value corresponding to system stream #1 which is being reproduced is set by the STC setting section 165, and the value is sequentially counted up in accordance with the reproduction. The system control section 21 (FIG. 31) calculates the STC offset value by the above-described method and sets this value in the STC offset synthesis section 164 before the last pack of system stream #1 is input to the decoder buffer. The STC offset synthesis section 164 continues outputting a value obtained by subtracting the STC offset value from the value of the STC 163 (step 168a).

The STC switch timing control section 166 obtains time T1, at which the last pack of system stream #1 reproduced first is input to the decoder buffer, and switches the STC switch 162a to the output side of the STC offset synthesis section 164 at time T1 (step 168b).

Thereafter, the STC value referred to by the system decoder 161 is provided with an output from the STC offset synthesis section 164. The transfer timing of system stream #2 to the system decoder 161 is determined by the SCR described in the pack header of system stream #2.

Next, the STC switch timing control section 166 obtains time T2, at which the reproduction of the last audio frame of system stream #1 reproduced first is terminated, and switches the STC switch 162b to the output side of the STC offset synthesis section 164 at time T2 (step 168d). A method for obtaining time T2 will be described later.

Thereafter, the STC value referred to by the audio decoder 160 is provided with an output from the STC offset synthesis section 164. The audio output timing of system stream #2 is determined by the APTS described in the audio packet of system stream #2.

Next, the STC switch timing control section 166 obtains time T3 and T3', at which the decoding of the last video frame of the main signal and the sub signal of system stream #1 reproduced first is terminated, and switches the STC switches 162c and 162d to the output side of the STC offset synthesis section 164 at time T3 and T3' (step 168d). A method for obtaining time T3 will be described later. Thereafter, the STC value referred to by the video decoders 69a and 69d is provided with an output from the STC offset synthesis section 164. The video decoding timing of system stream #2 is determined by the VPTS described in the video packet of system stream #2.

Next, the STC switch timing control section 166 obtains time T4, at which the reproduction output of the last video frame of system stream #1 reproduced first is terminated, and switches the STC switch 162e to the output side of the STC offset synthesis section 164 at time T4 (step 168e). A method for obtaining time T4 will be described later.

Thereafter, the STC value referred to by the video output switch 169 and the sub picture decoder 159 is provided with an output from the STC offset synthesis section 164. The video output timing and sub picture output timing of system stream #2 are determined by the VPTS and SPTS described in the video packet and the sub picture packet of system stream #2.

When switching of the STC switches 162a through 162e is completed, the STC setting section 165 sets the value given by the STC offset synthesis section 164 in the STC 162 (step 168f) (referred to as reloading of the STC 163) and switches all the switches 162a through 162e to be connected to the STC 163 (step 168g).

Thereafter, the STC value referred to by the audio decoder 160, the video decoders 69c and 69d, the video output switch 169 and the sub picture decoder 159 is provided with an output from the STC 163, and the operation returns to the ordinary operation.

Now, two means for obtaining time T1 through T4 for switching the STC will be described.

According to specific means, information representing time T1 through T4, which can be easily calculated when the streams are created, is recorded on the disk. The system, control section 21 reads the information and sends the information to the STC switch timing control section 166.

Especially for T4, "VOB reproduction end time (VOB_E_PTM)" described in the DSI used for obtaining the STC offset is used as it is.

On the disk, the value obtained based on the STC value used in system stream #1 reproduced first is described, and the STC switch timing control section 166 switches the STC switches 162a through 162e at the moment the value of the STC 163 becomes time T1 through T4.

EXAMPLE 2

In the first example, an example of application of a system for reproducing a plurality of streams in synchronization according to the present invention is described in detail. In a second example, this system is applied to a reproduction control system for reproducing two streams seamlessly. In the case of recording an MPEG signal, editing is conventionally performed on a GOP-by-GOP basis in general, and it is difficult by conventional methods to perform editing on a frame-by-frame basis. By using an MSS system according to the present invention, substantial frame-based editing is realized.

It is important to synchronize the timing of the video signal and the audio signal at the point of connection. Specific synchronization systems will be described in third through ninth examples.

The reproduction control system according to the present invention can be applied as follows to connect two streams while switching the two streams on a frame-by-frame basis seamlessly. As shown in FIG. 10, editing data 761 including synthesis information of a 28P zoom instruction signal and the like is processed by an editing data processing section 762 and sent to a switching synthesis section 763. The data is then switched/synthesized and output from a switching synthesis signal output section 764. Thus, two MPEG video signals can be switched and connected seamlessly at an arbitrary point other than the borders between GOPs.

Figure 22:
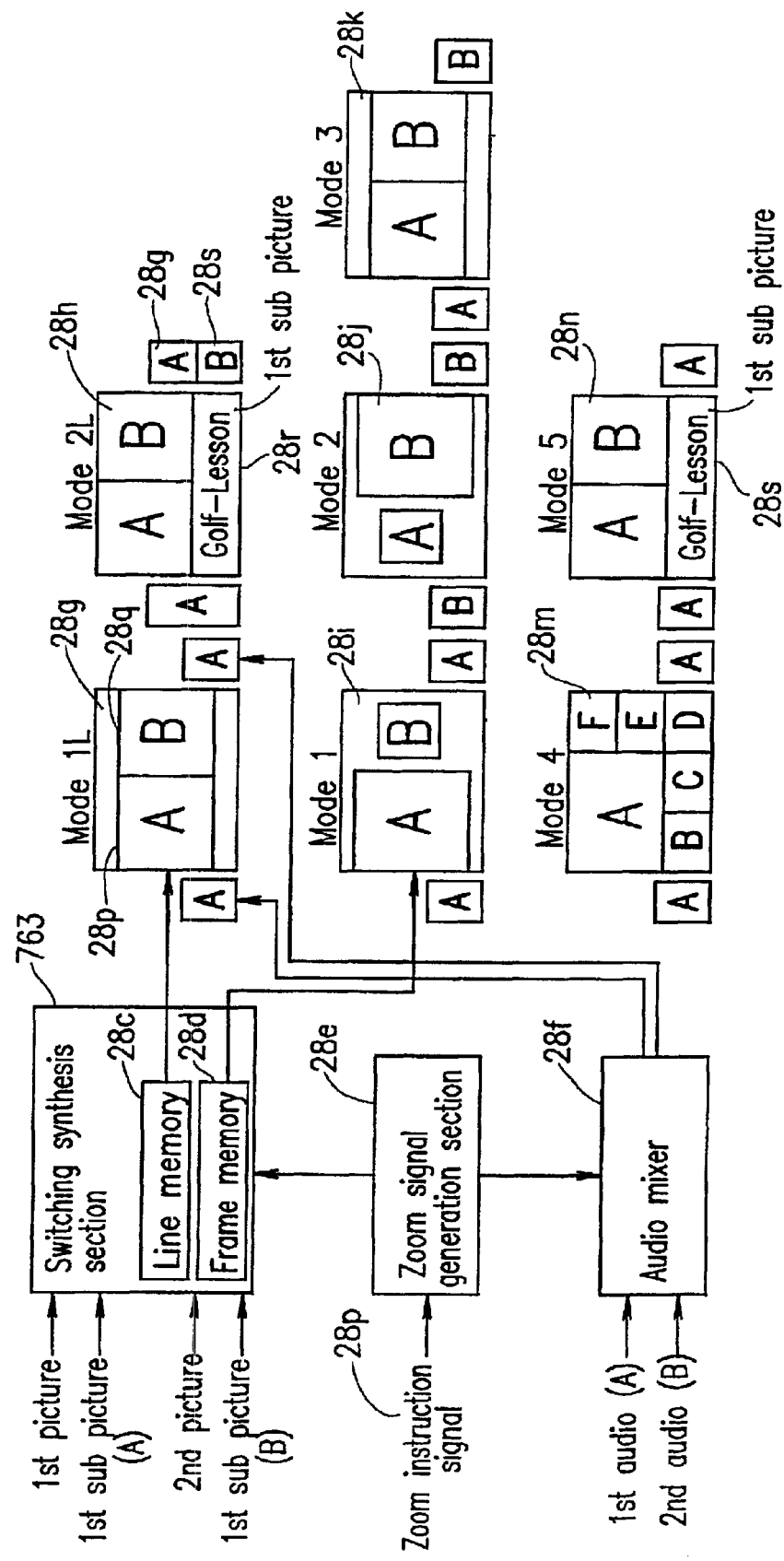
FIG. 22 is a diagram illustrating picture synthesis control performed by a reproduction apparatus in one example according to the present invention.

A system for synthesizing two pictures at an arbitrary point based on an instruction signal will be described later with reference to FIG. 22.

Figure 6:
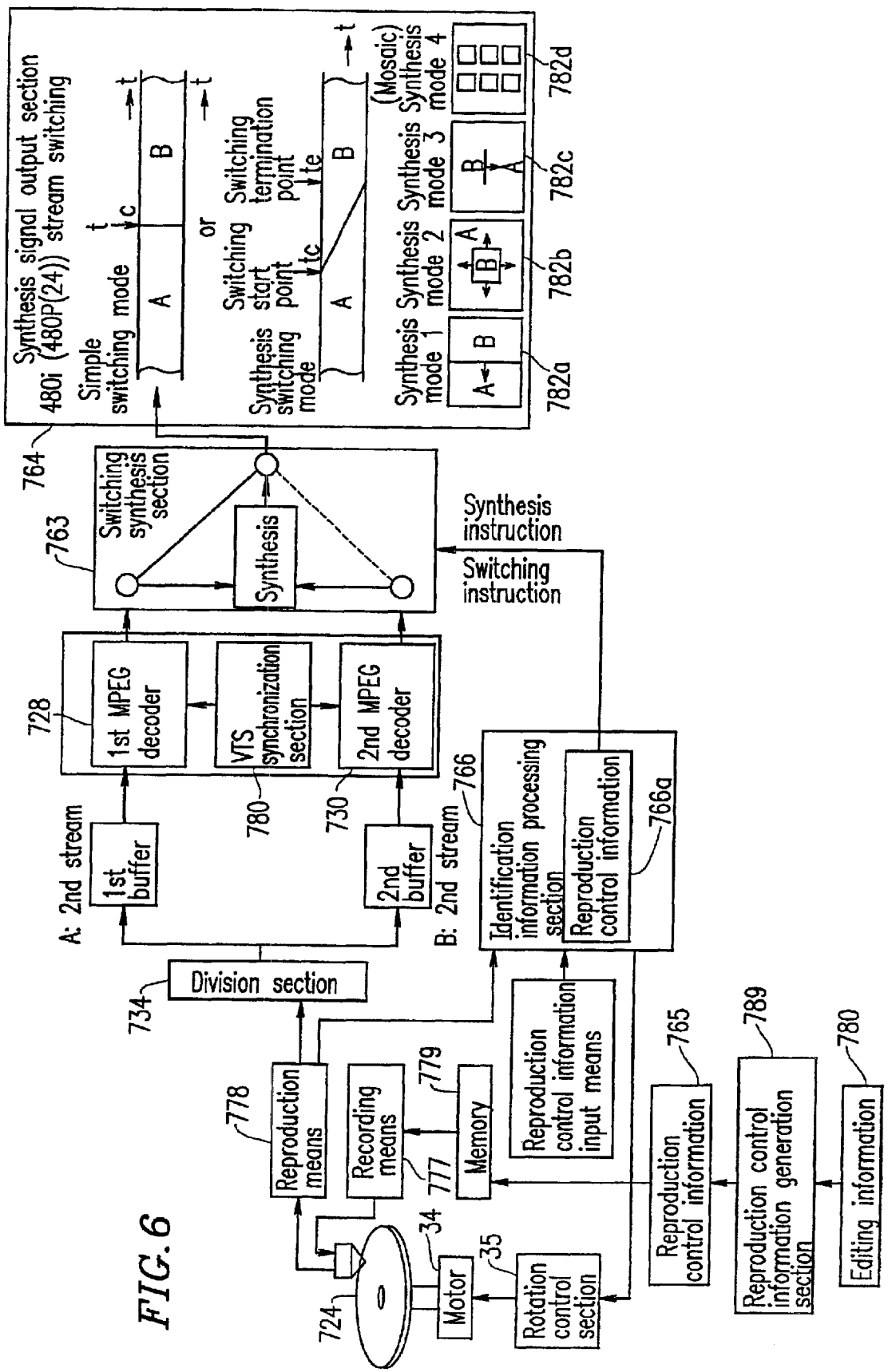
FIG. 6 is a block diagram of a recording and reproduction apparatus of a frame-based reproduction control system in one example according to the present invention.
Figure 7:
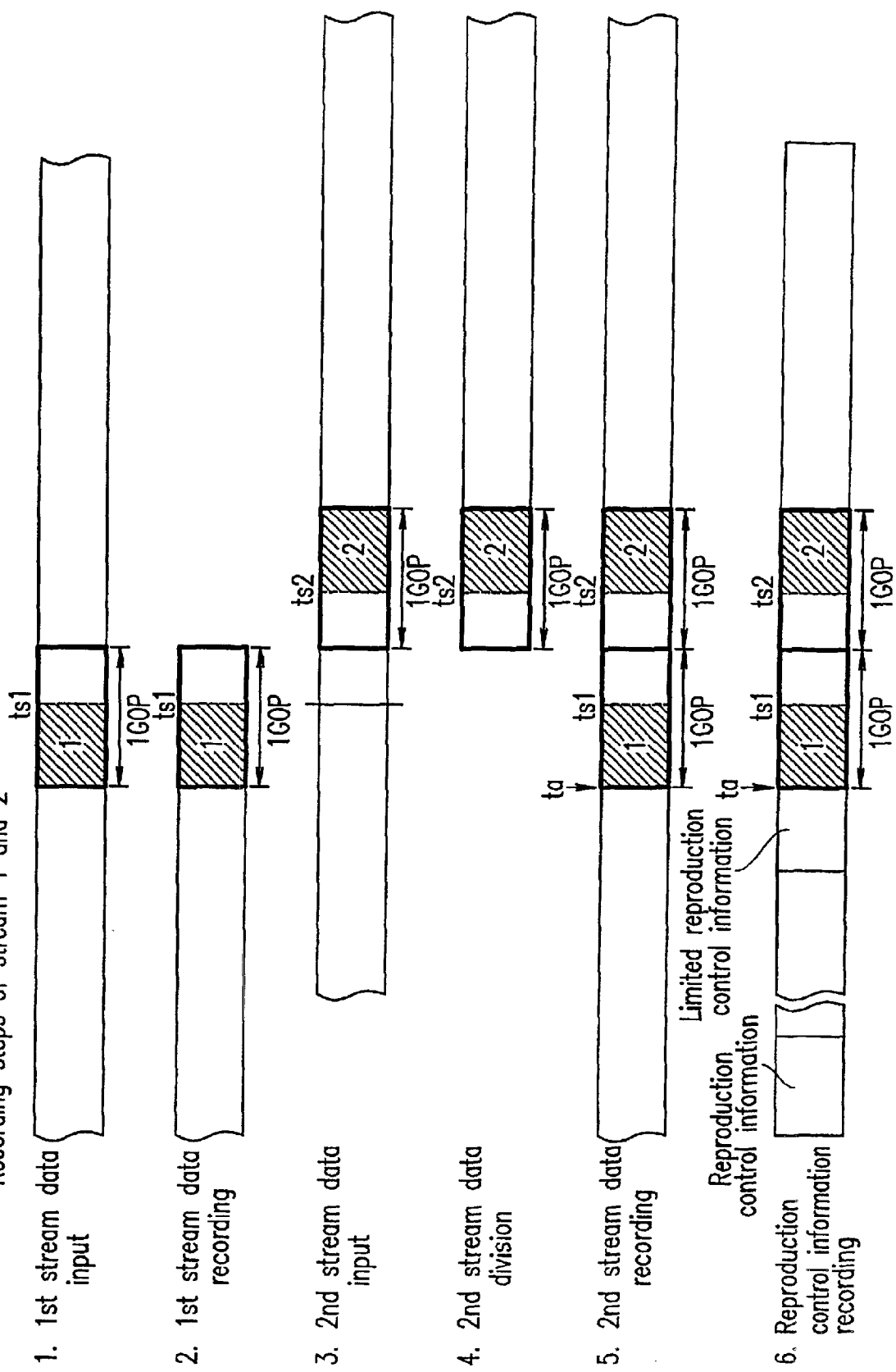
FIG. 7 shows a process for recording steams by a recording apparatus of a reproduction control information recording system in one example according to the present invention.
Figure 58:
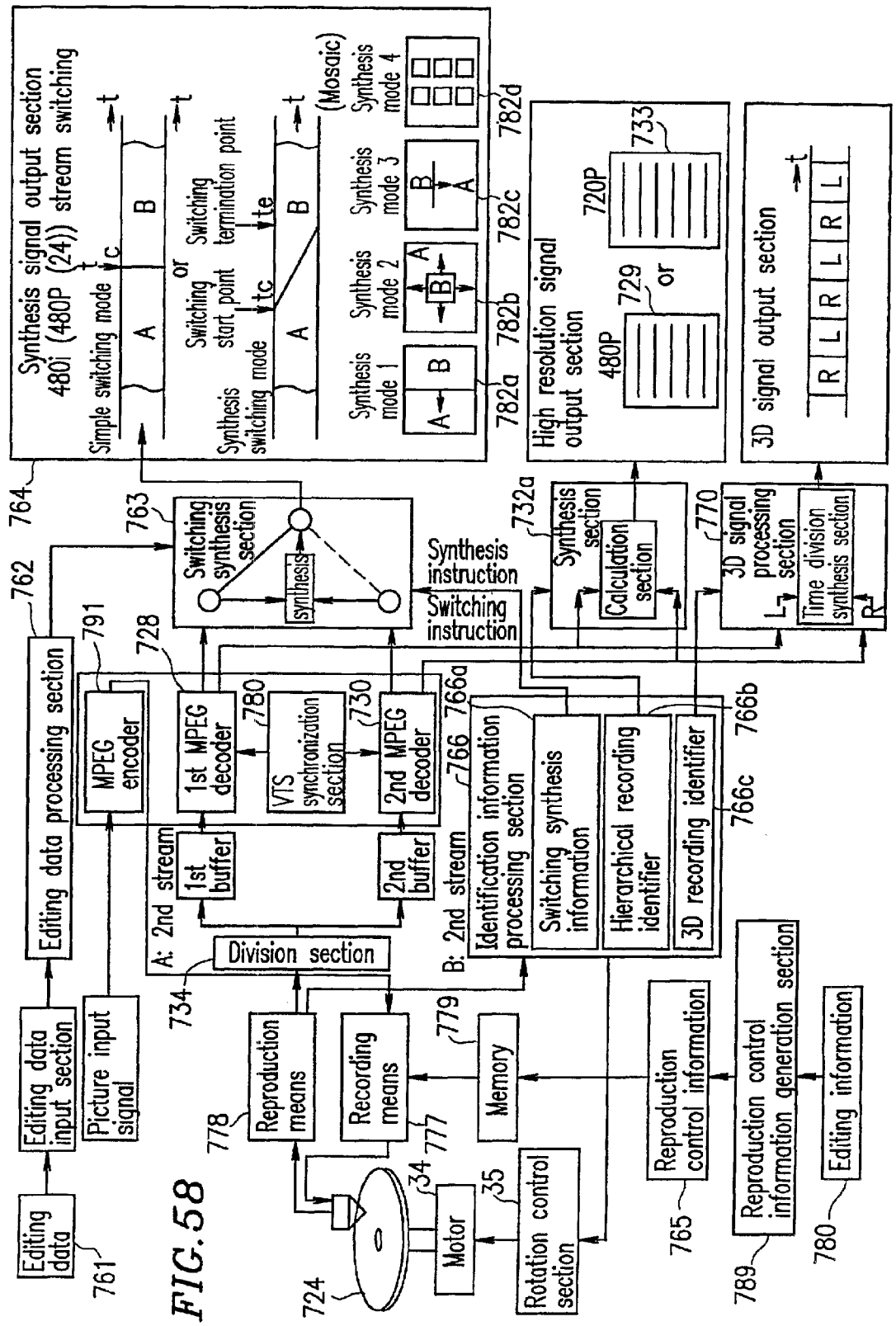
FIG. 58 is a block diagram of a recording and reproduction apparatus of a frame-based reproduction control system in one example according to the present invention.

In a simple switching mode, two pictures are simply switched over frame by frame at an editing point as follows. Stream "a" and stream "b" are switched over at an editing point tc, and the resultant stream is output seamlessly. In a synthesis switching mode (such as a wipe), stream "a" and stream "b" are switched after being synthesized from a start point ts to a termination point te. As shown in FIGS. 6 and 58, in mode 1, switching is performed from left to right; in mode 2, from center to periphery; in mode 3, top to bottom; and in mode 4, in a mosaic manner. FIG. 6 is a simplified block diagram: and FIG. 58 is a detailed block diagram.

In FIG. 6, reproduction means 778, a division section 734, a VTS synchronization section 780, and MPEG decoders 728 and 730 have exactly the same structure as that of those in the 480P reproduction apparatus shown in FIG. 3, and thus the 480P reproduction apparatus can be used. With reference to FIG. 6, when an identification information processing section 766 detects reproduction control information 766a, two video streams are sent to the switching synthesis section 763, and the first stream is switched to the second stream seamlessly at the connection point ts as described above.

With reference to FIG. 58, when a 720P/480P hierarchical recording identifier 725 having a high resolution signal described in the first example is detected, the synthesis section 732a performs calculation and outputs a high resolution signal such as a 480P or 720P signal.

When a 3D recording identifier 766c is detected, a 3D signal processing section 770 generates a 3D video signal having a right-eye video signal and a left-eye video signal alternately interleaved, and outputs the signal.

In this manner, the MSS system shown in FIG. 58, which uses two MPEG decoders or an MPEG decoder for decoding two streams simultaneously, can be used to provide three functions, i.e., reproduction control with frame-based editing, reproduction of a high resolution signal, and reproduction of a 3D video signal.

FIG. 11 shows a specific example of reproduction control information 765. The reproduction control information 765 includes a switching point number S 766, a synthesis mode identifier 767, a first stream switching start address ts 768, a first stream switching termination address te2 769, a second stream GOP start address tsG 790, a second stream switching start address ts2 771, and a second stream switching termination address te2, 772 in the order of the address used.

Figure 12:
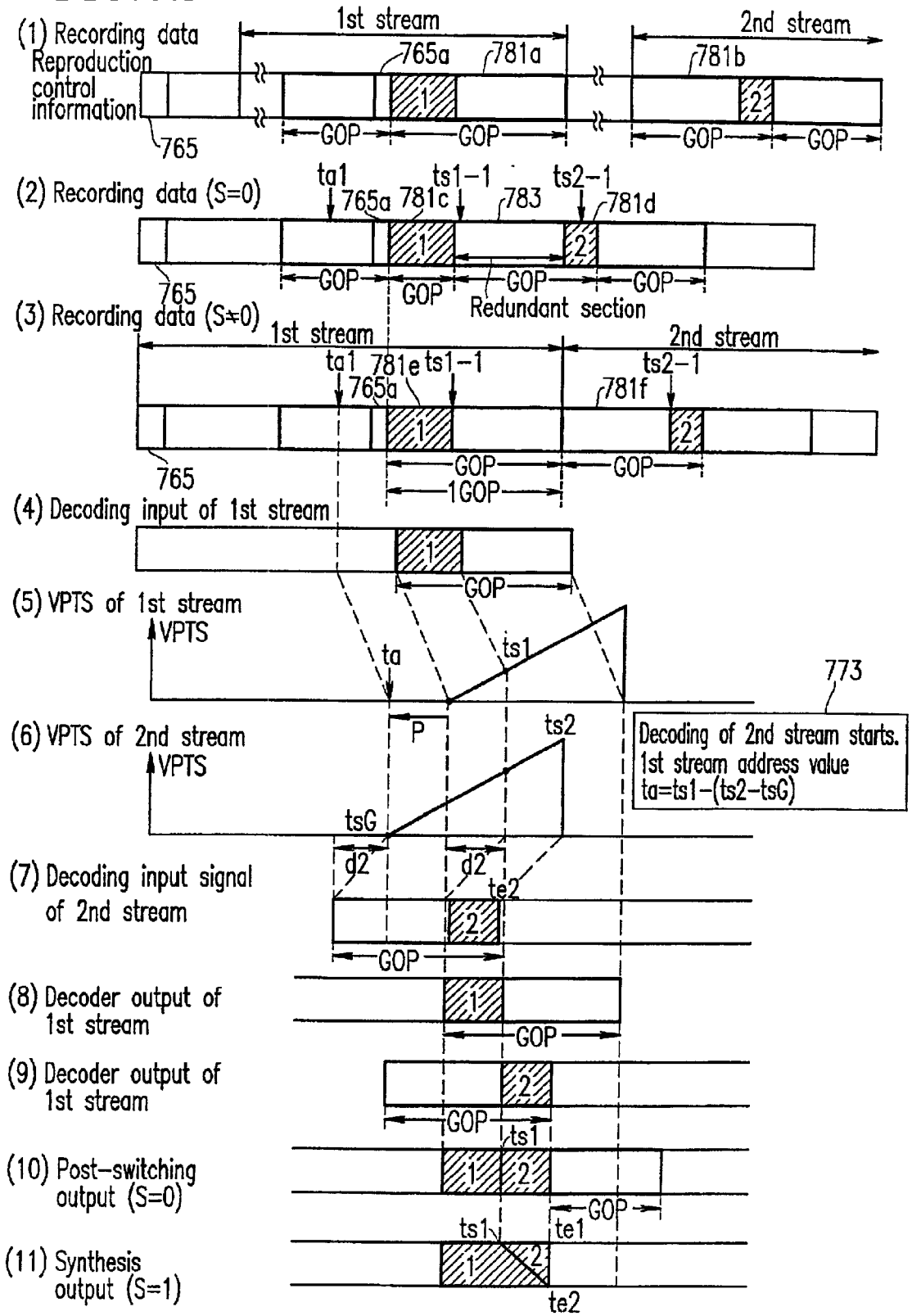
FIG. 12 is a diagram illustrating a process for recording a plurality of streams by a recording apparatus in one example according to the present invention and a process for reproducing the plurality of streams by a reproduction apparatus in one example according to the present invention.

Specifically, when the switching point number S=1, as shown in part (9) of FIG. 12, a picture synthesis identifier 767 is not present or is 0. Accordingly, the first stream is simply switched into the second stream at the switching address of ts1-1. When S=2, as shown in part (10) of FIG. 12, switching is started at ts1, and the two pictures of the first stream and the second stream are synthesized into one picture until t=te1. At t=te1, the first stream is completely switched into the second stream.

Figure 13:
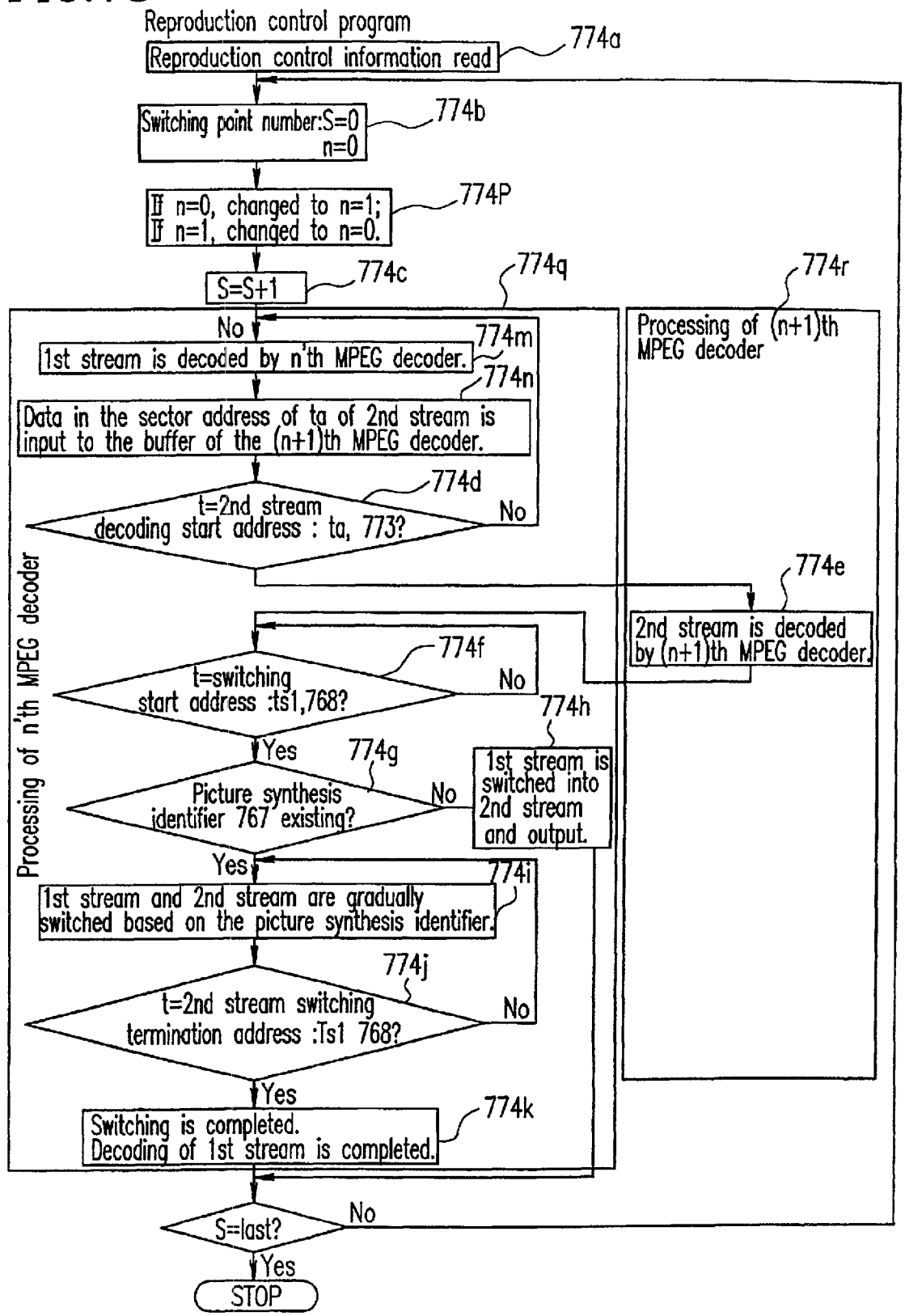
FIG. 13 is a flowchart illustrating reproduction control of two streams performed based on the reproduction control information by a reproduction apparatus in one example according to the present invention.

With reference to the flowchart of FIG. 13, a process for reproduction performed based on the reproduction control information will be described.

With reference to part (1) of FIG. 12, a GOP 781a of the first stream and a GOP 781b of the second stream may be at discrete positions on an optical disk without the streams being moved or rewritten. In this case, the time period for rewriting can be saved. With reference to part (3) of FIG. 12, since data can be recorded on a DVD-RAM disk and the like after edited, streams are recorded on a GOP-by-GOP basis; i.e., a GOP 781e and a GOP 781f both including a frame at the editing point are recorded adjacent to each other. In this case, the editing point is allowed to be changed in one GOP later. When two streams are synthesized in a wipe manner, the picture of the first stream after the editing point is required. Thus, the structure shown in part (3) of FIG. 12 is required.

When S=0, i.e., when synthesis of two pictures is not performed, the data after the switching point ts1 of a GOP 781c is not required and thus is deleted as shown in part (2) of FIG. 12 to exclude the redundant portion. Thus, the recording efficiency is raised. However, a GOP 781d, which has the IN point, includes an i (intra) frame (i.e., basic frame) at the beginning, which cannot be deleted. Thus, a redundant portion 783 is generated.

Figure 59:
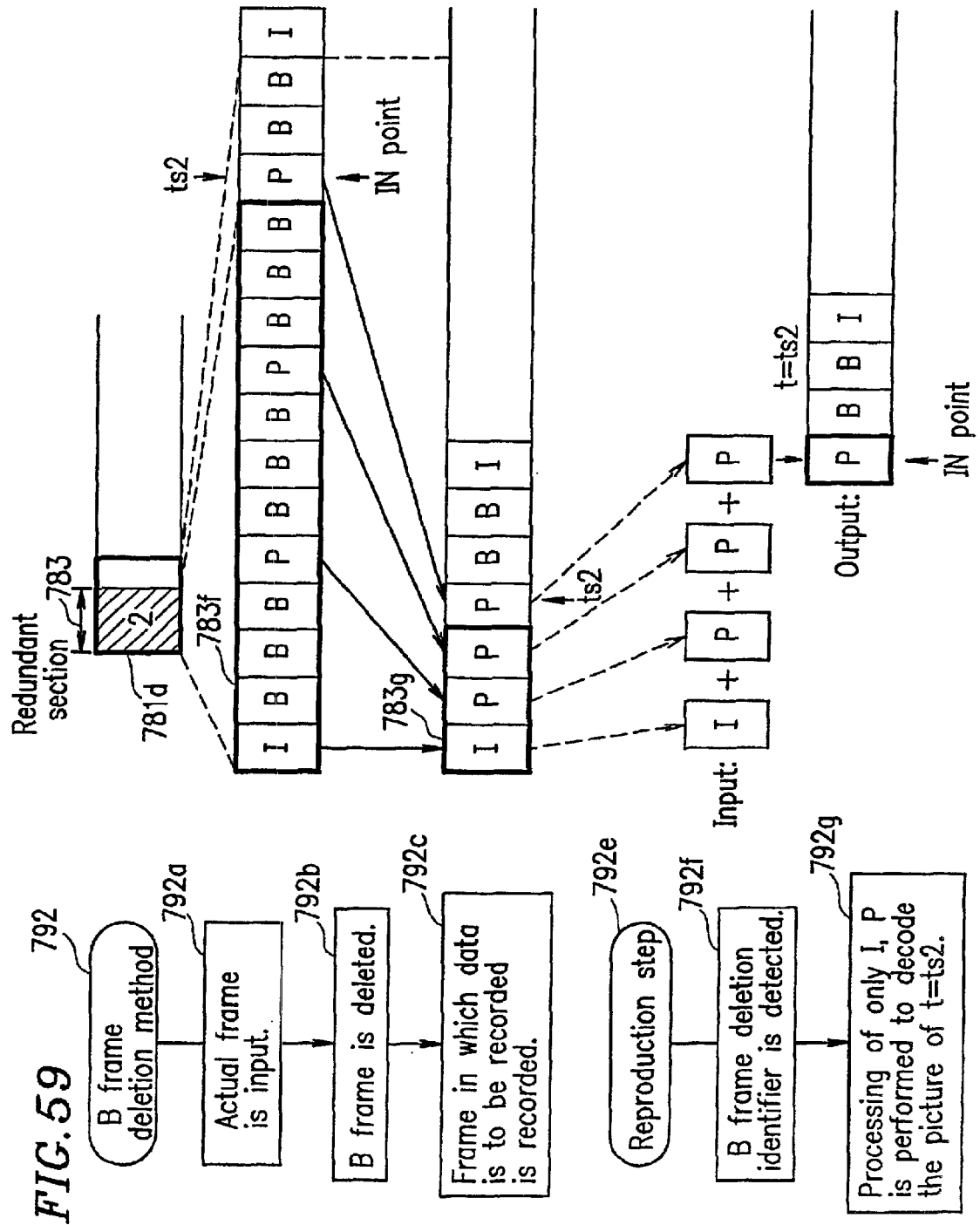
FIG. 59 is a diagram illustrating a process for deleting an unnecessary frame in one example according to the present invention.

As shown in step 792a in FIG. 59, 1GOP includes about 15 actual frames. When the B frames present before the IN point are deleted as in step 792b, the number of frames is reduced from 12 in step 792a (redundant portion 783f) to 3 in step 792a (redundant portion 783g). The redundant portion 783g is about ¼ of the redundant portion 783f, and thus the recording efficiency is raised.

When this portion is reproduced, a B frame deletion identifier is detected in step 792f. The number of frames are calculated with a premise that the B frames are not recorded. Since an MPEG signal is decoded with only I, P frames, the frames are decoded one after another in step 792g. The frame having the IN point (i.e., t=ts2) is obtained by decoding and output. In this case, the number of frames to be processed is only three. Accordingly, the intended IN point can be reproduced in a ¼ time period. In this example, the redundant portion is ⅛ second long. As can be appreciated from FIG. 59, ts2 is in the 14th frame in the worst case. In this case, the redundant portion is five frames long of I, P, P, P, B, i.e., ⅓×½=⅙second long. That is, the longest possible redundant portion is about 0.18 second. At least such a time period is necessary to reproduce the IN point. Even if about five cut portions are included in one second, each cut portion is present every 0.2 second. By deleting the B frames by this system, the frame-based reproduction is realized even if there are five cut portions in one second. This means that this system is usable in the standard editing with no problem.

A method for generating reproduction control information will be described. Where the final GOP before the OUT point is defined as a first GOP and the first GOP after the IN point is defined as a second GOP, reproduction control can be performed simply by recording the time of the beginning of the second GOP as the switching point ts2 and the time of the switching point. Alternatively, the number of frames from the beginning of the second GOP to the switching point can be recorded.

When such reproduction control information is reproduced by a reproduction apparatus, the frame at the switching point is decoded without processing the B frames (pictures) among I, B, B, B. P, B, B, B, P, B, B, B as shown in step 792*f* in FIG. 59. In other words, only I, P, P are decoded. In this manner, the picture at the IN point is obtained in a ¼ time period as described above. Even if there are five frame switching points in one second, the redundant time period is 0.18 second, which is shorter than the pitch of the cut portion (0.2 second). Thus, the data can be reproduced seamlessly at all the switching points.

In order to realize synchronization, reproduction control information is obtained by calculating the number of frames (pictures) existing between the second GOP and the switching point based on the time of the beginning of the second GOP and the time of the switching point. When the B frames which are not necessary are deleted, the correction is performed in consideration of the deleted frames referring to an unnecessary frame deletion identifier. Then, it can be found how many frames should exist between the start of reproduction of the second GOP, the IN point of the second GOP, and the OUT point of the first GOP, in order to synchronize the OUT point of the first GOP and the IN point of the second GOP.

When the number of frames existing between the beginning of the second GOP and the switching point is recorded as the reproduction control information, correction in consideration of the unnecessary frames such as the B frames can be performed in order to find the time to start decoding the second GOP to realize the synchronization.

Another recordable reproduction control information can be decoding start timing information which indicates a specified point in the first GOP at which decoding of the second GOP should be started in order to match the switching point of the first GOP and the switching point of the second GOP.

In such a case, the switching points can be synchronized using only the reproduction control information, without performing any special calculation by the reproduction apparatus.

The redundant portion 783 includes one I frame, a plurality of P frames and a plurality of B frames. BY decoding these frames to create a frame immediately before the frame corresponding the final editing point (i.e., intraframe), the recording efficiency can further be raised. In the case of a DVD-RAM disk, the overall editing structure is found as toc by recording the overall reproduction control information 765 and limited reproduction control information 765*a* on only the switching points, at two points, i.e., at the beginning of the recording data and immediately before the editing point as shown in parts (1), (2) and (3) of FIG. 12. Before the editing point, limited reproduction control information 765*a* on each separate editing point, for example, S=1 can be recorded among the overall reproduction control information. In this case, reproduction control for special reproduction is advantageously stabilized.

A process for reproduction control will be described. First, in step 774*a*, reproduction control information is read. In step 774*b*, the reproduction switching point number S is set to 0. In step 774*c*, S is incremented by one. The decoding start position of the second stream needs to be specified. In step 774*d*, it is checked whether or not t=ta, where t is the system clock or the VPTS of the first stream and ta is the decoding start position information. When t=ta, i.e., when the VPTS of the second stream reaches ta as shown in part (5) of FIG. 12, the processing advances to step 774*e*, where MPEG-decoding of the GOP of the second stream is started as shown in part (6) of FIG. 12. In step 774*f*, it is checked whether or not t=ts1. As shown in parts (5) and (6) of FIG. 12, the switching point ts2 comes after the time corresponding to the value of (ts1−ta)=(ts2−tsG) passes. As shown by the expression and parts (5) and (6) of FIG. 12, the data at ts1 of the first stream and data at ts2 of the second stream are MPEG-decoded at the same time and output from the decoder. Parts (8) and (9) of FIG. 12 show the state where the two streams are synchronized. Specific methods for synchronization will be described in detail in the third through ninth examples. It is appreciated from the reproduction control information that ts1 and ts2 are frame editing points of the two pictures. In step 774*g*, it is determined whether or not there is a picture synthesis identifier 767. If the picture synthesis identifier 767 does not exist, the processing advances to step 774*h*, where the first stream is switched into the second stream by the switching synthesis section 763 (FIG. 6) at the position of t=ts1 as shown in part (10) of FIG. 12. Since t=ts1 is the OUT point in actuality, the frame of the first stream at t=ts1 is not output. Since t=ts2 is the IN point, the frame of the second stream at this point is output. Since the frame information on the first stream is not necessary at t=ts2, recording of such information can be omitted when S=0, i.e., when no picture synthesis is performed. In this case, the recording efficiency is raised by one P frame. Thus, reproduction control of the switching point for S=1 (simple switching mode) is completed. The processing returns to step 774*c* and deals with the switching point of S=2.

If n=0 in step 774P, it is converted into n=1. In other words, when the second stream is decoded by the second MPEG decoder 730, the second stream, i.e., the MPEG signal to be switched next is decoded by the first MPEG decoder 728. A different MPEG decoder is used from the case of S=1.

Figure 56:
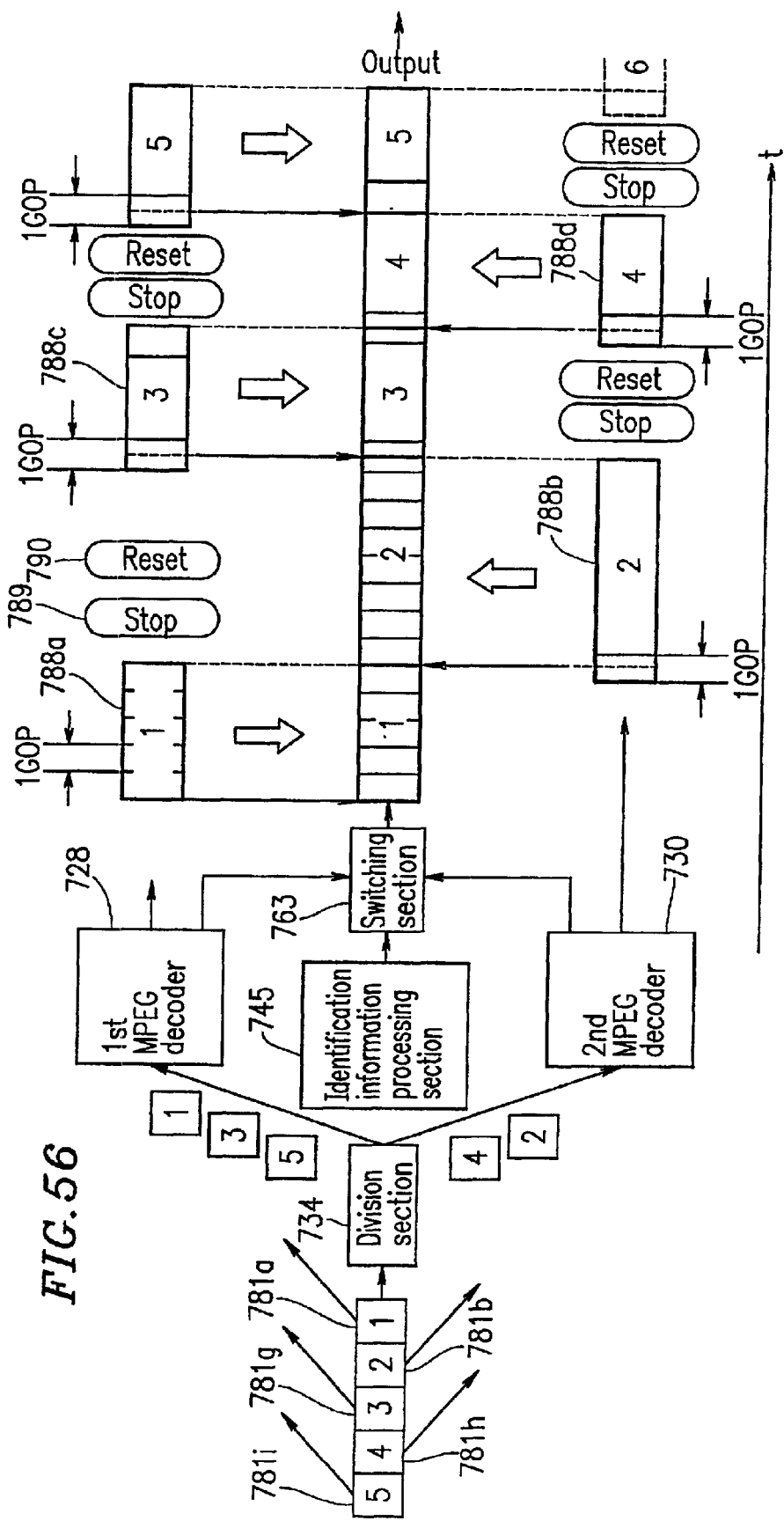
FIG. 56 is a diagram illustrating a flow of a stream in a reproduction apparatus in one example according to the present invention.

The second stream is decoded as shown in FIG. 56. Input second streams 781*a*, 781*b*, 781*g*, 781*h* and 781*i* are sent by the division section 734 to the first MPEG decoder 728 and the second MPEG decoder 730 alternately and decoded into video signals 788*a* and 788*b*. The video signals 788*a* and 788*b* are synthesized into one stream by the switching section 763. As is clear from the figure, the output from the first MPEG decoder 728 is stopped after the decoded video signal 788*a* is output. That is, the picture is frozen. This occurs since non-continuous data cannot be normally decoded. The MPEG decoding is resumed by performing resetting 790 of registers and the like. The second MPEG decoder is processed similarly. Conventionally, since only one MPEG decoder is used to perform seamless reproduction, various complicated pre-processing needs to be performed at the time of recording. According to the present invention, such various complicated processing is not necessary at the time of recording for the following reason. Since even if one of the MPEG decoders is stopped, the other MPEG decoder can be used, even MPEG data which could not otherwise be connected seamlessly can be reproduced seamlessly. While the second MPEG decoder operates, the first MPEG decoder is processed to resume operating. In this manner, seamless reproduction can be continued endlessly by switching the two MPEG decoders. Even frame-based editing of MPEG signals, which conventionally requires complicated processing, can be realized without complicated processing by using reproduction control according to the present invention. The system according to the present invention does not require the step of decoding and re-encoding MPEG data and thus provides a significant effect that the picture quality is not deteriorated.

The process for seamless reproduction can be summarized as follows. A plurality of streams are divided and alternately decoded by two MPEG decoders. An output from one of the MPEG decoders is switched into an output from the other MPEG decoder at a switching point. While the other MPEG decoder is outputting data, the first MPEG decoder is reset to decode the next stream. At the next switching point, the output from the second MPEG decoder is switched into the output from the first MPEG decoder.

Thus, continuous frame-based reproduction is realized.

(Synthesis Switching Mode)

Returning to step 774*g* of FIG. 13, a process for switching two streams while synthesizing the two streams into one picture in, for example, a wipe manner, by the synthesis signal output section 764 (shown in FIG. 6) will be described. In this case, the picture synthesis identifier 767 is not 0. In step 774*i* the first stream is switched into the second stream as shown in part (11) of FIG. 12 while the two streams are synthesized from t=ts1. The switching is continued until the time becomes t=te1 or t=te2 in step 774*j*. The switching is completed in step 774*k*. Since the decoding of the first stream is stopped at t=ts1, wasteful decoding of data is prevented. The switching is performed from left to right as in the screen 782*a* in mode 1, from center to periphery as in the screen 782*b* in mode 2, top to bottom as in the screen 782*a* in mode 3, and in a mosaic manner as in the screen 782*d* in mode 4.

FIG. 12 shows an example in which the original time stamp is not changed. When the recording is performed using a DVD-RAM disk or the like where the time of the switching point of the first stream matches the time of the switching point of the second stream, the time stamp can be changed and thus the structure is further simplified. The time stamp can be changed at the time of recording by setting ts1=ts2. In this case, the first stream can be recorded up to te1. Time stamp tsG of the second stream is changed to ts1-(ts2-tsG). A time stamp having a smaller value than ts1 is assigned. Time ta is identical with tsG. Accordingly, when reproduction is performed as shown in part (6) of FIG. 12, tsG, i.e., the GOP start address 770*a* of the second stream is pre-read based on the reproduction control information 765*b* shown in FIG. 14, and decoding is started at tsG.

When a system of changing the time stamp is used, the time stamp of a GOP 761*e* and the time stamp of a GOP 781*f* in part (3) of FIG. 12 are changed in the order and also overlapped with each other. When such a stream is reproduced, the reproduction apparatus malfunctions. According to the present invention as shown in FIG. 14, the GOP start address 770*a* of the second stream is recorded in the reproduction control information 765*b*. Thus, the positions of the time stamps which are changed in the order and also overlapped are found in advance. Therefore, malfunction can be advantageously prevented even while fast-forwarding. Use of the GOP start address 770*a* further secures the switching into the second stream at the editing point.

When the reproduction is performed as shown in part (6) of FIG. 12, tsG, i.e., the GOP leading address 770*a* of the second stream is pre-read based on the reproduction control information shown in FIG. 14, and decoding is started at tsG.

Alternatively, when information on the editing point ts1 is available, the leading address tsG of the GOP including the editing point is pre-read and the data on the GOP 781*f* of the second stream is MPEG-decoded at t=tsG. This provides an advantage that the editing point of the first stream and the editing point of the second stream automatically match at ts1.

By recording data with the time stamps being changed as above, the structure and operation can be significantly simplified.

Figure 15:
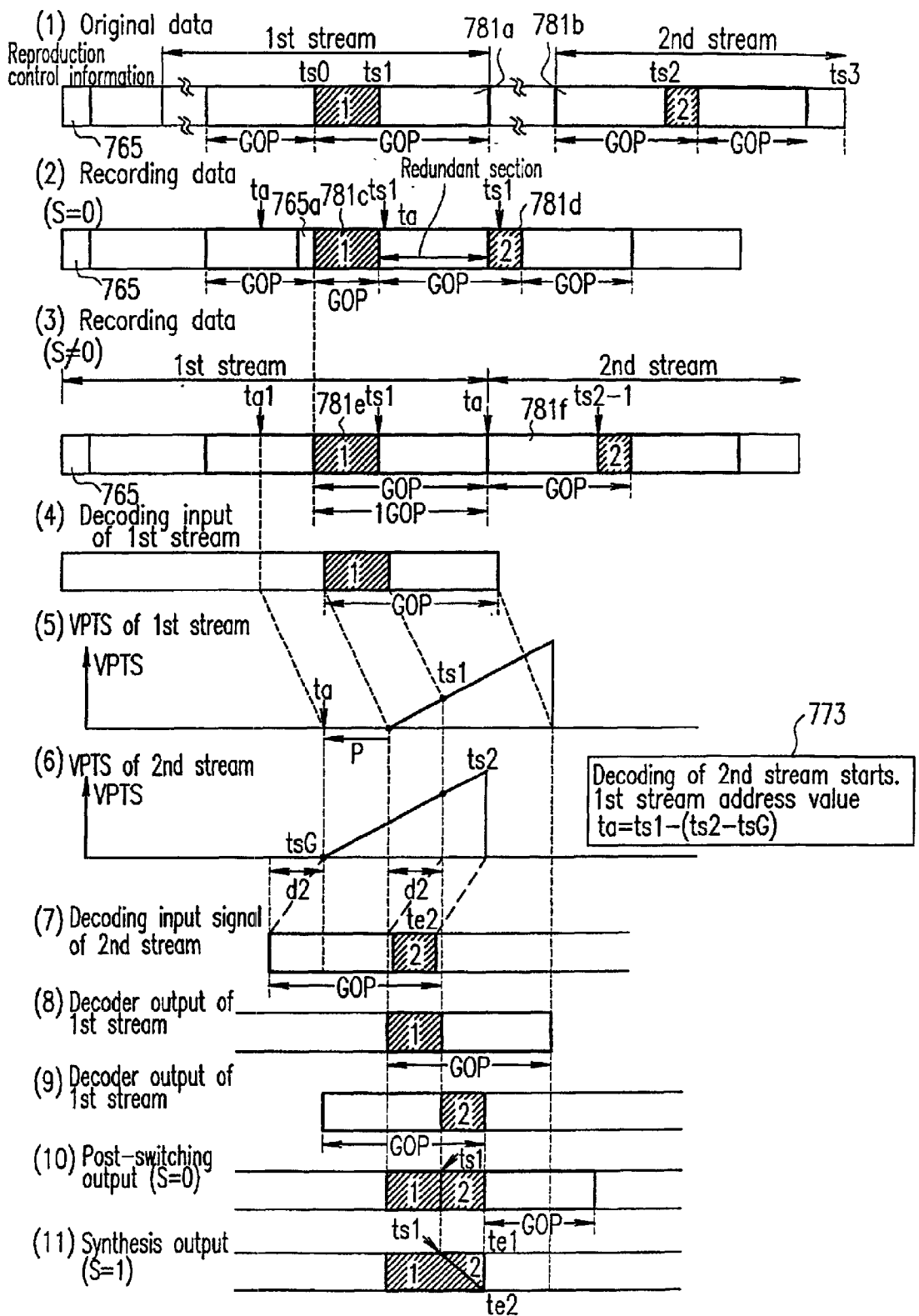
FIG. 15 is a diagram illustrating a process for recording and reproduction performed by a recording and reproduction apparatus in one example according to the present invention.

The above-mentioned second recording method will be described with reference to FIGS. 15 and 16.

Figure 16:
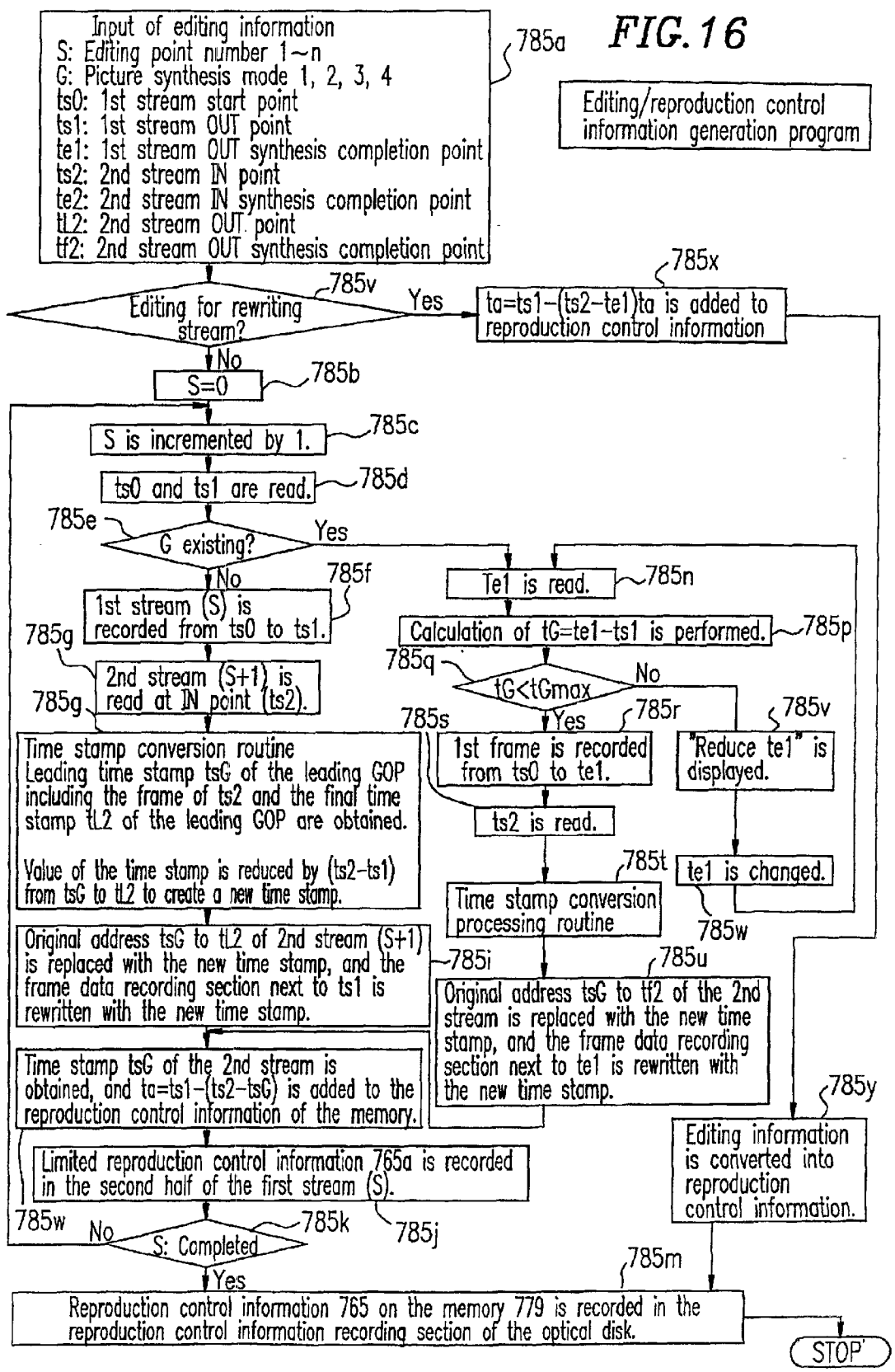
FIG. 16 is a flowchart illustrating a process for editing and generation of reproduction control information performed by a recording apparatus in one example according to the present invention.

With reference to FIGS. 6 and 16, an editing/reproduction control information generation program will be described. As shown in FIG. 6, editing information 780 including the IN and OUT points (editing points) is input manually or based on data and sequentially converted into reproduction control information 765 by a reproduction control information generation section 789. The reproduction control information 765 is once stored in a memory 779 and recorded by recording means 777 of the RAM disk 724 from the memory 779 either after all the editing operation is completed or immediately before the disk is removed from the apparatus.

A process performed by the reproduction control information generation section 789 will be described in detail with reference to FIG. 16.

In step 785*a*, the editing information 780 is input manually or based on data sequentially. S represents the number of the editing point, and G represents modes 1 through 4 in which two pictures are switched while being synthesized by wipe or the like, ts0 represents the start point of the first stream, ts1 represents the OUT point of the first stream, te1 represents the OUT synthesis completion point of the first stream, ts2 represents is the IN point of the second stream, te2 represents the IN synthesis completion point of the second stream, and tL2 is the OUT point of the second stream.

In step 785*b*, S=0 is set. S is incremented by one (step 785*c*), and ts0 and ts1 are read (step 785*d*). In step 785*e*, it is checked whether or not G exists. If G does not exist, there is no need to synthesize pictures, and thus in step 785*f*, the first stream (S) is recorded on the optical disk 724 from ts0 to ts1. The IN point ts2 of the second stream (S+1) is read, and the processing goes into a time stamp conversion routine (step 785*g*). In the time stamp conversion routine, the leading time stamp tsG of the leading GOP including information corresponding to the frame corresponding to ts2, and the time stamp ts2 corresponding to the final frame among the frames corresponding to the leading GOP are obtained. The value of the time stamp is reduced by the amount corresponding to (ts2-ts1) from tsG to tL2 of all the recording data of the second stream, thereby generating a new time stamp. In step 785*i*, original address tsG to tL2 (tf2) of the second stream is replaced with the new time stamp, and the information corresponding to the frame immediately following the frame corresponding to ts1 (OUT point of the first stream), is rewritten by the information obtained by the new time stamp.

In step 785*w*, the address tsG of the leading GOP of the second stream is used to perform the calculation of ta=ts1−(ts2−tsG) so as to find the time period ta prior to the decoding of the second stream. The resultant time period is added to the limited reproduction control information 765a and the reproduction control information 765. In step 785j, limited reproduction control information 765a only on the S number is recorded in the second half of the first stream (S) as shown in part (2) of FIG. 12. If S is terminated in step 785j, the processing advances to step 785m; and if S is not terminated in step 785j, the processing returns to step 785c to repeat the steps. In step 785m, the reproduction control information 765 at all the editing points stored in the memory 779 is recorded in the reproduction control information recording section of the optical disk, where management information such as TOC and the like are recorded, as shown in part (3) of FIG. 12. Thus, the editing/reproduction control information generation program is completed.

If a synthesis identifier G exists, in step 785n, te1 (OUT synthesis completion point of the first stream) is read. In step 785p, the calculation of tG=te1-ts1 is performed. If tG<tGmax in step 785q, the processing advances to step 785r. If tG>tGmax, the synthesis time period of the two streams is very long and exceeds the capacity of the buffer of the reproduction apparatus. In step 785v, an error message that "decrease te1" is issued. When te1 is changed in step 785w, the processing returns to step 785n, and te1 is decreased to be within the capacity.

Thus, the synthesis of the connection point is within the capacity. Accordingly, the processing returns to step 785r, where the first stream is recorded on the optical disk from tsG to te1. In step 785s, ts2 of the second stream is read; and in step 785t, the time stamp conversion processing routine is performed in a similar manner to the step 785g, to convert the time stamp. In step 785u, the original address tsG to tf2 (tL2) of the second stream is replaced with the new time stamp, and the information corresponding to the frame immediately following the frame corresponding te1 of the first stream is rewritten with the information obtained by the new stamp. Time ta is recorded in the memory. In step 785j, the limited reproduction control information 765a is recorded. In step 785k, it is checked whether or not processing for S=1 through S=n is completed. In step 785m, the overall reproduction control information 765 is recorded on the optical disk. Thus, all the operations are completed.

In this manner, the first stream is recorded up to a connection point, and a portion after the connection point is rewritten with a time stamp having a smaller value of that of the connection point, so that the connection of the first stream and the connection point of the second stream match each other. Thus, the reproduction apparatus can output a video signal including the two streams connected to each other on a frame-by-frame basis.

In this case, two MPEG decoders are required. The recording and reproduction apparatus shown in FIG. 6 includes the MPEG encoder 791 for MPEG-encoding the input video signal. Since an MPEG encoder is never used at the same time as an MPEG decoder and also the MPEG encoder has a processing capability of twice or more of the MPEG decoder, one MPEG processing section has a function corresponding to one encoder or two decoders.

Accordingly, when the present invention is applied to the recording and reproduction apparatus including an MPEG encoder, the frame-based editing is realized without adding any element.

Figure 57:
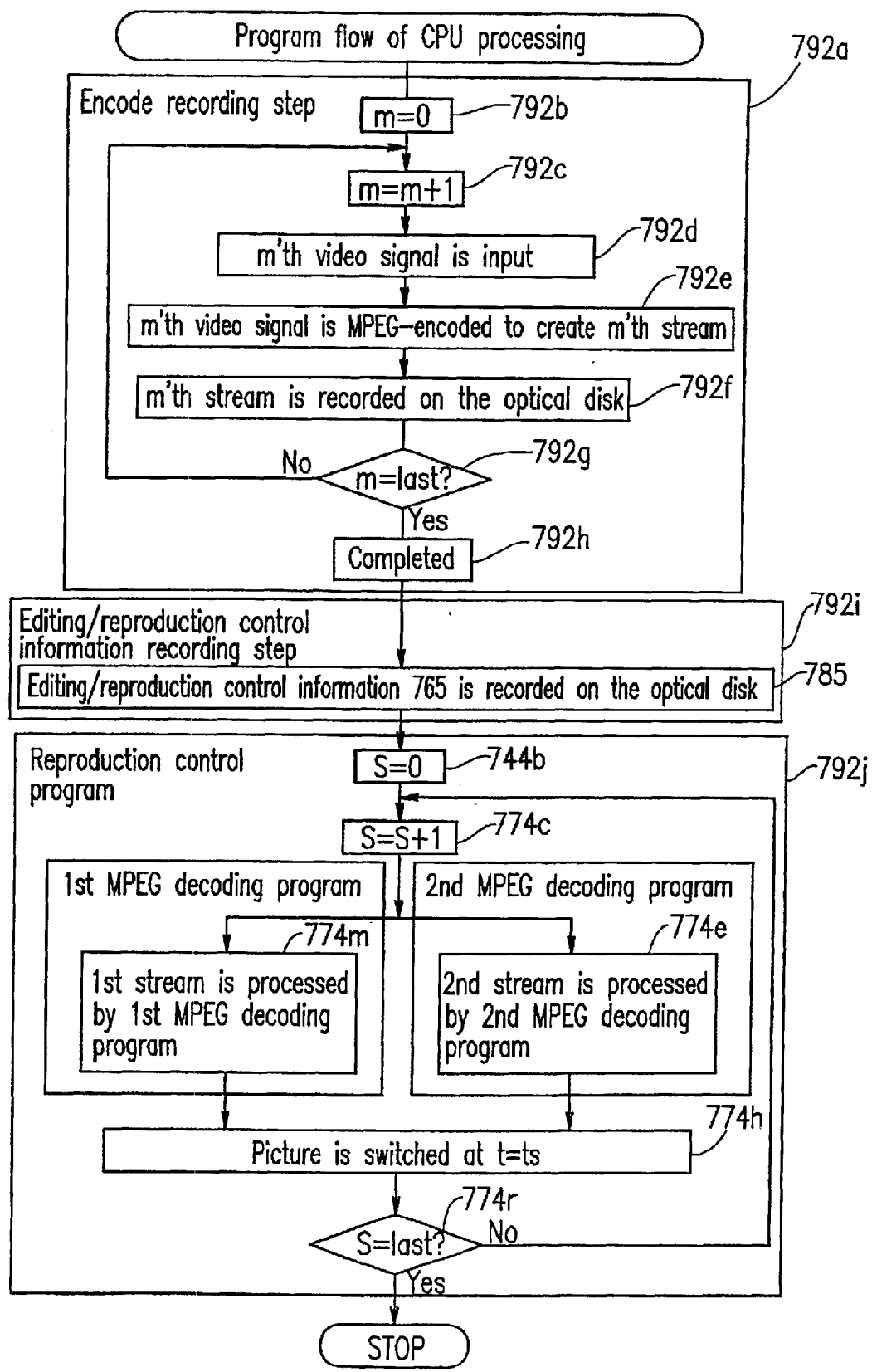
FIG. 57 is a flowchart illustrating a process for MPEG encoding, editing/reproduction control information generation, and reproduction control performed by a recording and reproduction apparatus in one example according to the present invention.

Soft-encoding/decoding performed by a CPU will be described. The capability of a CPU for encoding one stream corresponds to the capability for decoding two streams. As shown in FIG. 57, two streams can be decoded simultaneously or in a time division manner. Thus, the virtual frame-based editing according to the present invention is realized without raising the processing capability of the CPU.

With reference to the flowchart of FIG. 57, a process for performing encoding/decoding and recording/reproduction using a CPU will be described. In step 792a of encode recording, data of m=1 to final is input. In step 792c and 792d, the m'th video signal is input. The m'th video signal is encoded to create an m'th stream (step 792e) and recorded on an optical disk (step 792f). If m is not final in step 792g, the processing returns to step 792c; if m is final in step 792g, the recording is terminated (step 792h). In step 792i of recording reproduction control information, editing is performed on a frame-by-frame basis, and the reproduction control information and the above-mentioned various identifiers are recorded on the optical disk (FIGS. 6 and 58).

Reproduction is performed as follows. The reproduction control program 792J is started. Cut point S is reproduced from 1 to final (steps 774b and 774a). As shown in steps 774m and 774e, two streams are MPEG-decoded simultaneously or in a time division manner at the frame-edited point. In step 774h, one decoded stream is switched to the other decoded stream at t=ts. This operation is repeated until the final S is processed in step 774r.

The CPU has a capability of MPEG-encoding one stream. This means the CPU has a capability of MPEG-decoding two or three streams. Accordingly, one CPU can MPEG-encode one stream, performs frame-based editing, MPEG-decodes two streams, and outputs the connected stream seamlessly. The present invention has an effect that a part of the capability of the CPU which is not conventionally used is effectively used.

EXAMPLE 3

The MADM system according to the present invention simultaneously reproduce a plurality of streams. Synchronization systems are important.

In the first example, recording and reproduction of high resolution video signals such as 480P and 720P signals are described. In the second example, basic AV synchronization systems for reproduction control using virtual frame-based editing are described. In the third through ninth examples, various methods of synchronization will be described in more detail.

In the third example, an operation of a reproduction apparatus for reading data from an optical disk having three compression video signals to be reproduced simultaneously, and extending and reproducing the three compression video signals simultaneously by an AV synchronization system will be described.

Figure 37:
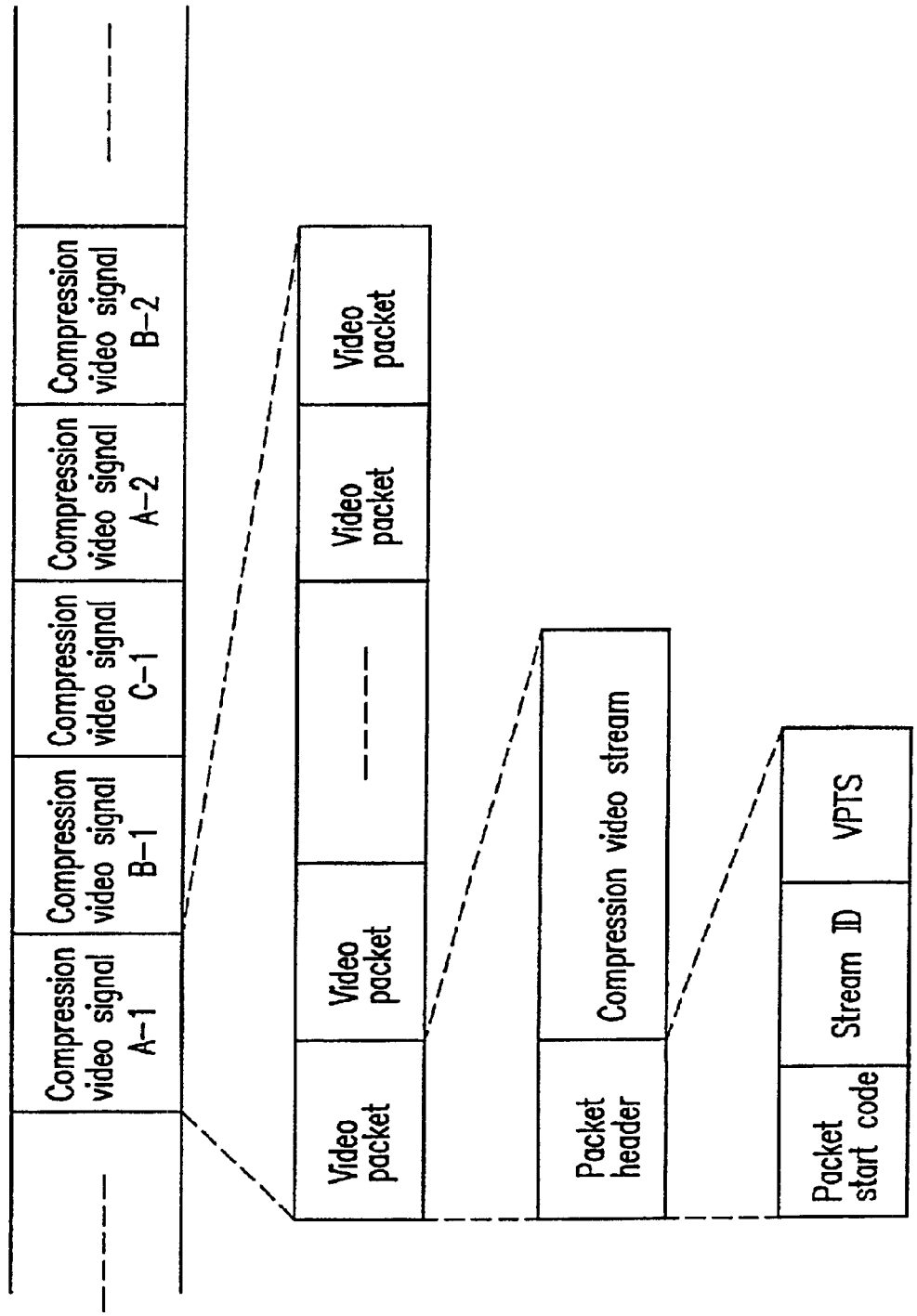
FIG. 37 shows a data structure of an optical disk in one example according to the present invention.

FIG. 37 shows a data structure of an optical disk used in the optical disk reproduction apparatus in the third example.

Video signals A, B and C are MPEG-compressed to obtain compression video streams A, B and C.

The compression video streams A, B and C are each packeted in units of 2 kB into video packets. A packet header of each packet includes a stream ID for indicating which one of the compression video streams A through C is stored. When the packet stores a leading part of the video frame, the packet header also includes a VPTS (video presentation time stamp) as video reproduction time information indicating the time to reproduce the frame. In the third example, an NTSC signal is used as the video signal, and the video frame cycle is about 33 msec.

On the optical disk, video packets created in the above-described manner are grouped into, for example, compression video signals A-1, B-1 and C-1 each including an appropriate number of packets based on the data stored, and multiplexed.

Figure 35:
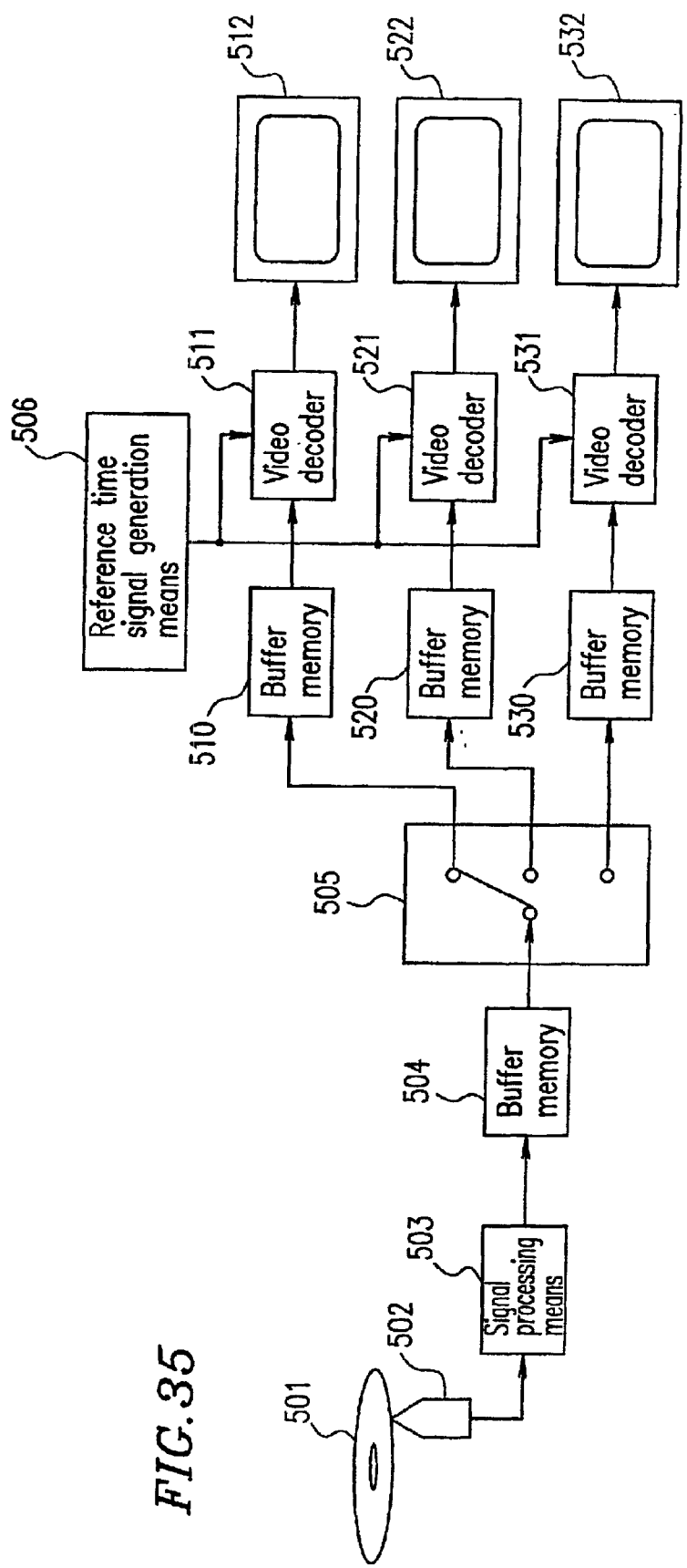
FIG. 35 is a block diagram showing a structure of an optical disk reproduction apparatus in one example according to the present invention.

FIG. 35 is a block diagram of an optical disk reproduction apparatus in the third example.

In FIG. 35, the optical disk reproduction apparatus includes an optical disk 501 described above, an optical pickup 502 for reading data from the optical disk 501, signal processing-means 503 for performing a series of signal processing such as binarization, demodulation, and error correction to the signal read by the optical pickup 502, a buffer memory 504 for temporarily storing the data output from the signal processing means 503, division means 505 for dividing the data read from the buffer memory 504 into compression video signals, and reference time signal generation means 506 for generating a reference time signal 506 including a counter (not shown) for counting 90 kHz clocks. Reference numerals 510, 520 and 530 represent buffer memories for temporarily storing the compression video signals divided by the division means 505. Reference numerals 511, 521 and 531 represent video decoders for extending and reproducing the compression video signals. Reference numerals 512, 522 and 532 represent monitors for displaying the video signals.

Figure 36:
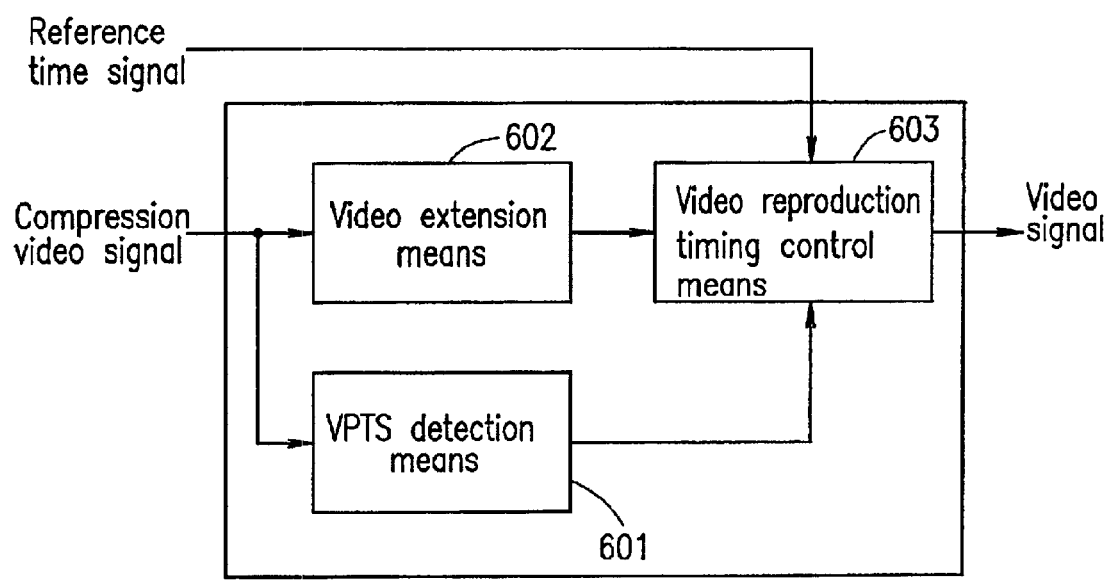
FIG. 36 is a structural view of a video decoder in one example according to the present invention.

FIG. 36 shows the structure of each of the video decoders 511, 521 and 531.

As shown in FIG. 36, the video decoder includes VPTS detection means 601 for detecting a VPTS stored in the packet header of the video packet, video extension means 602 for MPEG-extending the compression video stream, and video reproduction timing control means 603 for comparing the reference time signal and the VPTS and skipping or repeating the video reproduction on a frame-by-frame basis when the comparison result exceeds the threshold value.

The optical disk reproduction apparatus shown in FIG. 35 operates in the following manner.

The optical pickup 502 is focus-controlled or tracking-controlled by servo means (not shown) to read a signal from the optical disk 501 and outputs the signal to the signal processing means 503. The signal processing means 503 subjects the signal to a series of processings including binarization, demodulation, error correction and the like. Then, the signal processing means 503 stores the resultant signal in the buffer memory 504 as digital data.

The buffer memory 504 functions so that, even when the data supply from the optical disk 501 is temporarily stopped by, e.g., a wait state, the data supply to the subsequent-stage sections is not stopped.

The data read from the buffer memory 504 is divided into compression video signals A through C by the division means 505 and output. The division means identifies which of the compression video streams A through C is stored in each packet using the stream ID in the packet header of the packeted data, and determines the destination based on the identification result.

The divided compression video signals are respectively stored in buffer memories 510 through 530.

The buffer memories 510 through 530 act to continuously supply data to the video decoders 511 through 531.

The video decoders 511 through 531 read data from the buffer memories 510 through 530 respectively, extend the compression video signals, and output the signals as video signals to the monitors 512 through 532 respectively.

With reference to FIG. 36, operation of the video decoders 511 through 531 will be described.

The compression video signal read from the buffer memory is input to the VPTS detection means 601 and the video extension means 602.

The video extension means 602 MPEG-extends the compression video stream and outputs the video signal.

The VPTS detection means 601 detects the VPTS of the packet header and outputs the VPTS.

The video reproduction timing control means 603 receives the video signal output from the video extension means 602, a reference time signal and the VPTS output from the VPTS detection means 601, and compares the reference time signal and the VPTS. When the difference between the two exceeds the threshold value, the video reproduction timing is controlled so that the difference between the VPTS and the reference time signal is equal to or less than the threshold value.

In the third example, 33 msec is used as the threshold value for video reproduction. The video reproduction timing control means 603 performs the following.

(reference time signal-VPTS)>33 msec.:1 frame is skipped.
  (reference time signal-VPTS)<-33 msec.:1 frame is repeated.

In the third example, due to the precision error of the crystal oscillator used in the reference time signal generation means 506 and the video decoders 511 through 531, the video decoders 511 and 531 are slower and the video decoder 521 is faster in terms of extension and reproduction relative to the reference time signal. Unless reproduction timing is adjusted, the reproduced video signals are out of synchronization.

Figure 38:
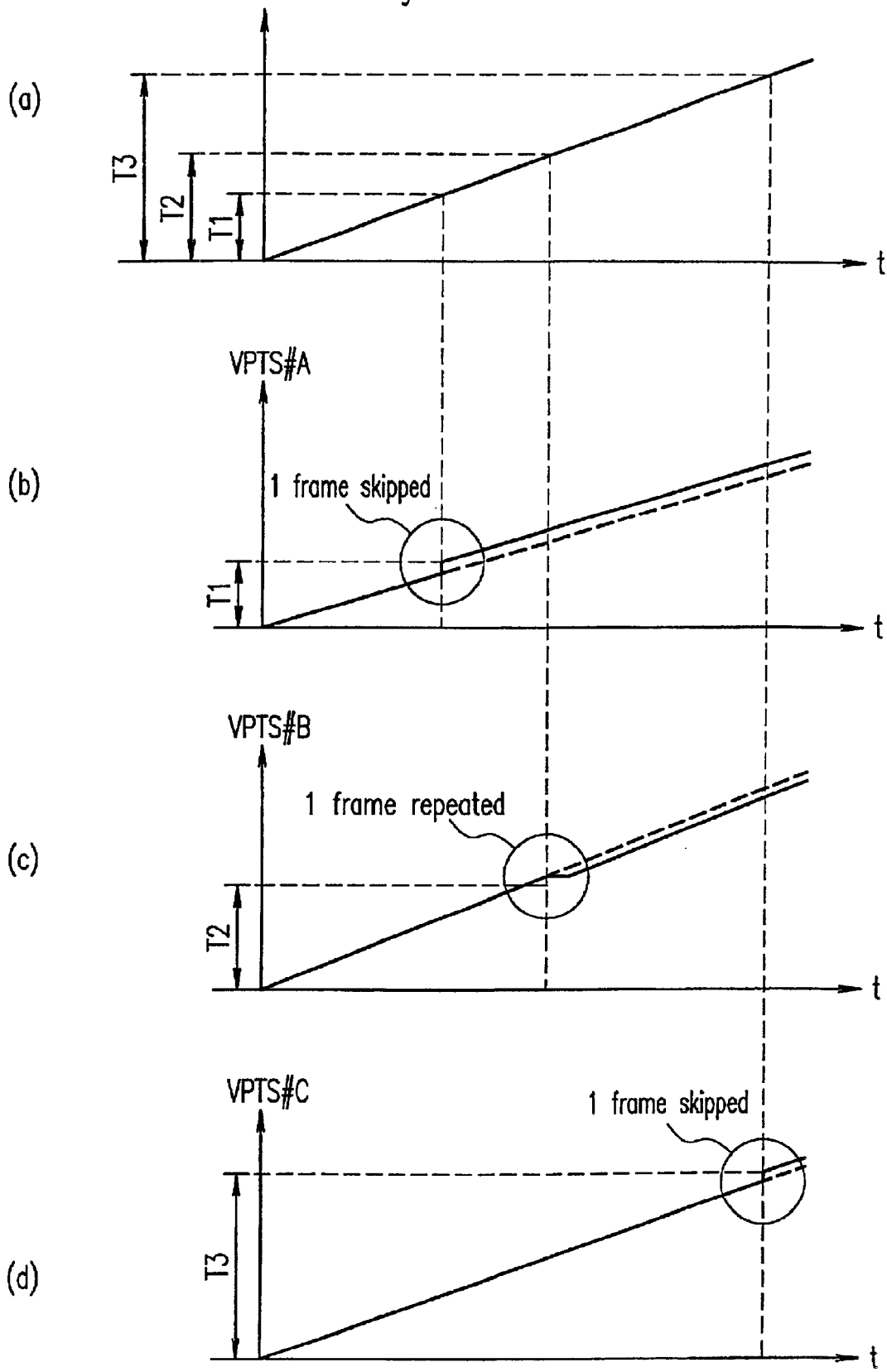
FIG. 38 is a timing diagram of video reproduction in one example according to the present invention.

FIG. 38 is a timing diagram of video reproduction in the third example. Part (a) of FIG. 38 shows the reference time signal with respect to reproduction time t. Part (b) shows the VPTS#A, which is a VPTS of the compression video signal A to be extended by the video decoder 511, part (c) shows the VPTS#B, which is a VPTS of the compression video signal B to be extended by the video decoder 521, and part (d) shows the VPTS#C, which is a VPTS of the compression video signal C to be extended by the video decoder 531.

The video decoder 511 continues extension and reproduction of the compression video signal A, and the difference between the VPTS#A and the reference time signal exceeds 33 msec. as the threshold value at T1. Accordingly, the video reproduction timing control means of the video decoder 511 skips one frame, which is originally to be reproduced, to adjust the reproduction timing so that the difference between the VPTS#A and the reference time signal is equal to or less than the threshold value.

The video decoder 521 continues extension and reproduction of the compression video signal B, and the difference between the VPTS#B and the reference time signal exceeds −33 msec. as the threshold value at T2. Accordingly, the video reproduction timing control means of the video decoder 521 reproduces one frame in repetition, which has been already reproduced, to adjust the reproduction timing so that the difference between the VPTS#B and the reference time signal is equal to or less than the threshold value.

Similarly, the video decoder 531 continues extension and reproduction of the compression video signal C, and the difference between the VPTS#C and the reference time signal exceeds 33 msec. as the threshold value at T3. Accordingly, the video reproduction timing control means of the video decoder 531 skips one frame, which is originally to be reproduced, to adjust the reproduction timing so that the difference between the VPTS#C and the reference time signal is equal to or less than the threshold value.

As described above, in the third example, when the difference between the reference time signal and the VPTS detected by each video decoder exceeds the threshold value, the video reproduction timing control means of each video decoder performs adjustment so that difference between the reference time signal and the VPTS does not exceed the threshold value. In this manner, the video signals reproduced by video decoders can be synchronized with one another.

EXAMPLE 4

The fourth example relates to a reproduction apparatus for adjusting a reference time signal using audio reproduction time information indicating the time to reproduce the audio signal and synchronizes a plurality of video signals based on the reference time signal.

Figure 41:
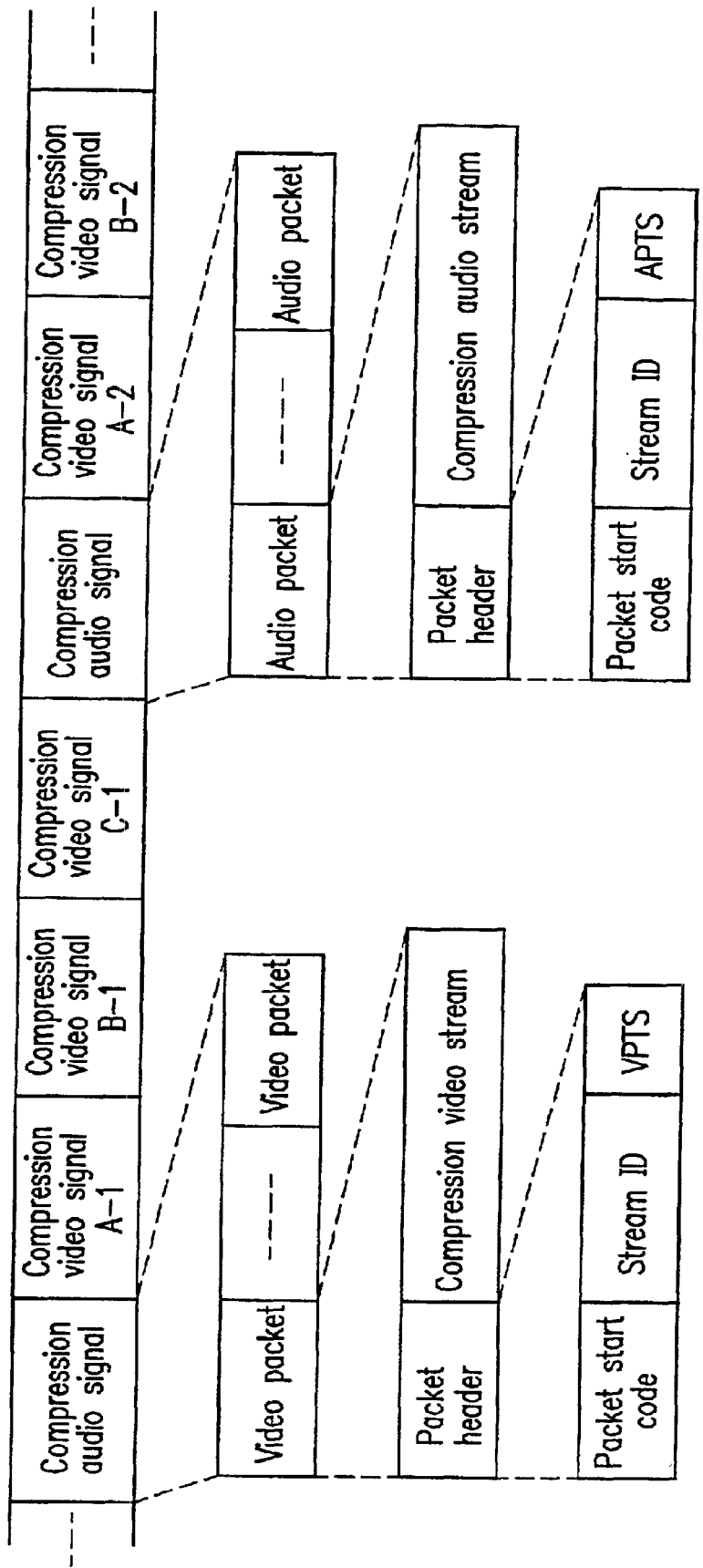
FIG. 41 shows a data structure of an optical disk in one example according to the present invention.

FIG. 41 shows a data structure of an optical disk used in an optical disk reproduction apparatus in the fourth example. The optical disk includes compression audio data in addition to the data included in the optical disk used in the third example.

An audio signal is audio-framed in units of 32 msec. for compression to obtain a compression audio stream. The audio stream is packeted in units of 2 kB into audio packets and recorded on the optical disk. A packet header of each audio packet includes a stream ID for indicating that the stored data is a compression audio stream. When the packet stores a leading part of the audio frame, the packet header also includes an APTS (audio presentation time stamp) as audio reproduction time information indicating the time to reproduce the frame.

FIG. 39 is a block diagram of the reproduction apparatus in the fourth example.

Elements 501 through 532 are the same as those shown in FIG. 35 in the third example.

Reference numeral 504 represents a buffer memory for temporarily storing the compression audio signal. Reference numeral 541 represents audio extension means for extending the compression audio signal. Reference numeral 542 represents a speaker for reproducing the extended audio signal.

Figure 40:
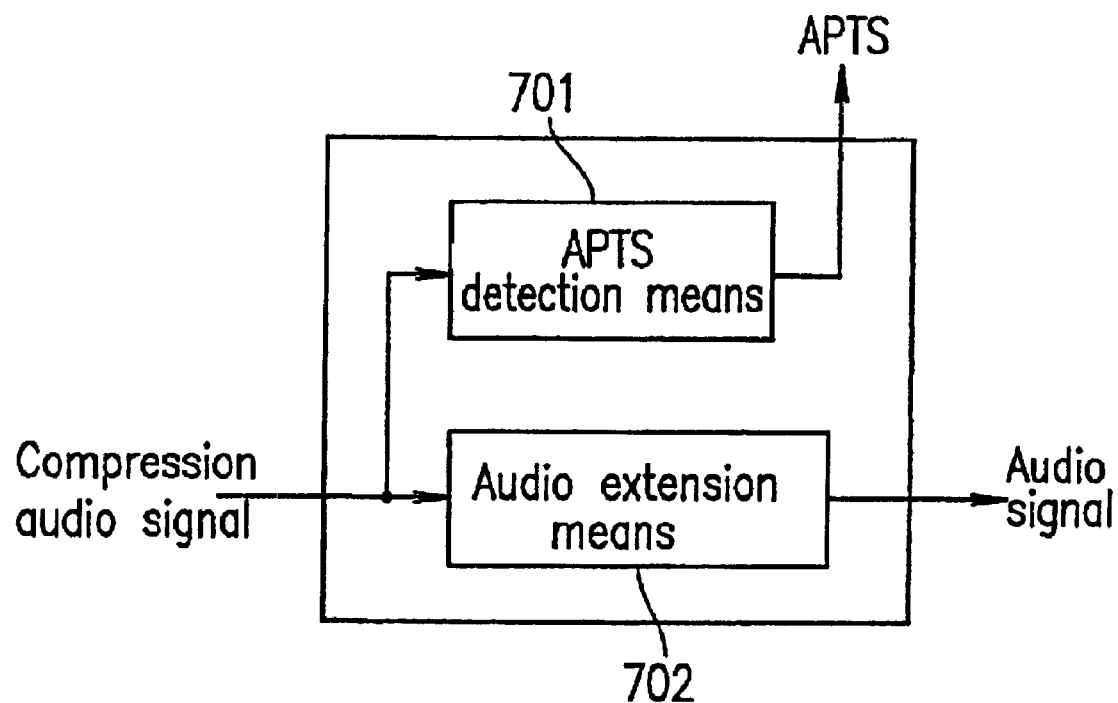
FIG. 40 is a structural view of an audio decoder in one example according to the present invention.

FIG. 40 shows a structure of the audio decoder 541. The audio decoder 541 includes APTS detection means 701 for detecting the APTS stored in a packet header of the audio packet, and audio extension means 702 for extending the compression audio stream.

An operation of the optical disk reproduction apparatus shown in FIG. 39 for reproducing the optical disk shown in FIG. 41 will be described.

The operation until the signal is input to the division means 505 is similar to that with the optical disk reproduction apparatus in the third example.

The data read from the buffer memory 504 is divided into compression video signals A through C and a compression audio signal by the division means 505 and output. The division means 505 identifies which of the compression video signals A through C and the compression audio signal is stored in each packet with the stream ID in the packet header of the packeted data, and determines the destination based on the identification result.

The divided compression video signals and compression audio signal are temporarily stored in buffer memories 510 through 540 respectively.

The video decoders 511 through 531 read data from the buffer memories 510 through 530 respectively, extend the compression video signals, and output the signals as video signals to the monitors 512 through 532 respectively. The audio decoder 541 reads data from the buffer memory 540, extends the compression audio signal, and outputs the signal as an audio signal through the speaker 542.

The operations of the video decoders 511 through 531 for extending the compression video signals and for adjusting the synchronization when the difference between the reference time signal and the VPTS exceeds the threshold value are the same as in the third example.

The compression audio signal read from the buffer memory 540 is input to the audio decoder 541. The APTS detection means 701 detects and outputs the APTS. The audio extension means 702 extends the compression audio stream and outputs the audio signal.

The APTS signal output from the audio decoder 541 is input to the reference time signal generation means 506, and the reference time signal is adjusted by the APTS.

In the fourth example, due to the precision error of the crystal oscillator used in the reference time signal generation means 506, the video decoders 511 through 531 and the audio decoder 541, the reference time signal is faster in terms of extension and reproduction relative to the audio decoder 541. The video decoder 511 is slower and the video decoder 521 is faster in terms of extension and reproduction relative to the reference time signal. Unless the reproduction timing is adjusted, the reproduced video signals and audio signal are out of synchronization.

Figure 42:
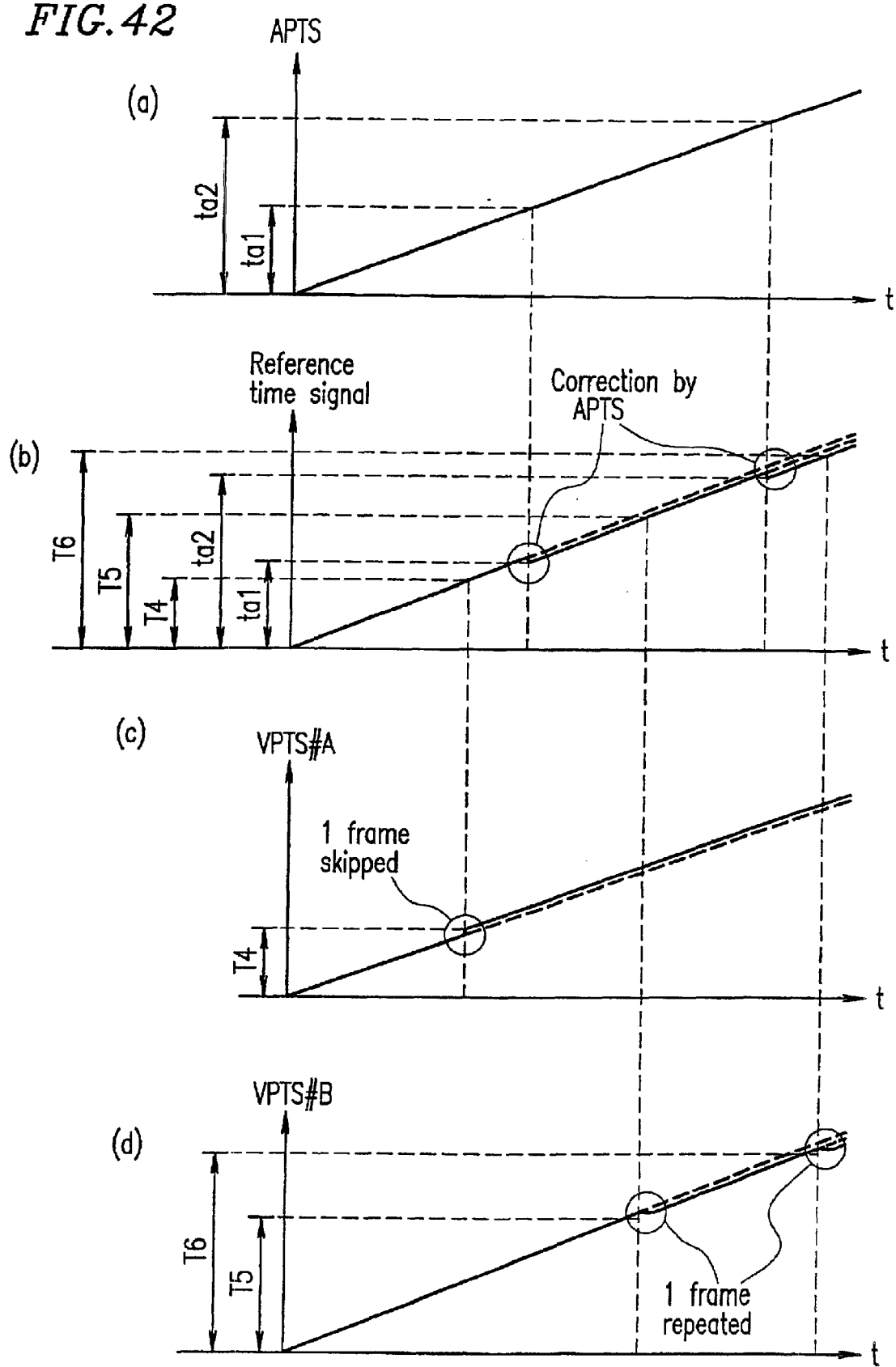
FIG. 42 is a timing diagram of audio and video reproduction in one example according to the present invention.

FIG. 42 is a timing diagram of audio reproduction in the fourth example. Part (a) of FIG. 42 shows the APTS with respect to reproduction time t. Part (b) shows the reference time signal. Part (c) shows the VPTS#A, at which the compression video signal A to be extended by the video decoder 511 is to be reproduced, and part (d) shows the VPTS#B, at which the compression video signal B to be extended by the video decoder 512 is reproduced.

FIG. 42 does not show the VPTS#C, at which the compression video signal C to be extended by the video decoder 531, but the diagram is almost the same as in FIG. 38 shown regarding the third example.

The reference time signal generation means 506 is adjusted using the APTS at time when the APTS shows ta1 and ta2, and the reference time signal is reset as ta1 and ta2 at the respective time.

The video decoder 511 continues extension and reproduction of the compression video signal A, and the difference between the VPTS#A and the reference time signal exceeds 33 msec. as the threshold value at T4. Accordingly, the video reproduction timing control means of the video decoder 511 skips one frame, which is originally to be reproduced, to adjust the reproduction timing so that the difference between the VPTS#A and the reference time signal is equal to or less than the threshold value.

The video decoder 521 continues extension and reproduction of the compression video signal B, and the difference between the VPTS#B and the reference time signal exceeds −33 msec. as the threshold value at T5 and T6. Accordingly, the video reproduction timing control means of the video decoder 521 reproduces one frame in repetition, which has been already reproduced, to adjust the reproduction timing so that the difference between the VPTS#B and the reference time signal is equal to or less than the threshold value.

As described above, in the fourth example, when the difference between the reference time signal and the VPTS detected by each video decoder exceeds the threshold value, the video reproduction timing control means of each video decoder performs adjustment so that difference between the reference time signal and the VPTS does not exceed the threshold value. In this manner, the video signals reproduced by video decoders can be synchronized with one another.

Regarding the difference between the reference time signal and the APTS, the APTS is not adjusted using the reference time signal but the reference time signal is adjusted using the APTS. Accordingly, audio and video signals are synchronized with no unnaturalness in the audio output.

EXAMPLE 5

The fifth example relates to a reproduction apparatus for adjusting the reference time signal using a VPTS detected by one video decoder and synchronizing a plurality of video signals based on the reference time signal.

Figure 43:
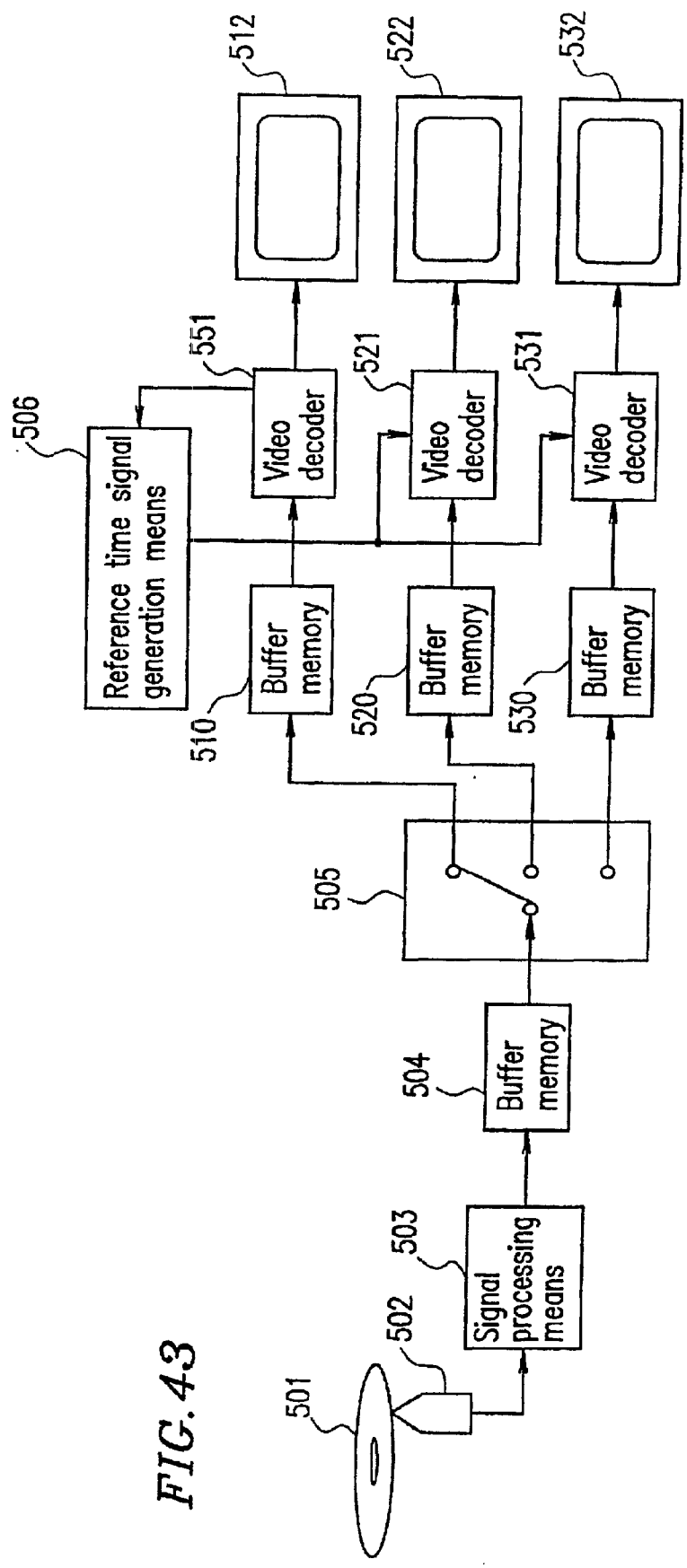
FIG. 43 shows an optical disk reproduction apparatus in one example according to the present invention.

FIG. 43 is a block diagram of an optical disk reproduction apparatus in the fifth example.

Elements 501 through 532 are the same as those in the third example. Reference numeral 551 represents a video decoder used in the fifth example.

Figure 44:
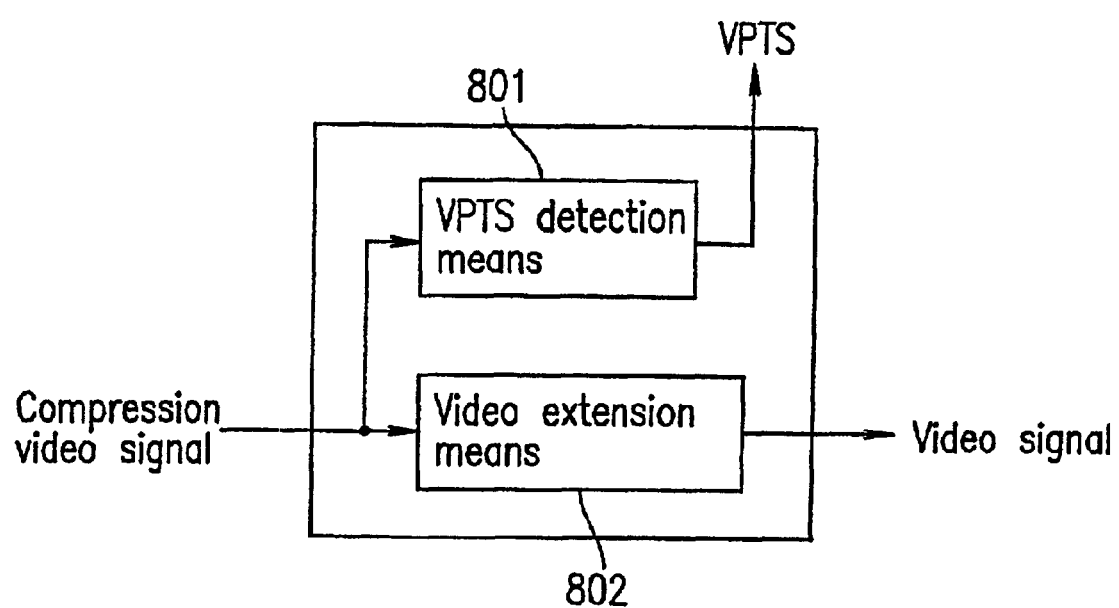
FIG. 44 is a structural view of a video decoder in one example according to the present invention.

The video decoder 551 has a function of outputting the detected VPTS. FIG. 44 shows a structure of the video decoder 551.

The video decoder 551 includes VPTS detection means 801 for detecting a VPTS indicating the reproduction time of the video signal multiplexed as the compression video signal and video extension means 802 for extending the compression video signal.

In the fifth example, due to the precision error of the crystal oscillator used in the reference time signal generation means 506 and the video decoders 521, 531 and 551, the reference time signal is faster in terms of extension and reproduction relative to the video decoder 551. The video decoder 521 is slower and the video decoder 531 is faster in terms of extension and reproduction relative to the reference time signal. Unless reproduction timing is adjusted, the reproduced video signals are out of synchronization.

Figure 45:
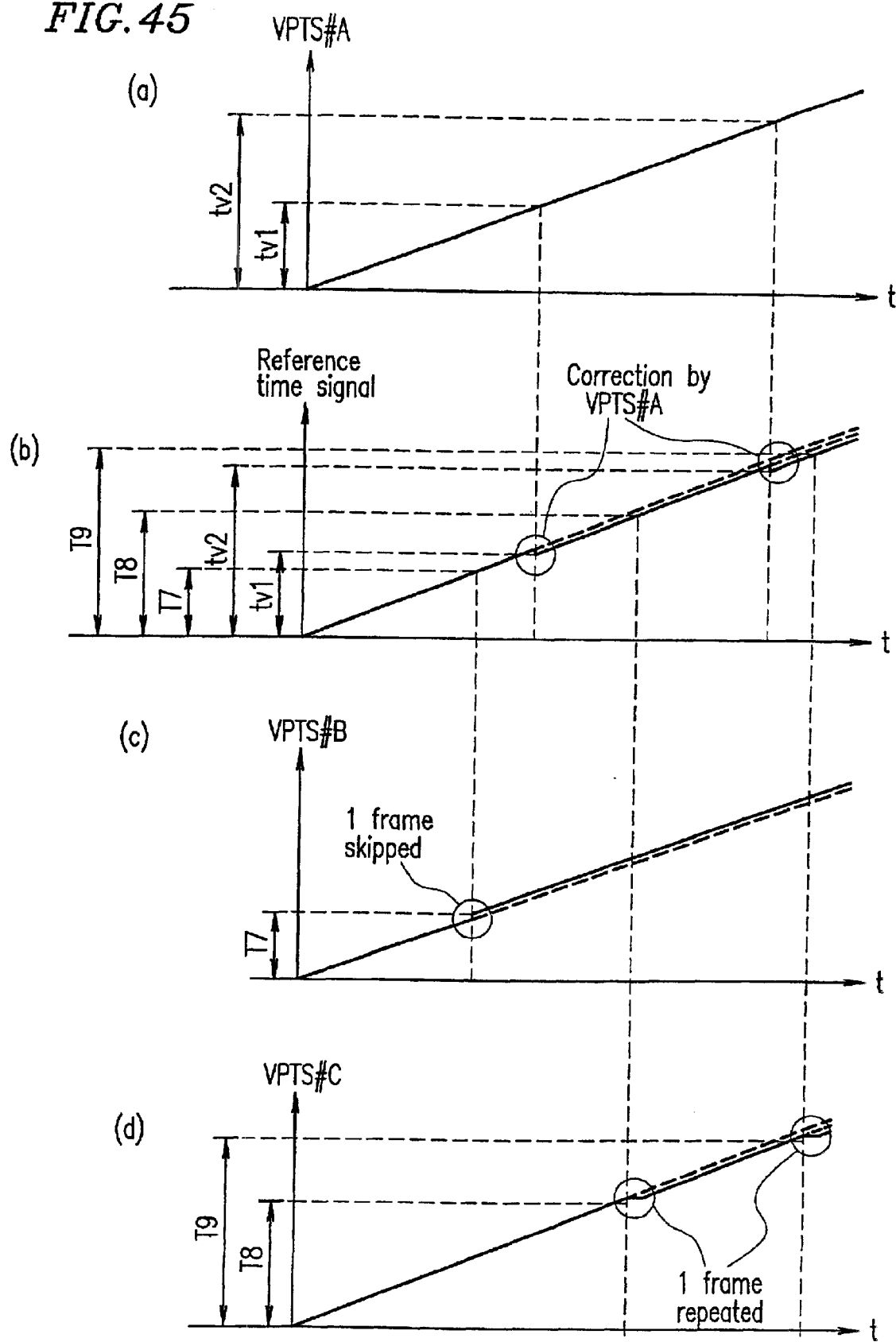
FIG. 45 is a timing diagram of video reproduction in one example according to the present invention.

FIG. 45 is a timing diagram of video output in the fifth example. Part (a) of FIG. 45 shows the VPTS#A detected by the video decoder 551 with respect to reproduction time t. Part (b) shows the reference time signal. Part (c) shows VPTS#B, at which the compression video signal B to be extended by the video decoder 521 is to be reproduced, and part (d) shows the VPTS#C, at which the compression video signal C to be extended by the video decoder 531 is to be reproduced.

The reference time signal generation means 506 is adjusted using the VPTS#A at time when the VPTS#A shows tv1 and tv2, and the reference time signal is reset as tv1 and tv2 at the respective time.

The video decoder 521 continues extension and reproduction of the compression video signal B, and the difference between the VPTS#B and the reference time signal exceeds 33 msec. as the threshold value at T7. Accordingly, the video reproduction timing control means of the video decoder 521 skips one frame, which is originally to be reproduced, to adjust the reproduction timing so that the difference between the VPTS#B and the reference time signal is equal to or less than the threshold value.

Similarly, the video decoder 531 continues extension and reproduction of the compression video signal C, and the difference between the VPTS#C and the reference time signal exceeds −33 msec. as the threshold value at T8 and T9. Accordingly, the video reproduction timing control means of the video decoder 531 reproduces one frame in repetition, which has been already reproduced, to adjust the reproduction timing so that the difference between the VPTS#C and the reference time signal is equal to or less than the threshold value.

As described above, in the fifth example, when the difference between the reference time signal and the values of VPTSs detected by the video decoders 521 and 531 exceeds the threshold value, the video reproduction timing control means of each video decoder performs adjustment so that the difference between the reference time signal and the VPTS does not exceed the threshold value.

By adjusting the reference time signal using the VPTS#A detected by the video decoder 551, the video signal reproduced by the video decoder 551 is not accompanied by any unnaturalness in the visual output despite the frame-by-frame skipping or repeat of the reproduction. Thus, the video signals can be synchronized with one another.

EXAMPLE 6

The sixth example relates to a reproduction apparatus including a plurality of video decoders for extending and reproducing a compression video signal. Each of the video decoders includes reference time signal generation means. The reproduction apparatus adjusts the reference time signal of each video decoder using an APTS indicating the time to reproduce an audio signal to realize synchronization.

In the sixth example, the optical disk shown in FIG. 41 is used.

Figure 46:
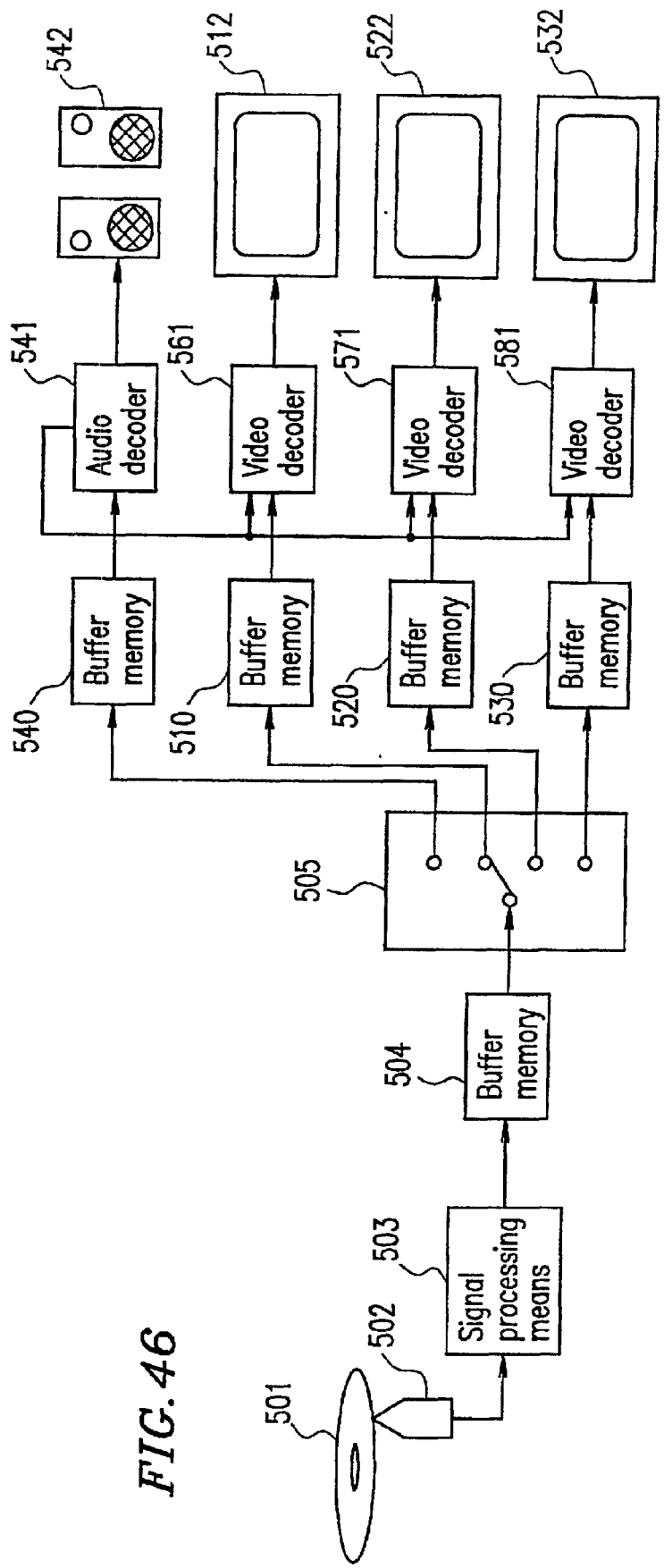
FIG. 46 is a block diagram showing a structure of an optical disk reproduction apparatus in one example according to the present invention.

FIG. 46 is a block diagram of an optical disk reproduction apparatus in the sixth example.

Elements 501 through 542 are the same as those shown in FIG. 39 in the fourth example. Unlike the reproduction apparatus shown in FIG. 39, the reproduction apparatus in this example does not have reference time signal generation means 506 independently, but each video decoder 561 through 581 has reference time signal generation means.

Reference numeral 561 represents a video decoder for extending and reproducing compression video signal A, reference numeral 571 represents a video decoder for extending and reproducing compression video signal B, and reference numeral 581 represents a video decoder for extending and reproducing compression video signal C.

Figure 47:
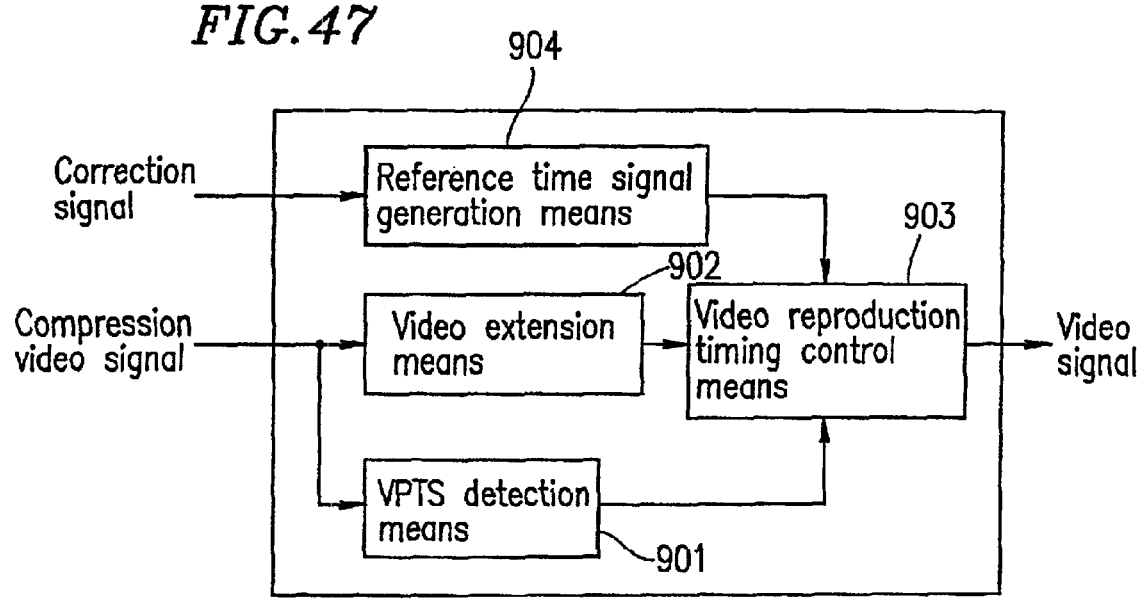
FIG. 47 is a structural view of a video decoder in one example according to the present invention.

FIG. 47 shows a structure of each of the video decoders 561 through 581 used in the sixth example.

The video decoder includes VPTS detection means 901 for detecting a VPTS indicating the reproduction time of the video signal multiplexed as the compression video signal, video extension means 902 for extending the compression video signal, and video reproduction timing control means 903 for comparing the reference time signal and the VPTS and skipping or repeating the video reproduction on a frame-by-frame basis when the comparison result exceeds the threshold value, and reference time signal generation means 904 for generating the reference time signal.

In the sixth example, the reference time signal of reference time signal generation means 904 included in each of the video decoders 561 through 581 is adjusted using the APTS detected by the audio decoder 541.

Since the reference time signals are adjusted using the same APTS, the reference time signals generated in the video decoders 561 through 581 show the same value after being adjusted.

After the adjustment using the APTS, as in the fourth example, when the difference between the reference time signal and the values of VPTS detected by each video decoder exceeds the threshold value, the video reproduction timing control means of each video decoder performs adjustment by skipping or repeating the reproduction on a frame-by-frame basis so that difference between the reference time signal and the VPTS does not exceed the threshold value.

As described above, in the sixth example, the reference time signal generated in each video decoder is adjusted using an APTS, and the video reproduction timing control means of each video decoder maintains the difference between each reference time signal and each VPTS to be equal to or less than the threshold value. Thus, the video signals can be synchronized with one another.

As in the fourth example, the audio signal and the video signal can be synchronized without providing any unnaturalness in the audio output.

In the sixth example, the reference time signals in the video decoders 561 through 581 are adjusted using the APTS detected by the audio decoder 541. The video signals can be reproduced in synchronization in a similar manner by using one of the video decoders shown in FIG. 44 in the fifth example and adjusting the reference time signals of the other video decoders using the VPTS detected by the one video decoder.

EXAMPLE 7

The seventh example relates to a reproduction apparatus for simultaneously reproducing two compression video signals. The two compression video signals are obtained by dividing a 3D signal into a right-eye video signal and a left-eye video signal and compressing the divided video signals.

Figure 48:
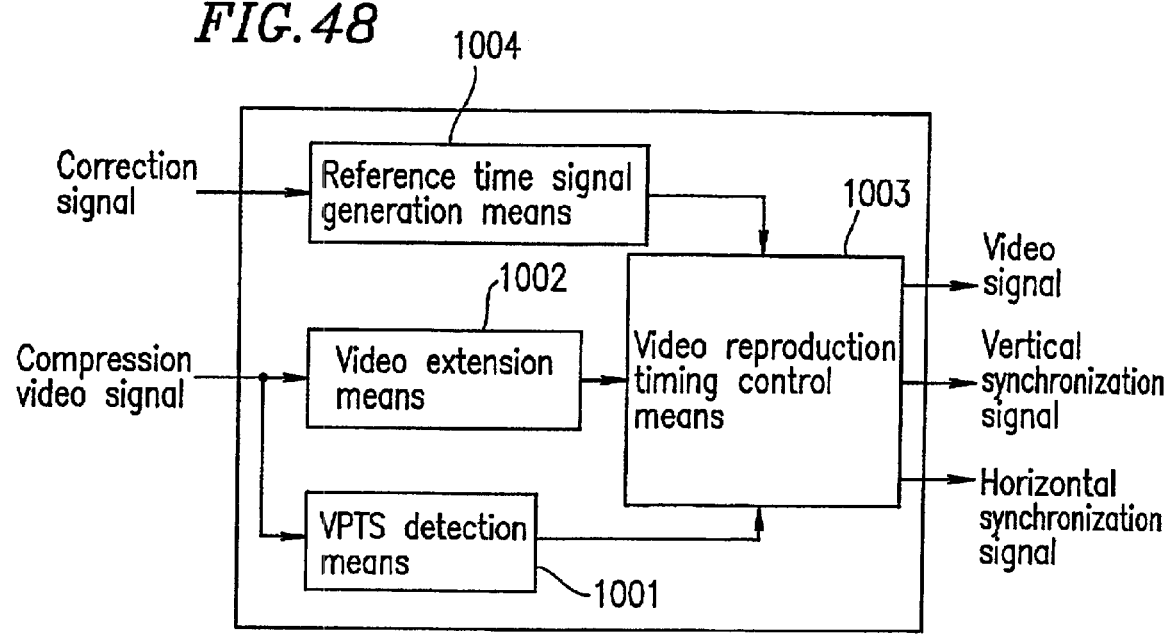
FIG. 48 is a structural view of a video decoder in one example according to the present invention.

The overall structure of the apparatus is generally similar to that of the optical disk reproduction apparatus shown in FIG. 46 in the sixth example, but the reproduction apparatus in the seventh example includes two video decoders for extending compression video signals obtained after the division means 505 since two video signals are to be reproduced simultaneously. FIG. 48 shows a structure of one of the video decoders used in the seventh example, and FIG. 49 shows a structure of the other video decoder used in the seventh example.

As shown in FIG. 48, the video decoder includes VPTS detection means 1001 for detecting a VPTS indicating the reproduction time of the video signal multiplexed as the compression video signal, video extension means 1002 for extending the MPEG compression video signal, reference time signal generation means 1004 for generating a reference time signal, and video reproduction timing control means 1003 for comparing the reference time signal and the VPTS and skipping or repeating the video reproduction on a frame-by-frame basis when the comparison result exceeds the threshold value and also for outputting a horizontal synchronization signal and a vertical synchronization signal for the video to be reproduced.

Figure 49:
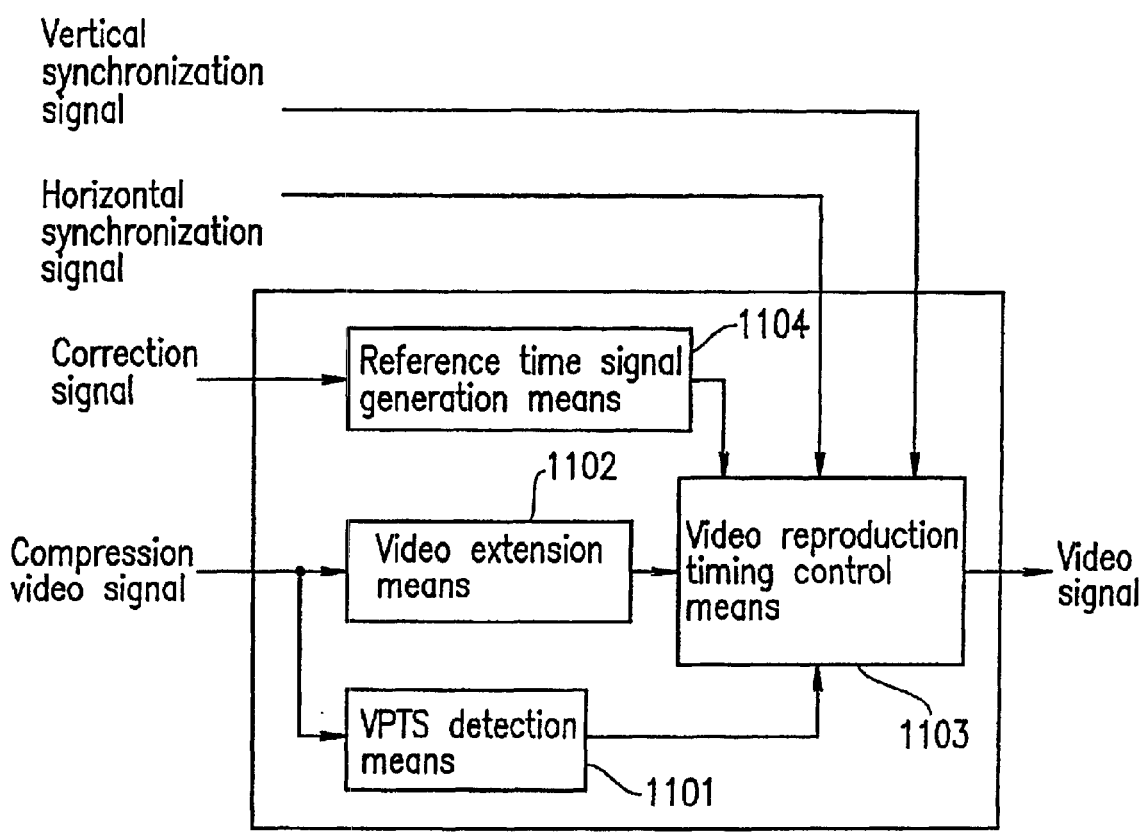
FIG. 49 is a structural view of a video decoder in one example according to the present invention.

As shown in FIG. 49, the other video decoder includes VPTS detection means 1101 for detecting a VPTS indicating the reproduction time of the video signal multiplexed as the compression video signal, video extension means 1102 for extending the MPEG compression video signal, reference time signal generation means 1104 for generating a reference time signal, and video reproduction timing control means 1103 for comparing the reference time signal and the VPTS and skipping or repeating the video reproduction on a frame-by-frame basis when the comparison result exceeds the threshold value, receiving the horizontal synchronization signal and the vertical synchronization signal for the video to be reproduced, and also reproducing the extended video signal in synchronization with the horizontal/vertical synchronization signals.

The video decoders are connected to each other so that the horizontal synchronization signal and the vertical synchronization signal output from the video decoder in FIG. 48 are sent to the video decoder in FIG. 49.

In the optical disk reproduction apparatus in the seventh example having the above-described structure, the reference time signal generated by each video decoder for the right or left eye is adjusted using an APTS, and the video reproduction timing control means of each video decoder maintains the difference between each reference time signal and each VPTS to be equal to or less than the threshold value. Thus, the right-eye video signal and the left-eye video signal can be synchronized with one another on a frame-by-frame basis. By using the horizontal and vertical synchronization signals output by one of the video decoder as the horizontal and the vertical synchronization signals of the other video decoder, two video signals can be reproduced in synchronization on a pixel-by-pixel basis.

In the seventh example, compression video signals obtained from a 3D video signal are used and divided into the right-eye and left-eye video signals. Alternatively, for example, an original video signal having a first resolution is divided in a vertical and/or horizontal direction into at least two video signals including a first video signal and a second video signal having a second resolution which is lower than the first resolution. The resultant signals are compressed to be used. Thus, a plurality of video signals in synchronization with one another on a pixel-by-pixel basis can be obtained as from a 3D video signal. By synthesizing such resultant signals, the clear original video signal having the original resolution is reproduced.

EXAMPLE 8

The eighth example relates to an optical disk reproduction apparatus for extending one compression video signal and two compression audio signals and reproducing the signals simultaneously.

Figure 52:
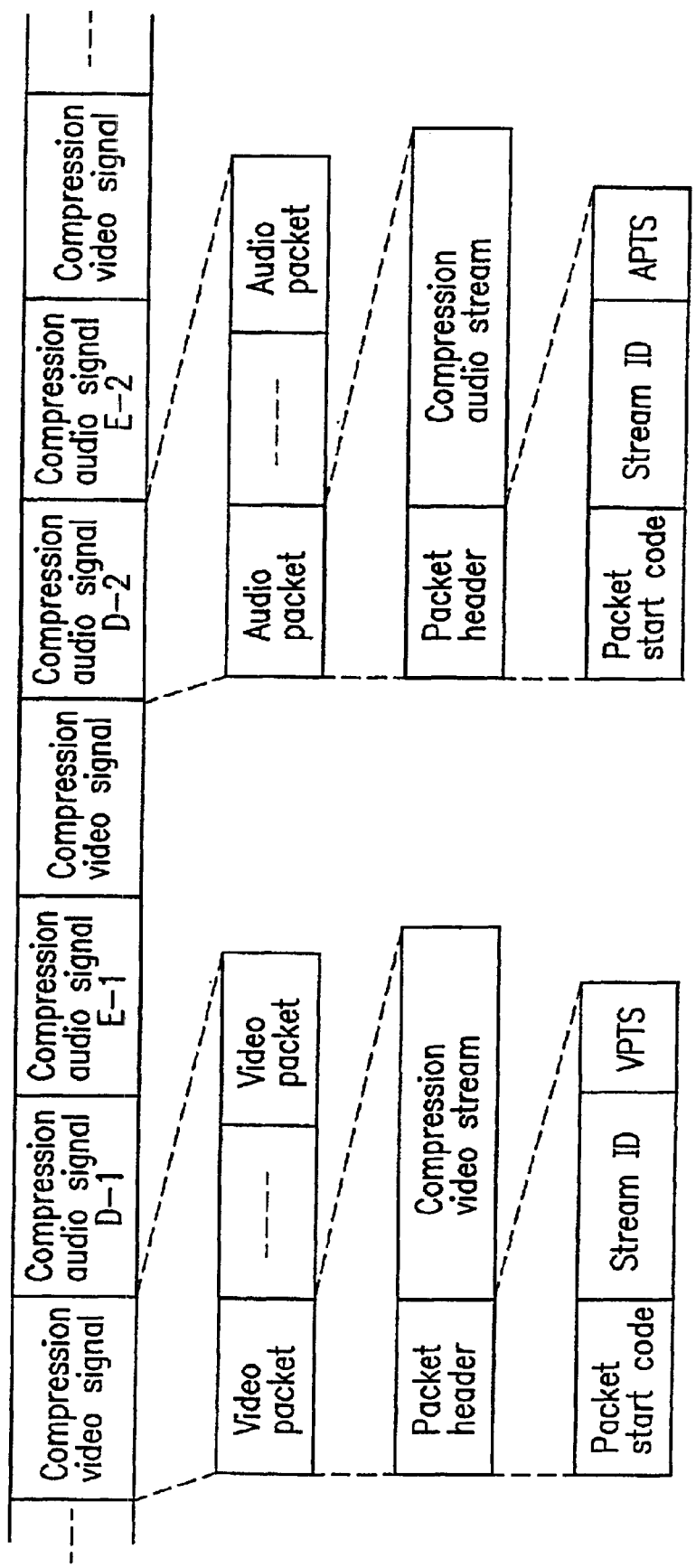
FIG. 52 shows a data structure of an optical disk in one example according to the present invention.

FIG. 52 shows a data structure of the optical disk used in the eighth example.

Two audio signals D and E are compressed to obtain compression audio streams D and E. A video signal is compressed to obtain a compression video stream.

The compression video streams D and E and the compression video stream are packeted in units of 2 kB into audio packets and video packets. A packet header of each packet includes a stream ID for indicating which of the compression audio streams D and E and the compression video stream is stored, and the APTS and VPTS described above.

Figure 50:
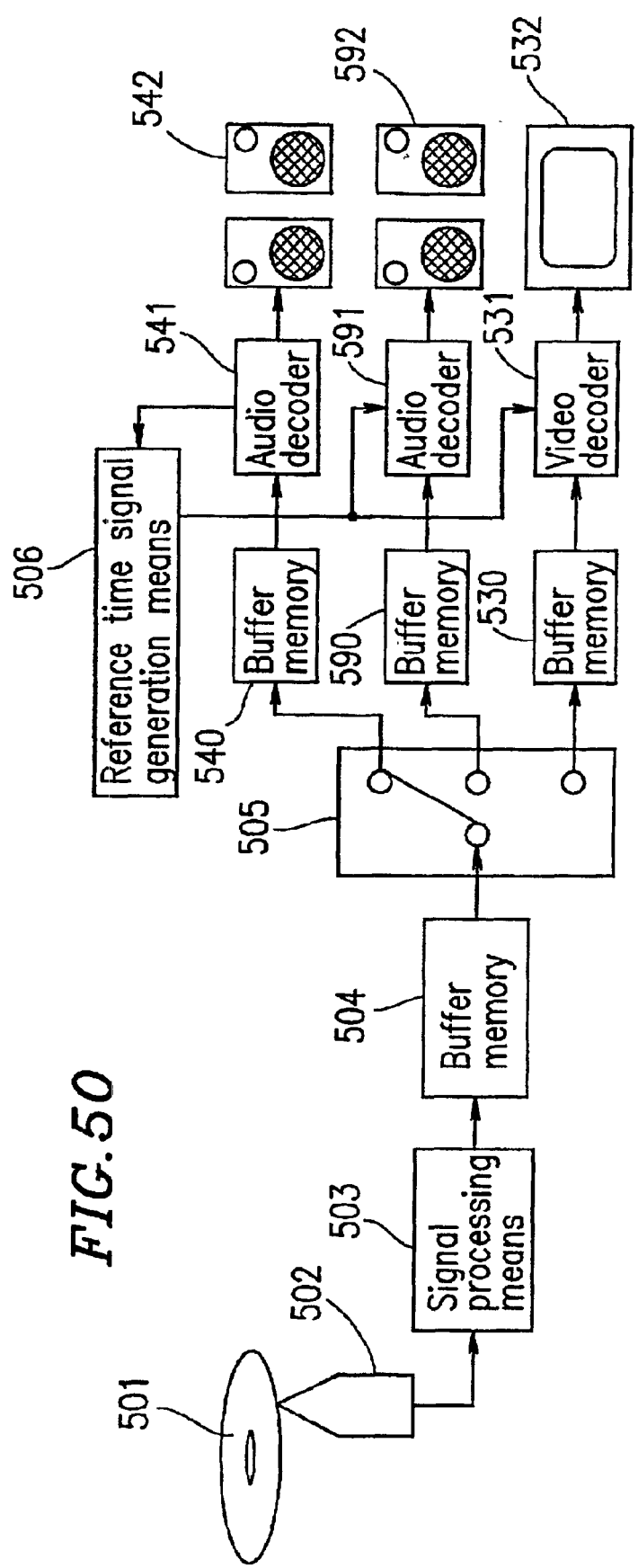
FIG. 50 is a block diagram showing a structure of an optical disk reproduction apparatus in one example according to the present invention.

FIG. 50 is a block diagram of a reproduction apparatus in the eighth example.

The reproduction apparatus has a generally similar structure to that in FIG. 39 in the fourth example. The audio decoder 541 has the same structure as that shown in FIG. 40, and the video decoder 531 has the same structure as that shown in FIG. 36. The audio decoder 591 has the same structure as that shown in FIG. 51.

Reference numeral 590 represents a buffer memory for temporarily storing the compression audio signal like the buffer memory 540. Reference numeral 592 represents a speaker for reproducing the audio signal.

Figure 51:
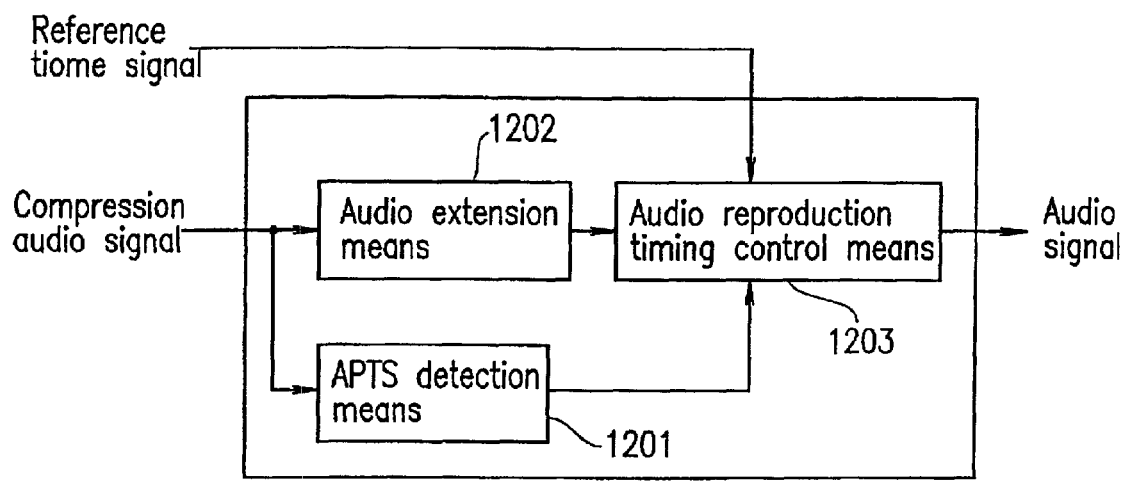
FIG. 51 is a structural view of an audio decoder in one example according to the present invention.

FIG. 51 shows a structure of the audio decoder 591.

The audio decoder 591 includes APTS detection means 1201 for detecting an APTS of an audio signal multiplexed as a compression audio signal, audio extension means 1202 for extending the compression audio signal, and audio reproduction timing control means 1203 for comparing the reference time signal and the APTS and skipping or repeating the audio reproduction on an audio frame-by-audio frame basis when the comparison result exceeds the threshold value.

A reproduction operation in the eighth example will be described.

The operation until the signal read from the optical disk 501 is input to the division means 505 is similar to that in the other examples.

The data read from the buffer memory 504 is divided by the division means 505 into a compression video signal, the compression audio signal D and the compression audio signal E, and output. The division means 505 identifies which of the compression video signal, the compression audio signal D and the compression audio signal E is stored in each packet using the packet ID in the packet header of the packeted data, and determines the destination based on the identification result.

The divided compression video signal, the compression audio signal D and compression audio signal E are temporarily stored in buffer memories 530, 540 and 590 respectively.

The video decoders reads data from the buffer memory 530, extends the compression video signal and outputs the signal as a video signal to a monitor 532. The audio decoders 541 and 591 read data from the buffer memories 540 and 590, extend the compression audio signals and output the signals as audio signals through the speakers 542 and 592.

The reference time signal generated by the reference time signal generation means 506 is adjusted by an APTS#D detected by the audio decoder 541.

In the audio decoder 591, an APTS#E is detected by the APTS detection means 1201 and the compression audio signal E is extended by the audio extension means 1202. The audio reproduction timing control means 1203 receives the extended audio signal output from the audio extension means 1202, the reference time signal, and the APTS#E from the APTS detection means 1201, and compares the reference time signal and the APTS#E. When the difference between the reference time signal and the APTS#E exceeds the threshold value, the audio reproduction timing control means 1203 controls the audio reproduction timing so that the difference is equal to or less than the threshold value.

In the eighth example, 32 msec is used as the threshold value. The audio reproduction timing control means 1203 performs the following.

(reference time signal-APTS#E)>32 msec.:1 audio frame is skipped.

(reference time signal-APTS#E)<-32 msed.:1 audio frame is repeated.

The operation of the video decoder 531 for extending the compression video signal and performing adjustment when the difference between the reference time signal and the VPTS exceeds the threshold value are similar to those in the third example.

In the eighth example, due to the precision error of the crystal oscillator used in the reference time signal generation means 506, the video decoder 531, and the audio decoders 541 and 591; the audio decoders 541 and 591 are slower and the video decoder 531 is faster in terms of extension and reproduction relative to the reference time signal. Unless reproduction timing is adjusted, the reproduced video signals are out of synchronization.

Figure 53:
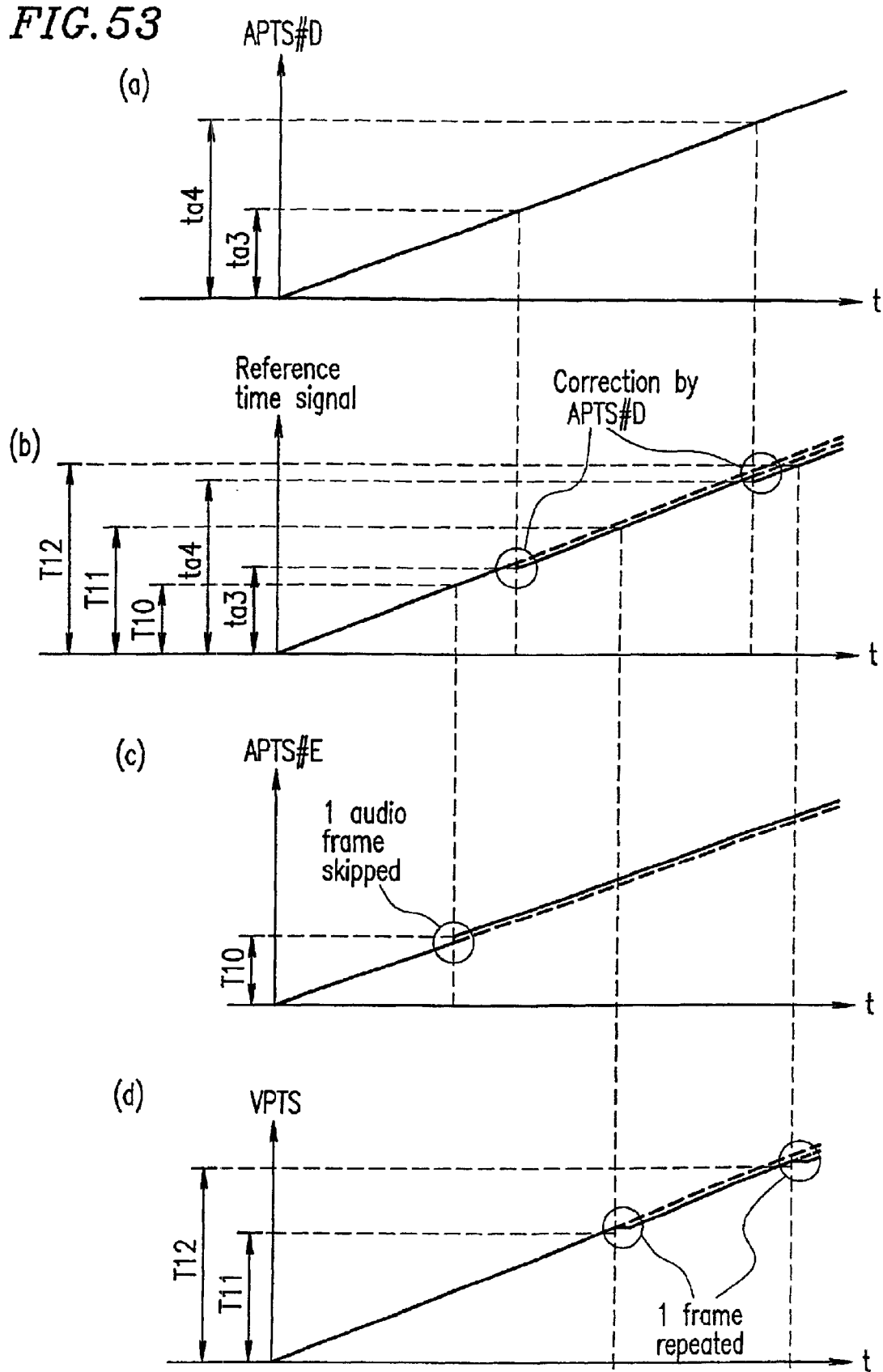
FIG. 53 is a timing diagram of audio and video reproduction in one example according to the present invention.

FIG. 53 is a timing diagram of video reproduction in the eighth example. Part (a) of FIG. 53 shows the APTS#D with respect to reproduction time t. Part (b) shows the reference time signal, part (c) shows APTS#E, at which the compression audio signal E to be extended by the audio decoder 591 is to be reproduced, and part (d) shows the VPTS, at the compression video signal to be extended by the video decoder 531 is to be reproduced. The reference time signal is adjusted using the APTS#D when APTS#D shows ta3 and ta4. The reference time signal is reset to ta3 and ta4 at the respective time.

The audio decoder 591 continues extension and reproduction of the compression audio signal E, and the difference between the APTS#E and the reference time signal exceeds 32 msec. as the threshold value at T10. Accordingly, the audio reproduction timing control means 1203 of the audio decoder 591 skips one audio frame, which is originally to be reproduced, to adjust the reproduction timing so that the difference between the APTS#E and the reference time signal is equal to or less than the threshold value.

The difference between the VPTS and the reference time signal exceeds −33 msec. as the threshold value at T11 and T12. Accordingly, the video reproduction timing control means of the video decoder 531 reproduces one frame in repetition, which has been already reproduced at the respective time, to adjust the reproduction timing so that the difference between the VPTS and the reference time signal is equal to or less than the threshold value.

As described above, in the eighth example, when the difference between the reference time signal and the APTS#E detected by the audio decoder 591 exceeds the threshold value, the audio reproduction timing control means of the audio decoder performs adjustment so that difference between the reference time signal and the APTS#E does not exceed the threshold value of audio reproduction. Similarly, difference between the reference time signal and the VPTS is adjusted so as not to exceed the threshold value of video reproduction. In this manner, each audio signal and the video signal can be synchronized with one another.

EXAMPLE 9

In the ninth example, the clock for performing extension is changed for audio reproduction timing control.

The overall structure and operation of the reproduction apparatus in the ninth example are generally similar to those of the optical disk reproduction apparatus in the eighth example, but the operation of audio reproduction timing control performed when the reference time signal and the APTS#E exceeds the threshold value is different from that of the eighth example. With reference to FIGS. 54 and 55, audio reproduction timing control used in the ninth example will be described.

FIG. 54 shows an operation when the difference between the APTS#E and the reference timing signal exceeds 32 msec. which is the threshold for the audio reproduction. Part (a) of FIG. 54 shows the reference time signal with respect to reproduction time t. Part (b) shows the APTS#E, and part (c) shows the clock frequency at which the audio decoder 591 performs extension and reproduction. Ordinary extension and reproduction are performed by clock f0 having a frequency which is 384 times the sampling frequency fs of the audio signal. The difference between the APTS#E and the reference time signal exceeds 32 msec. at time T11, and accordingly, audio reproduction control means switches the clock f0 to f1. The frequency of clock f1 is higher by 10% than the frequency of clock f0. Extension performed with clock f1 proceeds faster than extension performed with clock f0 by 10%. With clock f1, the extension is performed for 320 msec. from the point where the difference between the APTS#E and the reference time signal exceeds 32 msec. which is the threshold value. Thus, the reproduction timing is adjusted so that the difference between the APTS#E and the reference time signal is equal to or less than the threshold value.

FIG. 55 shows an operation when the difference between the APTS#E and the reference timing signal exceeds −32 msec. which is the threshold for the audio reproduction. Part (a) of FIG. 55 shows the reference time signal with respect to reproduction time t. Part (b) shows the APTS#E, and part (c) shows the clock frequency at which the audio decoder 591 performs extension and reproduction.

The difference between the APTS#E and the reference time signal exceeds −32 msec. at time T12, and accordingly, audio reproduction control means switches the clock f0 to f2. The frequency of clock f2 is lower by 10% than the frequency of clock f0. Extension performed with clock f2 proceeds more slowly than extension performed with clock f0 by 10%. With clock f2, the extension is performed for 320 msec. from the point where the difference between the APTS#E and the reference time signal exceeds −32 msec. which is the threshold value. Thus, the reproduction timing is adjusted so that the difference between the APTS#E and the reference time signal is equal to or less than the threshold value.

As described above, when the difference between the APTS#E and the reference time signal exceeds the threshold value for the audio reproduction, the clock by which the signal is extended is changed so that the extension is performed at a higher speed or lower speed than the normal speed. By such an operation, the reproduction timing is controlled so that the difference between the APTS#E and the reference time signal is equal to or less than the threshold value. Thus, the audio signals and the video signal can be reproduced in synchronization with no unnaturalness in the audio output.

In the ninth example, the frequency of the clock is changed by 10%. Needless to say, a more natural audio signal is obtained by changing the clock less or gradually.

In the eighth and ninth examples, the reference time signal is adjusted using the APTS#D. Alternatively, the video decoder shown in FIG. 44 can be used, in which case the VPTS output from the video decoder can be used for adjustment.

The present invention has been described by way of specific examples.

The comparison between the reference time signal and the VPTS or APTS, control of the reproduction time, adjustment of the reproduction timing using a VPTS or APTS can be performed by a microcomputer which controls the entirety of the reproduction apparatus.

In the above examples, the present invention is applied to optical disk reproduction apparatuses. The virtual frame-based editing system according to the present invention is also applicable to a reproduction apparatus, referred to as the set top box, for extending compression signals supplied through communication networks or digital satellite broadcasting. Even when the programs are switched, the non-continuous video signals are connected seamlessly, which provides a significant advantage.

INDUSTRIAL APPLICABILITY

A basic video signal and an interpolation signal are divided into frames each having 1 GOP or more and subjected to interleaving alternately to be recorded on the optical disk as interleave blocks. From such an optical disk, a high resolution synthesis reproduction apparatus reproduces information in both of two types of interleave blocks alternately arranged. When the optical disk having a high resolution video signal is reproduced by a non-progressive reproduction apparatus, information in the interleave block of only odd field or even field is reproduced by track jump. Thus, a complete two-dimensional video is obtained. Thus, compatibility is realized.

Especially, a high resolution video signal arrangement information file and a high resolution picture identifier are recorded on the optical disk. Accordingly, the location of the high resolution video signal is easily determined. Therefore, two ordinary interlace signals can be made into a progressive signal. In addition, output of different content pictures for the right eye and left eye can be avoided.

According to the two-stream simultaneous reproduction synchronization system according to the present invention, an MPEG signal can be virtually edited on a frame-by-frame basis, which is conventionally performed only on a GOP-by-GOP basis if deterioration of picture quality should be avoided. By recording reproduction control information, signals can be connected on a frame-by-frame basis when being reproduced. Thus, virtual frame-based editing can be realized without deterioration in the picture quality.

In the two-stream simultaneous reproduction synchronization system, a plurality of compression video signals or a plurality of compression audio signals can be reproduced in synchronization with one another after being extended.

In a reproduction apparatus in which the reference time signal is adjusted using an APTS detected by an audio decoder and the video output timing is controlled so that the VPTS matches the adjusted reference time signal, an audio signal and a plurality of video signals are synchronized for reproduction with no unnaturalness in the audio output.

In a reproduction apparatus in which the audio output timing is controlled by changing an extension clock, audio and video signals are synchronized for reproduction with no unnaturalness in the audio output with no interruption or pause in the audio signal.

What is claimed is:

1. An optical disk reproduction apparatus for reproducing a signal recorded on an optical disk, in which the optical disk has, recorded thereon, at least a first video stream representing a low frequency component of the video signal and a second video stream representing at least a high frequency component of the video signal, the first video stream includes a plurality of first interleave units and the second video stream includes a plurality of second interleave units, each of the plurality of first interleave units includes m1 GOPs (where m1 is an integer of 1 or greater), each of the plurality of second interleave units includes m2 GOPs (where m2 is an integer of 1 or greater), the optical disk reproduction apparatus comprising:

a reproduction section for reproducing the first video stream and the second video stream recorded on the optical disk;

a division section for dividing the reproduced first video stream into the plurality of first interleave units and for dividing the reproduced second video stream into the plurality of second interleave units;

a decoding section for decoding the plurality of first interleave units to generate a first reproduction signal representing the low frequency component of the video signal and for decoding the plurality of second interleave units to generate a second reproduction signal representing at least the high frequency component of the video signal;

a synthesis section for synthesizing the first reproduction signal and the second reproduction signal to generate the video signal; and an output section for selectively outputting at least one of the first reproduction signal, the second reproduction signal, and the video signal.

2. An optical disk reproduction apparatus according to claim 1, wherein the plurality of first interleave units are each corresponded to first time information relating to reproduction time, and the plurality of second interleave units are each corresponded to second time information relating to reproduction time.

3. An optical disk reproduction apparatus according to claim 2, further comprising:
a reference time signal generation section for generating a reference time signal;
a first reproduction control section for controlling the reproduction time of the first reproduction signal in accordance with the difference between the reference time signal and the first time information;
a second reproduction control section for controlling the reproduction time of the second reproduction signal in accordance with the difference between the reference time signal and the second time information; and
an adjusting section for adjusting the reference time signal so that the reference time signal supplied to the first reproduction control section and the reference signal supplied to the second reproduction control section represent substantially the same time.

4. An optical disk reproduction apparatus according to claim 3, wherein the adjusting section adjusts the reference time signal based on audio reproduction time information representing the time to reproduce an audio signal which is to be output in synchronization with the video signal.

5. An optical disk reproduction apparatus according to claim 3, wherein the adjusting section adjusts the reference time signal based on at least one of first video reproduction time information representing the time to reproduce the first reproduction signal and second video reproduction time information representing the time to reproduce the second reproduction signal.

6. An optical disk reproduction apparatus according to claim 3, wherein:
the first reproduction control section controls the reproduction time of the first reproduction signal by skipping a frame of the first reproduction signal or by reproducing a frame of the first reproduction signal in repetition; and
the second reproduction control section controls the reproduction time of the second reproduction signal by skipping a frame of the second reproduction signal or by reproducing a frame of the second reproduction signal in repetition.

7. An optical disk reproduction apparatus according to claim 1, wherein at least one of the first time information and the second time information includes at least one of a PTS, a DTS and an SCR.

8. An optical disk reproduction apparatus according to claim 1, wherein:
the first reproduction signal corresponds to a first pixel number, and the second reproduction signal corresponds to a second pixel number, which is larger than the first pixel number,
the synthesis section includes a converter for converting the first reproduction signal into a conversion signal corresponding to the second pixel number, and
the video signal is obtained by synthesizing the conversion signal and the second reproduction signal.

9. An optical disk reproduction apparatus according to claim 8, wherein the optical disk further has, recorded thereon, an identifier representing the first pixel number corresponding to the first reproduction signal, and the converter converts the first reproduction signal into the conversion signal in accordance with the identifier.

10. An optical disk reproduction apparatus according to claim 8, wherein:
the optical disk further has, recorded thereon, an identifier representing the first pixel number corresponding to the first reproduction signal, and
the optical disk reproduction apparatus further includes a rotation control section for controlling the rotation of the optical disk, and
the rotation control section controls the rotation of the optical disk in accordance with the identifier.

11. An optical disk reproduction apparatus according to claim 1, wherein:
the optical disk further has, recorded thereon, an identifier representing that the video signal is obtained by encoding a progressive video signal of 24 frames to 30 frames per second,
the output section includes a converter for converting at least one of the first reproduction signal, the second reproduction signal, and the video signal into a frame signal, and
the output section outputs the progressive video signal of 60 frames per second by outputting the frame signal in an overlapping manner.

12. An optical disk reproduction apparatus according to claim 11, further comprising a buffer memory section for storing the plurality of first interleave units and the plurality of second interleave units, and the buffer memory section has a capacity which is equal to or greater than an amount of data of the GOP or GOPs included in the second interleave units.

13. An optical disk reproduction apparatus according to claim 12, wherein the buffer memory section has a capacity which is 1 MB or greater.

14. An optical disk including, recorded thereon, at least a first video stream representing a low frequency component of the video signal and a second video stream representing at least a high frequency component of the video signal, wherein: the first video stream includes a plurality of first interleave units, the second video stream includes a plurality of second interleave units, each of the plurality of first interleave units includes m1 GOPs (where m1 is an integer of 1 or greater), and each of the plurality of second interleave units includes m2 GOPs (where m2 is an integer of 1 or greater).

15. An optical disk according to claim 14, wherein the plurality of first interleave units and the plurality of second interleave units are structured so that reproduction time of one of the plurality of first interleave units is substantially equal to reproduction time of one of the plurality of second interleave units, the one of the plurality of second interleave units corresponding to the one of the plurality of first interleave units.

16. An optical disk recording apparatus, comprising:
a dividing section for dividing a video signal into a first video signal representing a low frequency component of the video signal and a second video signal representing at least a high frequency component of the video signal;an encoding section for generating a first video stream by encoding the first video signal and for generating a second video stream by encoding the second video signal, wherein: the first video stream includes a plurality of first interleave units, the second video stream includes a plurality of second interleave units, each of the plurality of first interleave units includes m1 GOPs (where m1 is an integer of 1 or greater), and each of the plurality of second interleave units includes m2 GOPs (where m2 is an integer of 1 or greater);

a selection output section for selectively outputting the plurality of first interleave units included in the first video stream and the plurality of second interleave units included in the second video stream; and a recording section for recording the signal output from the selection output section on an optical disk.

17. An optical recording apparatus according to claim 16, wherein the division section includes a decoder for decoding the first video stream and a differential calculator for calculating a differential between the video signal and the signal output from the decoder, and outputs the signal output from the differential calculator as the second video signal.

18. An optical recording apparatus according to claim 17, wherein the division section further includes:

a first converter for converting the video signal into a first conversion signal corresponding to a second pixel number which is smaller than a first pixel number corresponding to the video signal, and a second converter for converting the signal output from the decoder into a second conversion signal corresponding to the first pixel number which is larger than the second pixel number corresponding to the signal output from the decoder, wherein the division section outputs the first conversion signal as the first video signal, and wherein the differential calculator calculates the differential between the video signal and the second conversion signal.

19. An optical disk recording apparatus according to claim 17, wherein the recording section further records on the optical disk an identifier representing that the second video signal is output from the differential calculator.

20. An optical disk recording apparatus according to claim 17, wherein the recording section further records on the optical disk an identifier representing the first pixel number corresponding to the video signal.

21. An optical disk recording apparatus according to claim 17, wherein the recording section further records on the optical disk an identifier representing the second pixel number corresponding to the first video signal.

* * * * *

UNITED STATES PATENT AND TRADEMARK OFFICE
CERTIFICATE OF CORRECTION

PATENT NO. : 6,925,250 B1  
DATED : August 2, 2005  
INVENTOR(S) : Mitsuaki Oshima et al.

It is certified that error appears in the above-identified patent and that said Letters Patent is hereby corrected as shown below:

Title page,
Item [56], References Cited, FOREIGN PATENT DOCUMENTS, "Wo98/25413" should read -- WO98/25413 --.

Column 48,
Line 61, "signal;an" should read -- signal; an --.

Signed and Sealed this

Fourteenth Day of February, 2006

JON W. DUDAS
*Director of the United States Patent and Trademark Office*